US009975448B2

(12) United States Patent
Olynick et al.

(10) Patent No.: US 9,975,448 B2
(45) Date of Patent: May 22, 2018

(54) CONTROL OF TRANSLATING HOVER ENGINES TO OBTAIN ZERO DRAG

(71) Applicant: Arx Pax Labs, Inc., Los Gatos, CA (US)

(72) Inventors: David P. Olynick, El Cerrito, CA (US); D. Gregory Henderson, Los Gatos, CA (US)

(73) Assignee: Arx Pax Labs, Inc., Los Gatos, CA (US)

( * ) Notice: Subject to any disclaimer, the term of this patent is extended or adjusted under 35 U.S.C. 154(b) by 0 days. days.

(21) Appl. No.: 15/415,571

(22) Filed: Jan. 25, 2017

(65) Prior Publication Data

US 2017/0210243 A1 Jul. 27, 2017

Related U.S. Application Data

(60) Provisional application No. 62/286,823, filed on Jan. 25, 2016.

(51) Int. Cl.
| | |
|---|---|
| G05B 5/00 | (2006.01) |
| H02H 7/08 | (2006.01) |
| H02P 1/04 | (2006.01) |
| H02P 3/00 | (2006.01) |
| B60L 13/04 | (2006.01) |
| H02N 15/00 | (2006.01) |
| H02P 31/00 | (2006.01) |

(52) U.S. Cl.
CPC .............. *B60L 13/04* (2013.01); *H02N 15/00* (2013.01); *H02P 31/00* (2013.01); *B60L 2240/32* (2013.01)

(58) Field of Classification Search
CPC ................................ B02L 13/04; H02N 15/00
USPC ........................................................ 318/489
See application file for complete search history.

(56) References Cited

U.S. PATENT DOCUMENTS

| | | |
|---|---|---|
| 5,722,326 A | 3/1998 | Post |
| 2003/0015115 A1 | 1/2003 | Lamb et al. |
| 2007/0089636 A1 | 4/2007 | Guardo, Jr. |
| 2015/0175031 A1 | 6/2015 | Henderson et al. |

FOREIGN PATENT DOCUMENTS

| | | |
|---|---|---|
| WO | 2014149626 A1 | 9/2014 |
| WO | 2017132250 A1 | 8/2017 |

OTHER PUBLICATIONS

"Int'l Application Serial No. PCT/US17/14927, International Search Report and Written Opinion dated Apr. 25, 2017", 17 pages.

*Primary Examiner* — Erick Glass
(74) *Attorney, Agent, or Firm* — Kwan & Olynick LLP

(57) ABSTRACT

Electromechanical systems using magnetic fields to induce eddy currents and generate lift are described. Magnet configurations which can be employed in the systems are illustrated. The magnet configuration can be used to generate lift and/or thrust. Arrangements of hover engines, which can employ the magnet configurations, are described. Methods of controlling translating hover engines to operate at a zero drag condition are described.

22 Claims, 34 Drawing Sheets

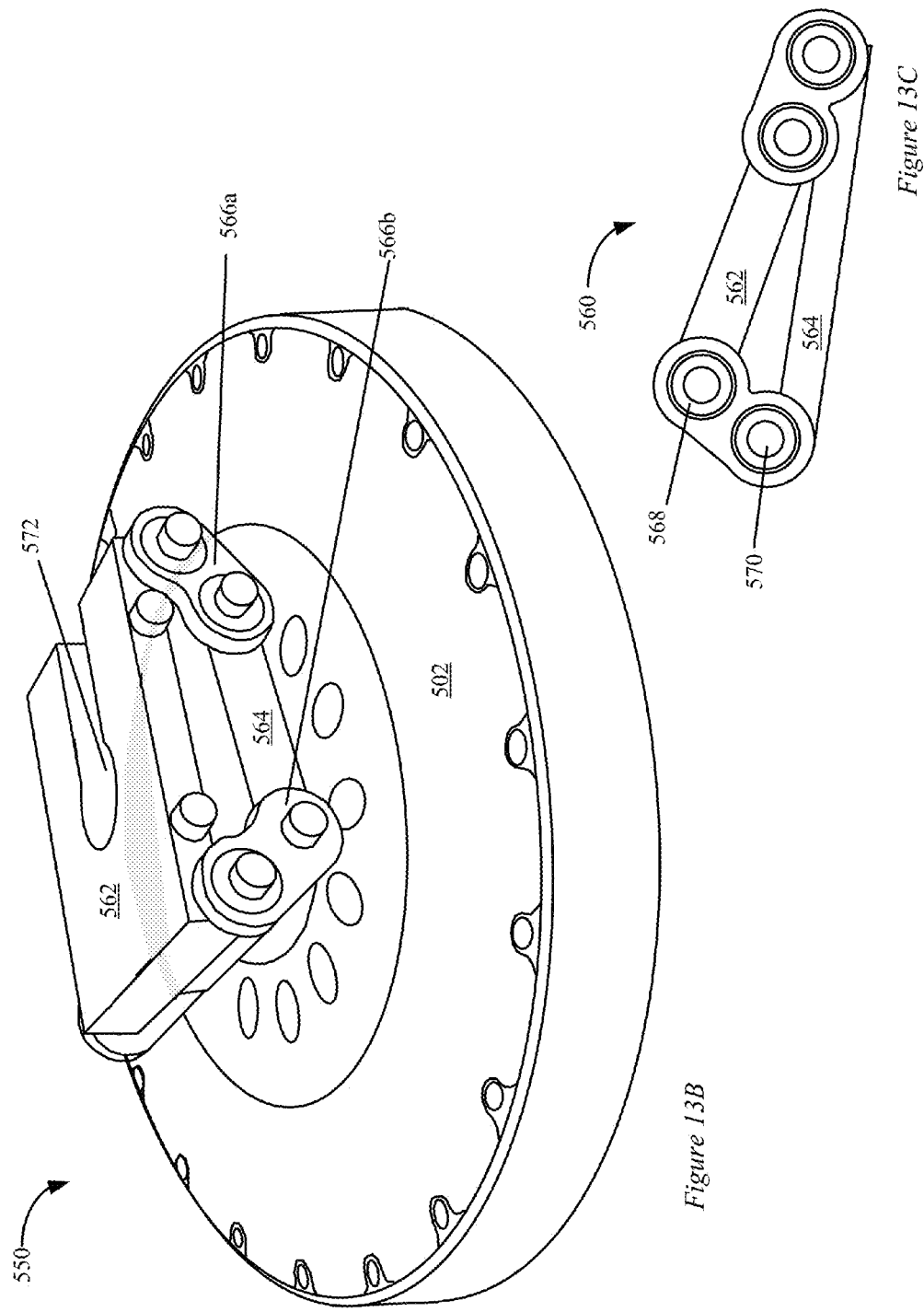

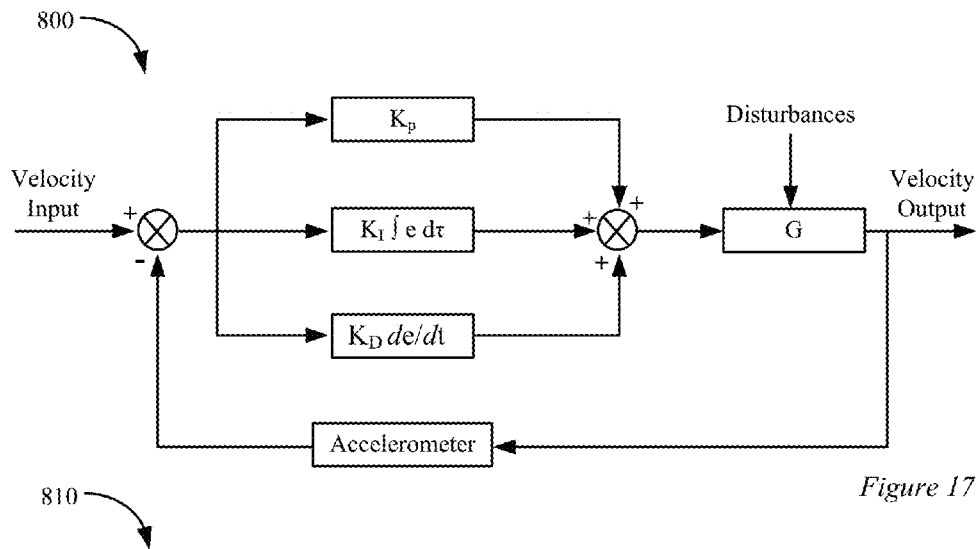
*Figure 17*
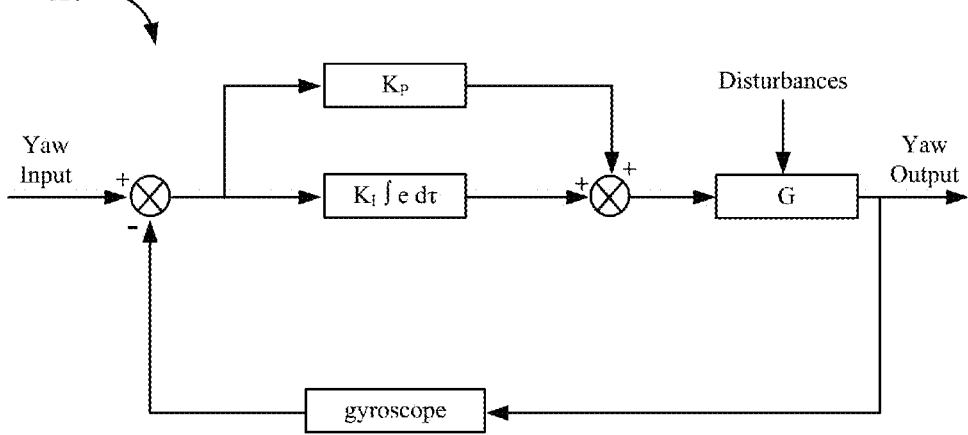
*Figure 18*
*Figure 19*

CONTROL OF TRANSLATING HOVER ENGINES TO OBTAIN ZERO DRAG

CROSS-REFERENCE TO RELATED APPLICATIONS

This applications claims priority under 35 U.S.C. § 119(e) to U.S. Provisional Patent Application No. 62/286,823, filed Jan. 25, 2016, entitled "Transportation Solutions Using Magnetic Field Architecture," by Olynick et al, which is incorporated by reference in its entirety for all purposes herein.

This application is related to U.S. patent application Ser. Nos. 14/737,442, 14/737,444, 14/639,045, 14/639,047 and 14/069,359 and U.S. Provisional Patent Applications Nos. 62/066,891, 62/031,756, 62/011,011 61/977,045 and 61/799,695, each of which are incorporated by reference in their entirety and for all purposes.

FIELD OF THE INVENTION

This invention generally relates to electromagnetic levitation systems, and more particularly to devices, which employ electromagnetic levitation.

BACKGROUND

It is well known that two permanent magnets will attract or repulse one another at close distances depending on how the poles of the magnets are aligned. When aligned with the gravitational force vector, magnetic repulsion can be used to counteract gravity and lift an object. For the purposes of lifting an object and then moving it from one location to another location, magnetic repulsion is either unstable or too stable. In particular, opposing magnets can either be aligned such that the object remains in place but then can't be easily be moved to another location or the magnets can be aligned such that the object is easily moveable but won't remain in place but not both.

Another magnetic repulsion effect is associated with generating a moving magnetic field near a conductive object. When a permanent magnet is moved near a conductive object, such as a metal object, eddy currents are established in the conductive object, which generate an opposing magnetic field. For example, when a permanent magnet is dropped through a copper pipe, an opposing magnetic field is generated which significantly slows the magnet as compared to a non-magnetic object dropped through the pipe. As another example, in some types of electric motors, current is supplied to coils which interact with magnets to move the magnets. The moving magnets interact with the coils to induce eddy currents in the coils which oppose the flow of current supplied to the coils. Magnetic forces including magnetic lift are of interest in mechanical systems to potentially orientate and move objects relative to one another while limiting the physical contact between the objects. One method of generating magnetic lift involves an electromagnetic interaction between moving magnetic fields and induced eddy currents. This approach, using eddy currents, is relatively undeveloped. In view of the above, new methods and apparatus for generating magnetic lift using eddy currents are needed.

SUMMARY

Electromechanical systems using magnetic fields to induce eddy currents in a conductive substrate and generate lift are described. In particular, hover engines are described which rotate a configuration of magnets to induce eddy currents in a conductive substrate where the interaction between the magnets and the induced eddy currents are used to generate lift forces and/or propulsive forces. Vehicles using these mechanisms are described.

The hover engines can translate while a vehicle is translating. When the translational velocity of a hover engine is significant relative to the rotational velocity of the magnets in the hover engine, the hover engine can be controlled to generate a braking force or thrust in the translational direction without having to tilt the hover engine. Further, the hover engine can be controlled to operate at a zero drag condition wherein the magnetic drag in the translational direction is approximately zero for a particular translational velocity, i.e., infinite lift to drag.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

FIG. 13B is an outside perspective view of the hover engine shown in FIG. 13A which includes an attached hinge mechanism in accordance with the described embodiments.

FIG. 13C is a side view of the hinge mechanism shown in FIG. 13B.

FIGS. 17 to 19 are illustrations of block diagrams and equations associated with a guidance, navigation and control system in accordance with the described embodiments.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Magnetic Lift System Overview

With respect to FIGS. 1 to 4C, some general examples and operating principles of a magnetic lift system are described. In particular, a hoverboard system configured to lift and propel a rider is discussed. The hoverboard system can include a hoverboard having hover engines and a substrate on which the hoverboard operates. The substrate can include a conductive portion in which eddy currents are induced. The electromagnetic interaction between the device which induces the eddy currents and the induced eddy currents can be used to generate electromagnetic lift and various translational and rotational control forces.

Figure 1:
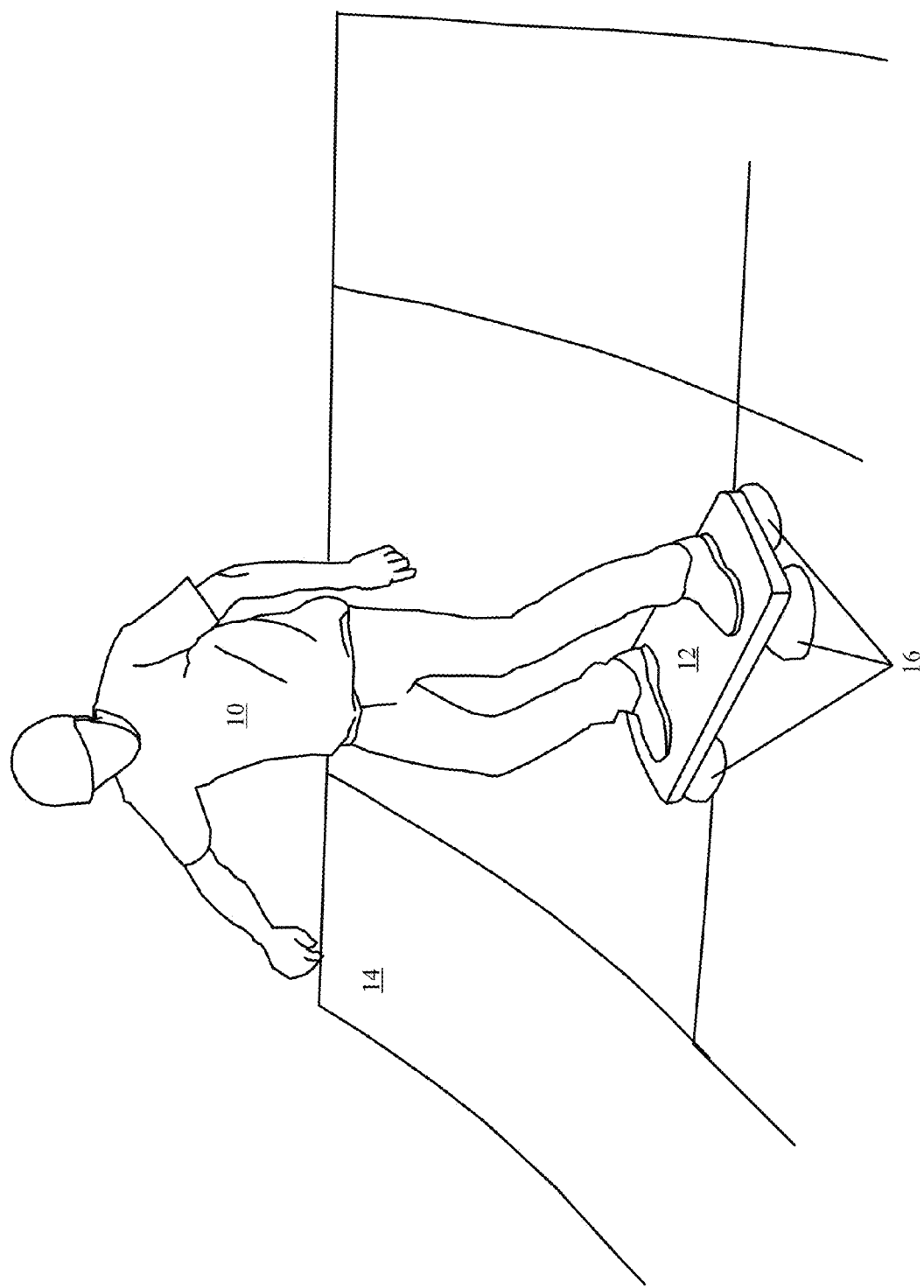
FIG. 1 is an illustration of a person riding a hoverboard in accordance with the described embodiments.

A hoverboard is one example of an electromechanical system which generates forces, such as lift, via an interaction between a moving magnetic field source (e.g., permanent magnets) and induced eddy currents. FIG. 1 is an illustration of a person 10 riding a hoverboard 12. In one embodiment, the hoverboard includes four hover engines, such as 16. The hover engines 16 generate a magnetic field which changes as function of time. The time varying magnetic field interacts with a conductive material in track 14 to form eddy currents. The eddy currents and their associated magnetic fields and the magnetic fields from the hover engine interact to generate forces, such as a lifting force or a propulsive force. Examples of eddy currents which can be generated are described with respect to FIGS. 2 and 3. Lift and drag associated with induced eddy currents is described with respect to FIGS. 4A-4C. Further details of magnet configurations are described below with respect to FIGS. 20 to 27.

In FIG. 1, the track 14 is formed from copper. In particular, three one eighth inch sheets of copper layered on top of one another are used. Other conductive materials and track configuration can be used. For example, a track formed using a top sheet of copper over aluminum sheets or only aluminum sheets can be used. Thus, a track formed from copper sheets is described for the purposes of illustration only.

Curved surfaces may be formed more easily using a number of layered thin sheets. For example, a half-pipe can be formed. In FIG. 1, a portion of a half-pipe is shown. The track 14 can include various sloped and flat surfaces and the example of half-pipe is provided for illustrative purposes only.

The thickness of the conductive material which is used can depend on the material properties of the conductive material, such as its current carrying capacity and the amount of magnetic lift which is desired. A particular hover engine, depending on such factors, as the strength of the output magnetic field, the rate of movement of the magnetic field and the distance of the hover engine from the surface of a track can induce stronger or weaker eddy currents in a particular track material. Different hover engines can be configured to generate different amounts of lifts and thus, induce stronger or weaker eddy currents.

The current density associated with induced eddy currents in the material can be a maximum at the surface and then can decrease with the distance from the surface. In one embodiment, the current density which is induced at the surface can be on the order of one to ten thousand amps per centimeter squared. As the conductive material becomes thinner, it can reach a thickness where the amount of current potentially induced by the hover engine is more than the conductive material can hold. At this point, the amount of magnetic lift output from the hover engine can drop relative to the amount of lift which would be potentially generated if the conductive material was thicker. This effect is discussed in more detail with respect to FIG. 4C.

As the thickness of the material increases, the induced currents become smaller and smaller with increasing distance from the surface. After a certain thickness is reached, additional material results in very little additional lift. For the hover engines used for the hoverboard 12, simulations indicated that using ½ inch of copper would not produce much more lift relative to using ⅜ inch of copper. In general, the simulations indicated, that as the rotation rate of the hover engine is increased, more current was concentrated closer to the surface.

For the device shown in FIG. 1, simulations predicted that using only ⅛ inch sheet of copper would significantly lower the lift versus using a half inch of copper. Finite element analysis to solve Maxwell's equations was used. In particular, Ansys Maxwell (Ansys, Inc., Canonsburg, Pa.).

In various embodiments, the amount of copper which can be used varied depending on the application. For example, for a small scale model of a hoverboard configured to carry a doll, a ⅛ inch sheet of copper may be more than sufficient. As another example, a track with a thinner amount of conductive material can lead to less efficient lift generation as compared to track with a thicker amount of a more conductive material. However, the cost of the conductive material can be traded against the efficiency of lift generation.

A substrate 14 can include a portion which is configured to support induced eddy currents. In addition, it can include portions used to add mechanical support or stiffness, to provide cooling and/or to allow a track portions to be assembled. For example, pipes or fins can be provided which are configured to remove and/or move heat to a particular location. In another example, the substrate 14 can be formed as a plurality of tiles which are configured to interface with one another. In yet another example, the portion of the substrate 14 which is used to support the induced eddy currents may be relatively thin and additional materials may be added to provide structural support and stiffness.

In various embodiments, the portion of the substrate 14 used to support induced eddy currents may be relatively homogenous in that its properties are substantially homogeneous in depth and from location to location. For example, a solid sheet of metal, such as silver, copper or aluminum can be considered substantially homogenous in it's in depth properties and from location to location. As another example, a conductive composite material, such as a polymer or composite, can be used where the material properties on average are relatively homogeneous from location to location and in depth.

In other embodiments, the portion of the substrate 14 used to support the induced eddy currents can vary in depth but may be relatively homogeneous from location to location. For example, the portion of the substrate 14 which supports the eddy currents can be formed from a base material which is doped with another material. The amount of doping can vary in depth such that the material properties vary in depth.

In other embodiments, the portion of the substrate 14 which supports the eddy currents can be formed from layers of different materials. For example, an electric insulator may be used between layers of a conductive material, such as layers of copper insulated from one another. In another example, one or more layers of a ferromagnetic material can be used with one or more paramagnetic materials or diamagnetic materials.

In yet another example, the surface of the substrate 14 which supports the eddy currents can include a surface structure, such as raised or sunken dimples which effect induced eddy currents or some other material property. Thus, from location to location there may be slight variations in material properties but averaged over a particular area the material properties may be relatively homogeneous from location to location.

In one embodiment, the person can control the hoverboard 12 by shifting their weight and their position on the hoverboard. The shift in weight can change the orientation of one or more of the hover engines 16 relative to the surface of the track 14. The orientation can include a distance of each part of the hover engine from the track. The orientation of each hover engine, such as 16, relative to the surface of the track can result in forces parallel to the surface being generated.

The net force from the hover engines 16 can be used to propel the vehicle in a particular direction and control its spin. In addition, the individual may be able to lean down and push off the surface 14 to propel the hoverboard 12 in a particular direction or push and then jump onto to the hoverboard 12 to get it moving in a particular direction.

Figure 2:
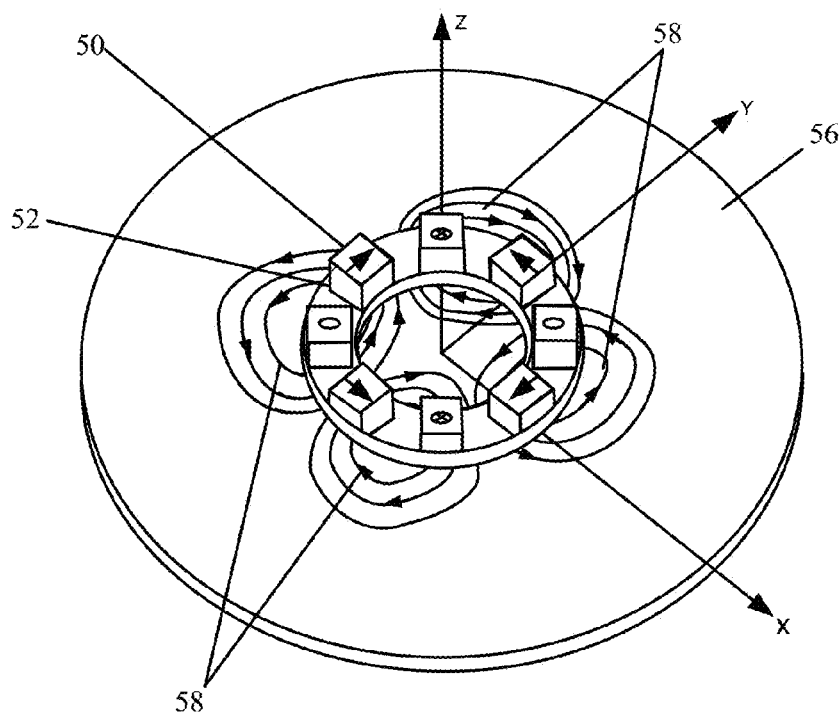
FIGS. 2 and 3 are illustrations of eddy currents generated on a conductive plate in response to arrangements of magnets rotated above the plates in accordance with the described embodiments.
Figure 3:
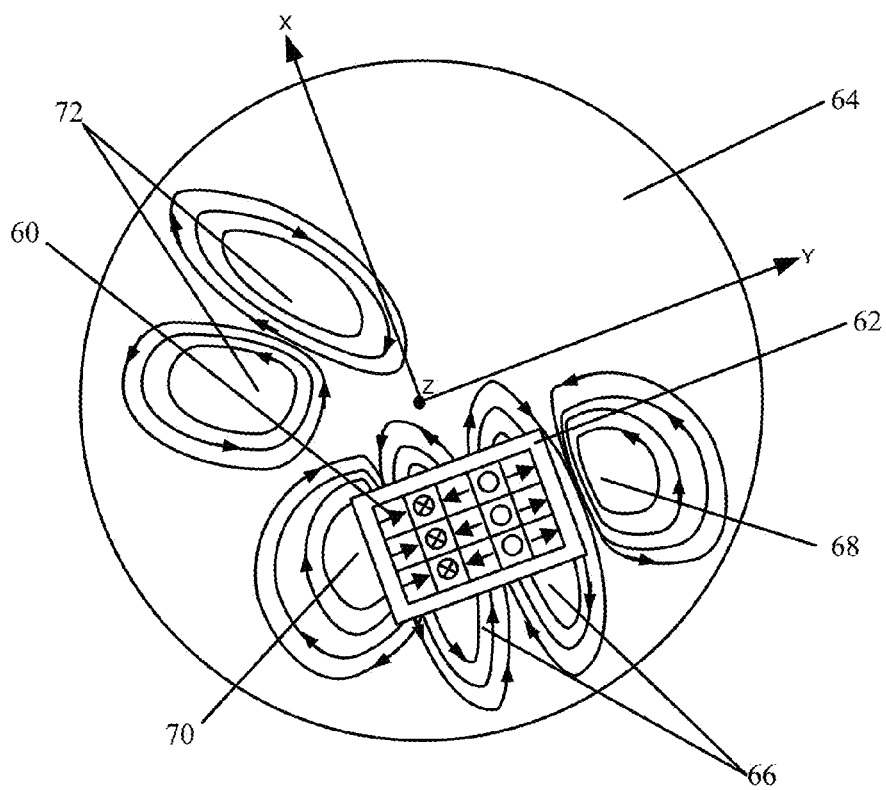

Next, a few examples of magnet arrangements, which can be used with a hover engine, are described with respect to FIGS. 2 and 3. FIGS. 2 and 3 are illustrations of eddy currents generated on a conductive plate in response to arrangements of magnets rotated above the plates. The conductive plate is the portion of the substrate which is configured to support induced eddy currents. The eddy currents and associated forces which are generated were simulated using Ansys Maxwell 3D (Canonsburg, Pa.). In each of the simulations, an arrangement of magnets is rotated at 1500 RPM at ½ inches height above copper plates 56 and 64, respectively. The copper plates are modeled as ½ inch thick. The plate is modeled as being homogeneous in depth and from location to location.

The magnets are one inch cube Neodymium alloy magnets of strength N50, similar magnets can be purchased via K and J magnetics (Pipersville, Pa.). The magnets weigh about 3.6 ounces each. Magnets of different sizes, shapes and materials can be utilized and this example is provided for the purpose of illustration only.

In FIG. 2, eight one inched cube magnets, such as 50, are arranged with an inner edge about two inches from the z axis. The magnets are modeled as embedded in an aluminum frame 52. The arrow head indicates the north pole of the magnets. The polarities of four of the magnets are perpendicular to the z axis. The open circle indicates a north pole of a magnet and circle with an x indicates a south pole of a magnet. A polarity pattern involving four magnets is repeated twice.

In various embodiments, the polarity pattern of the magnets shown in the figure can be repeated one or more times. One or more magnets of different sizes and shapes can be used to form a volume of magnets which match a polarity direction associated with a polarity pattern. For example, two one half inch wide rectangular magnets with a total volume of one cubic inch or two triangular magnets with a total volume of one cubic inch can be aligned in the same direction to provide a polarity direction in a polarity pattern. In the polarity pattern, a magnets with a polarity direction different than an adjacent magnet may touch the adjacent magnet or may be separate from the adjacent magnet.

For a given number of magnets of a particular cubic size, the distance from the z axis of the face of the magnets can be adjusted such that the magnet's edges are touching or are a small distance apart. With this example using eight magnets, an octagon shape would be formed. A configuration of twenty one inch cube magnets arranged around a circle with the polarity pattern is described below. The inner edge of this arrangement of magnets is about 3.75 inches from the rotational axis.

When the magnets are brought together, the magnitude of the lift and drag which is generated per magnet can be increased relative to when the magnets are spaced farther apart. In one embodiment, trapezoidal shaped magnets can be utilized to allow the magnets to touch one another when arranged around a rotational axis. A different trapezoidal angle can be used to accommodate different total number of magnets, such as four magnets (90 degrees), eight magnets (45 degrees), etc.

A combination of rectangular and triangular shaped magnets can also he used for this purpose. For example, triangular magnets can be placed between the cubic magnets shown in FIG. 2. In one embodiment, the polarity pattern for groups of four trapezoidal magnets or combinations of rectangular and triangular magnets can be similar to what is shown in FIG. 2.

When the arrangement of eight magnets is rotated above the copper plate, eddy currents are induced in the copper. In the example of FIG. 2, the simulation indicates four circular eddy currents 56 are generated. The four eddy currents circle in alternating directions and are approximately centered beneath the circulating magnets.

An electromagnetic interaction occurs where the circulating eddy currents generate a magnetic field which repels the arrangement of magnets such that lifting forces and drag forces are generated. As described above, the center position of the eddy currents rotate as the magnets rotate (This rotation is different from the rotation of the circulating current which forms each eddy current). However, the eddy currents are not directly underneath the four magnets aligned with the z axis. Thus, the eddy currents can generate a magnetic field which attracts one of the poles of permanent magnets to which it is adjacent. The attractive force can act perpendicular to the lift to produce drag, which opposes a movement of the magnets. The drag can also be associated with a torque. The drag torque is overcome by an input torque supplied by a motor coupled to the arrangement of magnets.

In a simple example, a current circulating in a circular coil generates a magnetic field which looks like a magnetic field of a bar magnet where the orientation (north/south) depends on the direction of the current. The strength of the magnetic field which is generated depends on the area of the circular coil and the amount of current flowing through the coil. The coil constrains the locations where the current can flow.

In this example, there are not well defined circuits. Thus, one eddy current can interact with an adjacent eddy current. The interaction causes the magnitude of the current to increase at the interface between eddy currents such that magnitude of the current varies around circumference of each eddy current. Further, the current also varies in depth into the material with the greatest current per area occurring at the surface and then decreasing in depth in to the surface.

In addition, unlike circuits with a fixed position, the center of the eddy currents rotate as the magnets inducing the currents rotates. Unlike when a magnetic is moved linearly over a conductive material, separate eddy current forms in front of and behind the magnet. In this example, the four poles (magnets with north and south perpendicular to the surface of the plate) are close enough such that the eddy current formed in front of one pole merges with the eddy current formed behind the next adjacent pole. Thus, the number of eddy currents formed is equal to the number of poles which is four. In general, it was observed for this type of configuration that the number of eddy currents which formed was equal to the number of poles used in the magnet configuration.

Further, material interfaces can affect the induced eddy currents such that an amount of lift and drag which is generated is different near the interfaces as opposed to away from the interfaces. For example, a surface on which eddy currents are induced can have edges where the material which supports the induced eddy currents ends. Near the boundaries, when the magnets approach an edge, the eddy currents tend to get compressed which affects the resultant lift and drag.

In another example, a surface can have interfaces through which there are discontinuities in the conductivity. For example, edges of two adjacent copper sheets used to form a surface may not touch, may partially touch or may be conductively insulated from one another. The discontinuous conductivity can lessen or prevent current from flowing across the interface which affects the lift and drag generated from the induced eddy currents.

In one embodiment, a substrate which supports induced eddy currents can be formed from a number of sheets which are stacked in layers, such ⅛ inch copper sheets stacked on top of one another. A discontinuity may be formed in one layer where two adjacent sheets meet, such as small gaps between the two sheets which reduce the current which flows from a first sheet to an adjacent second sheet. The gaps may allow for thermal expansion and simplify the assembly process. To lessen the effect of the discontinuity, adjacent edges between sheets can be staggered from layer to layer. Thus, the discontinuity at particular location may occur in one layer but not the other adjacent layers.

In some instances, a conductive paste can be used to improve the conductivity between sheets. In another embodiment, adjacent sheets can be soldered together. In yet another embodiment, flexible contacts, which can be compressed and then expand, can be used to allow current to flow between different sheets.

In FIG. 3, a three row by five column array of one inch cube magnets, such as 60, is rotated above a copper plate. The arrays could also be using a single magnet in each row. The magnets are modeled as surrounded by an aluminum frame 62. The magnets in this example are configured to touch one another. A magnet pattern for each row of five magnets is shown. In alternate embodiment, a five magnet pattern of open circle, left arrow (pointing to open circle), circle with an "x", right arrow (pointing away from circle with an x) and open circle can be used. This compares to the left arrow, circle with an "x", left arrow, open circle and right arrow pattern shown in the Figure.

The magnet pattern is the same for each row and the magnet polarity is the same for each column. In various embodiments, a magnet array can include one or more rows. For example, a magnet array including only one row of the pattern shown in FIG. 3 can be used.

Multiple arrays with one or more rows can be arranged on a rotating body, such that the rotating body is balanced. For example, magnet arrays of two, three, four, etc. arrays of the same number of magnets can be arranged on a rotating body. In another embodiment, two or more pairs of magnet arrays with a first number of magnets and two or more pairs of magnets arrays with a second number of magnets can be arranged opposite one another on a rotating body.

In the example of FIG. 3, two eddy currents, 66, are generated under the magnet array and two eddy currents 70 and 68 are formed ahead and behind the array. These eddy currents move with the array as the array rotates around the plate. As the array is moved over the plate 64, eddy currents, such as 72 spin off. The eddy currents 66, 68 and 70 generate magnetic fields which can cause magnetic lift and drag on the array. When two of these types of arrays placed close to one another, the simulations indicated that the eddy current induced from one array could merge with the eddy current induced from the other array. This effect diminished as the arrays were spaced farther apart.

In the examples of FIGS. 2 and 3, the simulations indicated that more lift force was generated per magnet in the configuration of FIG. 3 as compared to FIG. 2. Part of this result is attributed to the fact that a portion of the magnets in FIG. 3 is at a greater radius than the magnets in FIG. 2. For a constant RPM, a greater radius results in a greater speed of the magnet relative to the conductive plate which can result in more lift.

The lift per magnet can be total lift divided by the total magnet volume in cubic inches. For one inch cube magnets, the volume is one cubic inch. Thus, the total number of magnets is equal to the volume in cubic inches. Hence, the use of lift force per magnet in the previous paragraph. The use of total lift divided by the magnet volume of a magnet arrangement provides one means of comparing the lift efficiency of different magnet arrangements. However, as noted above, the speed of the magnet relative to the substrate, which is a function of radius and RPM, effects lift and hence may be important to consider when comparing magnet configurations.

In FIGS. 2 and 3, a portion of the magnet poles in the magnet polarity pattern are aligned such that the poles are parallel to an axis of rotation of the magnet carrier (The poles labeled with "x" or "o" in the Figures). When the bottom of a magnet carrier is parallel to a surface which supports the induced eddy currents, the portion of the magnet poles and the axis of rotation are approximately perpendicular to the surface.

In this configuration, to interact with a surface, a magnet carrier can be rotated on its side, like a tire riding on a road, where the axis of rotation is approximately parallel to the surface. In particular embodiments, a mechanism, such as an actuator, can be provided which can dynamically rotates one or more of the magnet poles (again, "x" and "o" labeled magnets) during operation. For example, the magnet poles shown in FIGS. 2 and 3 may be rotatable such that they can be moved from an orientation where they are perpendicular to the surface as shown in FIGS. 2 and 3 to an orientation where they are parallel to the surface and back again. When the magnets are turned in this manner, the amount of lift and drag which are generated can be reduced. In additional embodiments, fixed magnet configurations can be utilized where the magnet poles shown in FIGS. 2 and 3 are rotated by some angle between zero and ninety degrees relative to their orientation in the FIGS. 2 and 3.

Figure 4A:
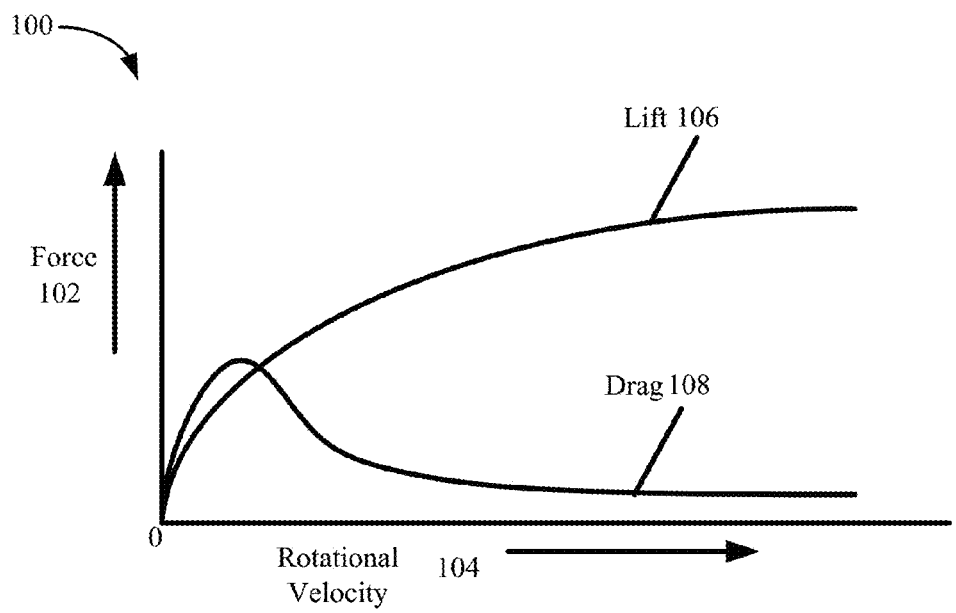
FIG. 4A is a plot of lift and drag curves associated with an arrangement of rotating magnets in accordance with the described embodiments.

FIG. 4A includes a plot 100 of lift 106 and drag 108 curves associated with an arrangement of rotating magnets in accordance with the described embodiments. The curves are force 102 versus rotational velocity 104. The curves can be determined via experimental measurements and/or simulations. It is noted the magnetic lift and drag is separate from any aerodynamic lift and drag which may be associated with the rotation of magnet arrangement associated with hover engine.

Although not shown, an amount of torque can be determined and plotted. As shown in FIG. 2, an array of magnets can be radially symmetric. In some instances, such as when a radially symmetric array is parallel to the conductive substrate, the net drag force may be zero. Nevertheless, a torque which opposes the rotation of the array is generated. The rotational input from a motor can be used to overcome the torque.

As shown in FIG. 4A, the magnetic drag increases as velocity increases, reaches a peak and then starts to decrease with velocity. Whereas, the magnetic lift increases with velocity. The velocity can be the velocity of the magnets relative to the surface which induces the eddy. When the magnets are rotating, this velocity is product of a distance from the axis of rotation times the angular velocity. The velocity can vary across a face of a magnet as distance from the axis of rotation varies across the face of the magnet.

In various simulations of a magnet configuration shown in FIG. 3, the most drag was observed to occur between 250 and 350 RPM. However, the amount of drag including its peak can depends on such variables as the size and the shape of the magnets, a distance of the magnets from the substrate in which the eddy currents are induced, a speed of the magnets relative to the substrate which changes as a function of radius and a thickness of the substrate and a strength of the magnets. Also, for an arrangement of a plurality of magnets, the arrangement of their poles and spacing relative to one another can affect both the lift and drag, which is generated. Thus, the value range is provided for the purposes of illustration only.

Figure 4B:
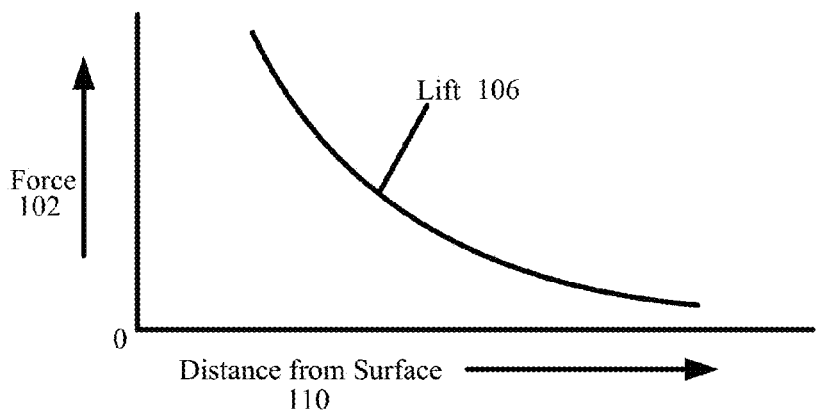
FIG. 4B is a plot of lift associated with an arrangement of rotating magnets as a function of distance from a conductive substrate in accordance with the described embodiments.

FIG. 4B is a plot of force 102 associated with an arrangement of rotating magnets as a function of distance 110 from a conductive substrate. In this example, a configuration of magnets similar to shown in FIG. 3 was simulated. The plot is based upon a number of simulations at a constant RPM. The lift appears to follow an exponential decay curve as the distance from the surface 110 increases.

Figure 4C:
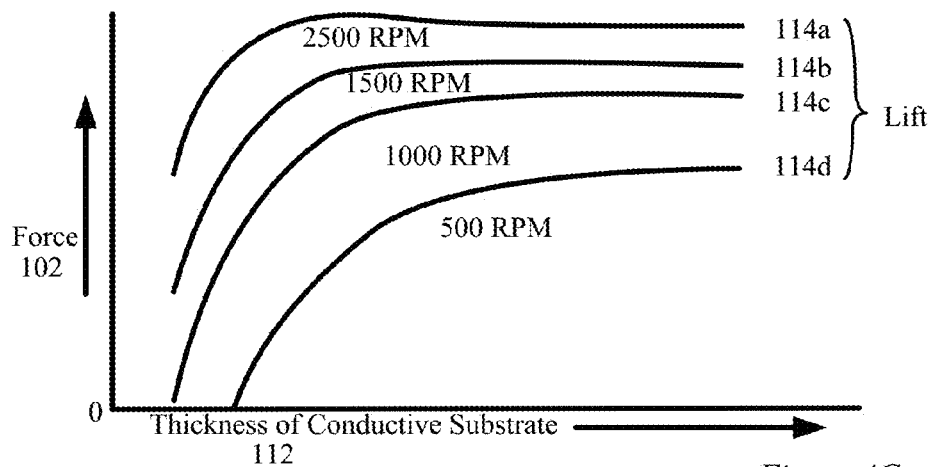
FIG. 4C is a plot of lift curves associated with an arrangement of rotating magnets as a function a thickness of a conductive substrate and RPM in accordance with the described embodiments.

FIG. 4C is a plot of lift curves associated with an arrangement of rotating magnets as a function a thickness of a conductive substrate and RPM. In this example, a configuration similar to what is shown in FIG. 3 was used. The conductive substrate is copper and thickness of the copper is varied between 0.05 and 0.5 inches in the simulation.

The simulations predicted that the amount of generated lift begins to decrease after a certain threshold thickness of copper is reached and is relatively constant above the threshold. The location of the threshold varies as a function of RPM. It may also vary according to the magnet configuration. In one simulation, negative lift was predicted, i.e., an attractive force was generated when the thickness was thin enough.

Magnetic Propulsion

In this section, configurations of magnet carriers, which generate propulsive and lift forces, are described. In particular embodiments, an orientation of one or more magnet carriers relative to a substrate can be used to generate propulsive and/or control forces. Other mechanisms of propulsion are possible, alone or in combination with controlling the magnet carrier orientation to generate propulsive and directional control forces. Thus, these examples are provided for the purpose of illustration only and are not meant to be limiting. For example, the rotation rate of one or more magnet carriers can be varied to provide yaw control.

Figure 5A:
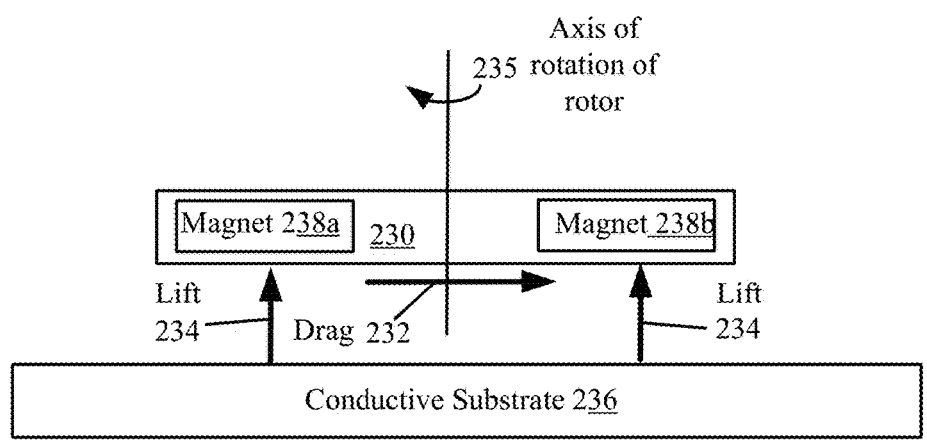
FIGS. 5A, 5B, 6 and 7 are illustrations of magnet carriers tilted relative to a conductive substrate and associated forces which are generated in accordance with the described embodiments.

In FIG. 5A, a magnet carrier 230 is shown in a neutral position. The magnet carrier includes magnets, such as 238a and 238b. In the neutral position, the lifting forces 234 on average over time are equal across the bottom surface of the magnet carrier 230. Further, the net drag forces 232 acting on the magnet carrier 230 are balanced (While rotating, the magnets on the magnet carrier generate a magnetic field which is moved through the conductive substrate 236. The eddy currents formed in the substrate as a result of the moving magnetic field resist this movement, which can act as a drag force 232 on the magnet carrier 230). With imbalances due to lift and drag balanced, the magnet carrier 230 will substantially remain in place of over the conductive substrate.

Small imbalances may exist, which cause the magnet carrier to move in one direction or another. For example, local variations in material properties in the conductive substrate 236 can cause small force imbalances. As another example, the dynamic vibration of the magnet carrier 230, such as from adding or removing loads can cause small force imbalances. However, unless the small force imbalances are biased in a particular direction, the magnet carrier will remain relatively in the same location (i.e., it might move around a particular location in some manner).

If the rotational momentum is not balanced, the magnet carrier may rotate in place. A vehicle can include multiple magnet carriers which are counter rotating to balance the rotational forces. Further, as will be described below in more detail, the orientation of a magnet carrier can be controlled to generate a moment around a center of mass of a vehicle, which allows the rotation of a vehicle to be controlled.

Figure 5B:
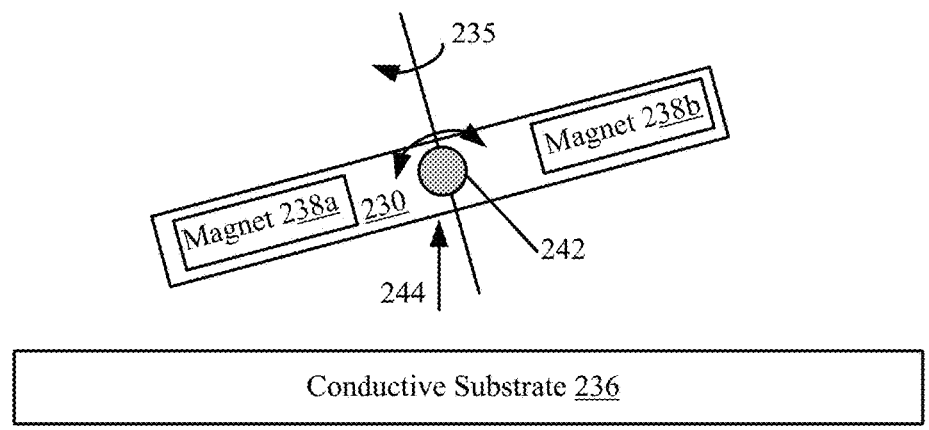

FIG. 5B shows the magnet carrier 230 in a tilted position. The magnet carrier 230 has been rotated around an axis 242 which is perpendicular to the axis of rotation 235 of the magnet carrier 230. When the magnet carrier 230 is tilted, more drag is generated on the side of the magnet carrier 230 closest to the substrate 236. As is described in more detail below, the drag typically increases when the magnets are brought closer to the substrate. The drag imbalance on the different sides of the magnet carrier causes a thrust to be generated mostly in the direction of the tilt axis 242, i.e., into or out of the page. For some magnet and system configurations, the lift 244 can remain relatively constant or even increase as a function of tilt angle, i.e., lift 244 can be greater than lift 234. The amount of thrust may increase when the tilt angle is first increased. The amount of tilt which is possible can be limited to prevent the magnet carrier 230 form hitting the substrate 236.

Figure 6:
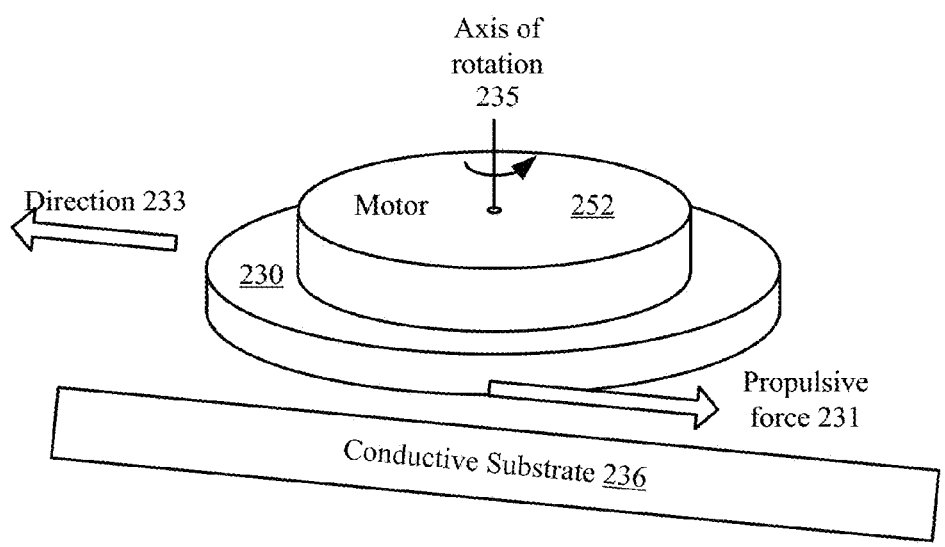

FIG. 6 shows an example of a hover engine including a magnet carrier 230 and motor 252 climbing an inclined substrate 236. The hover engine is tilted to generate a propulsive force 231 which moves the hover engine in direction 233 up the included surface. In one embodiment, the magnitude of the propulsive force 231 can be sufficient for a hover engine to lift a payload in a vertical direction. For example, the conductive substrate 236 can be aligned vertically and the hover engine can be configured to climb vertically and carry its weight and a payload up the wall.

Figure 7:
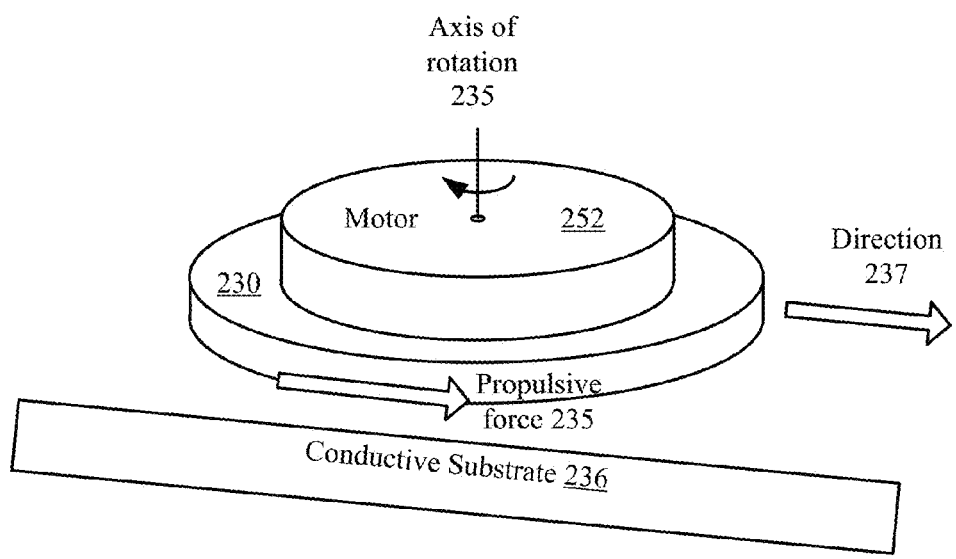

FIG. 7 shows an example of a hover engine braking as it descends down an incline. In FIG. 7, the hover engine, which includes motor 252 and magnet carrier 230, is moving down a sloped substrate in direction 237. The hover engine is outputting a propulsive force 235 which is pushing the hover engine up the incline opposite the direction of movement 237. The braking force slows the descent of the hover engine down the inclined substrate. In a particular embodiment, a hover engine can be configured to output a sufficient force to allow it to hold its position on an inclined surface, i.e., the force output from the hover engine balances the gravitational forces. In general, hover engines can be configured to output forces in a direction of movement for propulsion or opposite the direction of movement for braking.

Figure 8A:
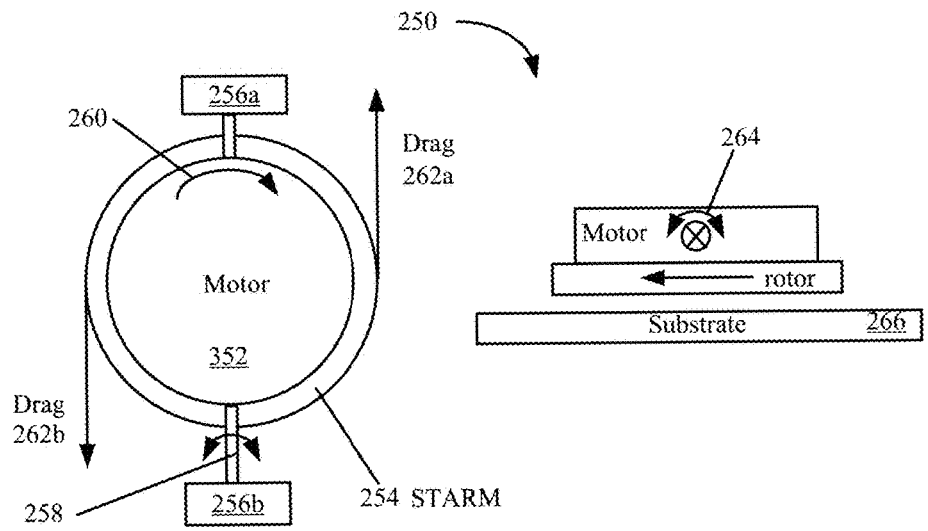
FIGS. 8A to 8C are illustrations force imbalances resulting from tilting a hover engine in accordance with the described embodiments.
Figure 8B:
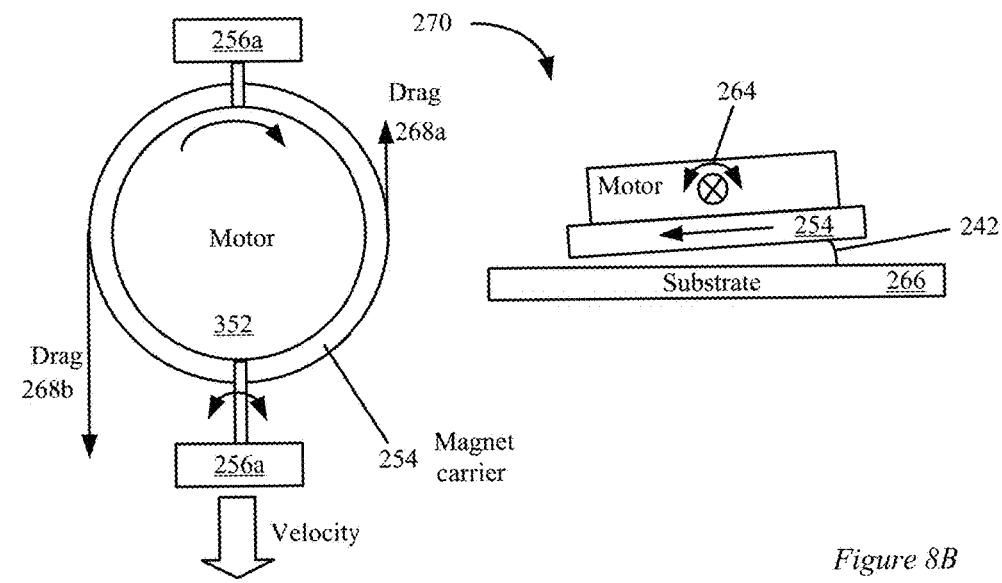
Figure 8C:
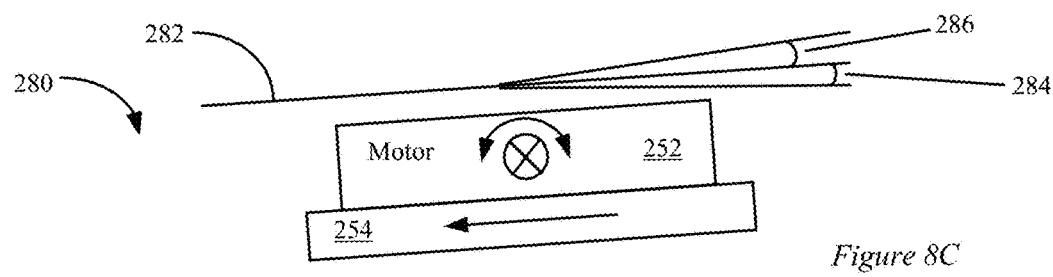

FIGS. 8A, 8B and 8C are block diagrams which are used to discuss more details associated with hovering and propulsive effects from rotating arrangements of magnets used in a hover engine. In FIG. 8A, a hover engine includes a motor 252 is coupled to a magnet carrier 254. The magnet carrier 254 is coupled to the motor 252 and the motor 252 is coupled to a rotatable member 258. The rotatable member 258 is coupled to anchors 256a and 256b. The combination of the rotatable member 258 and the anchors 256a and 256b can be configured to constrain a range of rotation of the rotatable member. For example, the rotatable member 258 may be allowed to rotate through some angle range 264 around its axis.

The rotatable member 258 can be configured to receive and input torque from some mechanism. For example, in one embodiment, a mechanical linkage can be provided which allows a user to supply a force. The force can be converted into torque which causes the rotatable member 258 and hence the motor 252 and the magnet carrier 254 to rotate.

In another embodiment, an actuator can be used to supply the torque to rotate rotatable member 258. An actuation of the actuator can cause the motor 252 and magnet carrier 254 to tilt relative to the substrate 266. The actuator can include a servo motor which receives control commands from a controller. In one embodiment, the actuator can include its own controller which receives control commands from a separate processor, which is part of the control system.

In yet another embodiment, a hover engine can be configured to receive an input force from a user and can include an actuator. The actuator can be used to change a position of the magnet carrier, such as returning it to a designated position after a user has tilted it. In another operation mode, the actuator can be used to provide automatic control around some tilt position initiated by user via an input force.

It yet another embodiment, the actuator can be used to provide automatic controls which may be used to correct a control input from a user. For example, if the control system detects the magnetically lifted device is an unstable position as a result of a user input, the control system can control one or more magnet carriers to prevent this event from happening. A magnetic lifting device, such as hoverboard, can include one or more on-board sensors used to make these corrections.

A magnetically lifted device may also include one or more weight sensors for determining a weight distribution of a payload. The weight distribution associated with the device and payload can affect the response of the device in response a command to change an orientation of the device via some mechanism, such as a tiltable hover engine. For example, the weight distribution associated with a payload can affect the magnitude of rotational moments. Thus, knowledge of the weight distribution may be used to more finely tune the commands used to control the orientation of the magnet carrier, such as selecting which magnet carrier to actuate and an amount to actuate it.

When the magnet carrier 254 and motor 252 are rotating, a rotation of the rotatable member 258 changes the angular momentum of the magnet carrier and the motor. It can also change the magnetic forces acting on the magnet carrier 254 as the magnetic forces vary with the distance of the magnets in the magnet carrier 254 from the substrate 266. Therefore, the amount of torque needed to rotate the member 258 can depend on the moment of inertia associated with the magnet carrier 254 and motor 252, how fast the magnet carrier 254 and motor 262 are spinning and the height of the magnet carrier 254 above the substrate 266. The height of the magnet carrier above the substrate can depend on 1) its rotational velocity, which affects how much lift is generated, and 2) a payload weight and 3) how the payload weight is distributed on the device. The height of the magnet carrier above the substrate can vary for different portions of the magnet carrier and from magnet carrier to magnet carrier when a device includes multiple magnet carriers.

In the example of FIG. 8A, the magnet carrier 254 is approximately parallel to the substrate 266. The magnetic drag, such as 262a and 262b, opposes the rotation of the magnet carrier 254. The motor 252 is configured to rotate in the clockwise direction 260. Thus, the drag torque is in the counter clockwise direction. Power is supplied to the motor 252 to overcome the drag torque.

When the magnet carrier is parallel to the substrate 266, the magnetic drag is balanced on all sides of the magnet carrier 254. Thus, there is no net translational force resulting from the magnetic drag.

In FIG. 8B, the magnet carrier 254 is in a titled position 270. Thus, one side of the side of magnet carrier 254 is closer to the substrate 266 and one side of the magnet carrier 254 is farther away from the substrate 266. The magnetic interaction between the magnets in the magnet carrier 254 and substrate decreases as a distance between the magnets in the magnet carrier and substrate 266 increases (As shown in the Figures below, the magnitude of the interactions vary non-linearly with the distance from the substrate.) Thus, in tilted position 270, the drag force 268b is increased on one side of the magnet carrier 254 and the drag force 268a is reduced on the opposite side of the magnet carrier 254 as shown in FIG. 8B. The drag force imbalance creates traction, which causes a translational force to be generated approximately in the direction of the axis of rotation of the rotational member 258.

When the magnet carrier 254 is initially tilted, the translational force can result in an acceleration of the magnet carrier 124 in the indicated direction and hence change in velocity in the indicated direction. In particular embodiments, with one or more magnet carriers configured to generate translational forces, a device can be configured to climb. In another embodiment, the device may be configured to maintain its position on a slope while hovering such that the gravitational forces acting on the device are balanced by the translational forces generated by the device and its associated hover engines.

A configuration and operational mode where a position of a device, such as a hoverboard, is maintained on a sloped substrate may be used as part of a virtual reality system where a user wears a virtual reality headset. Via the headset, the user may only see images generated by the headset or may see images generated by the headset in conjunction with the local surrounding visible to the user. A virtual reality headset may be used to generate images of a user moving through some terrain, likes a snowy slope, while the hovering device on which the user is riding moves side to side and forward and back on the sloped substrate. The sloped substrate may provide the user with the feeling of moving on a tilted slope while the virtual reality images may provide the visual imagery associated with movement. Fans may be used to add an additional sensation of movement (e.g., the feeling of wind on the user's skin).

The device can have sufficient propulsive ability to allow it to hold its position on the slope against the force of gravity. For example, the device can be moved side to side while it maintains its position on the slope. Further, the device may be able to move downwards on the slope and then climb upwards on the slope against gravity. In some instance, the climbing can be done while the device's orientation remains relatively unchanged, i.e., the device doesn't have to be turned around to climb. This maneuver can be accomplished by changing an orientation of the hover engines relative to the substrate which supports the induced eddy currents. These control functions will be discussed in more detail as follows.

Returning to FIGS. 8A and 8B the amount of tilt in a particular direction can affect the amount of force imbalance and hence the magnitude of the acceleration. Because the magnetic drag is function of the distance of the magnets from the substrate, the magnetic drag increases on the side closer to substrate and decreases on the side father away from the substrate. As the magnetic forces vary non-linearly with the distance of the magnets from the surface, the amount of translational forces which are generated may vary non-linearly with the tilt position of the magnet carrier.

After a magnet carrier 254 (or both the magnet carrier 254 and motor 252) has been rotated via member 258 in a counter clockwise direction and the magnet carrier has started translating in a first direction, an input torque can be provided which tilts the magnet carrier in a clockwise direction to reduce the amount of translational force which is generated by the magnet carrier. When the magnet carrier is tilted past the horizontal in the clockwise direction, the magnet carrier may generate a translational force which is in an opposite direction of the first direction. The translational force opposing the direction of motion can slow the magnet carrier and bring it to rest. If desired, the translational force can be applied such that the hoverboard stops and then the magnet carrier can begin to translate in an opposite direction.

FIG. 8C is a side view of a hover engine 280 coupled to a tilt mechanism in a tilt position. The hover engine includes a motor 252 and a magnet carrier 254 which can be positioned over the substrate 266 as shown in FIGS. 25B and 25C. In one embodiment, the mechanism can include a minimum tilt off set angle 284. The minimum tilt off set angle 284 in this example is between the horizontal and line 282. The tilt range angle 286 is the angle amount through which the hover engine may rotate starting at the minimum tilt off set angle 284. The tilt mechanism can include one or more structures which constrain the motion of the tilt mechanism to the tilt angle range.

When the minimum tilt off set angle 284 is zero and the magnet carrier 254 is parallel to the substrate 266, the magnet carrier 254 may not generate a net translation force. A device to which a magnet carrier is coupled can be tilted. Therefore, the angle of the magnet carrier relative to the substrate can depend on the orientation of the magnet carrier relative to some reference system associated with the device and the orientation of the device relative to the substrate where both orientations can change as a function of time. Thus, in some instances, a translation force can be generated even when the minimum tilt off-set is zero. When the minimum tilt off set angle is greater than zero, the magnet carrier may generate a net translational force at its minimum position in a particular direction. When the minimum tilt off set angle is less than zero, then during the tilt angle range the magnitude of the force may be go to zero and the direction of the force which is generated can also change.

In some embodiments, the net minimum force generated by one hover engine can be balanced in some manner via translational forces associated with other hover engines. For example, as shown, two hover engines can be tilted to generate forces in opposite directions to cancel one another. Thus, although the net force for a single hover engine may be greater than zero at its minimum tilt off set angle position, it can be balanced by forces generated from another magnet carrier such that the net force acting on the device is zero.

The forces which are generated from a tilted magnet carrier can vary non-linearly with angle of the hover engine relative to the substrate. Thus, the change in force which is generated as a function of a change in angle can vary non-linearly. By utilizing, a minimum tilt angle offset, the hover engine can be configured to output more or less force in response to a change in a tilt angle over a selected tilt angle range. In this manner, the control characteristics of the device can be adjusted.

In one embodiment, the tilt mechanisms can include an adjustable tilt off set mechanism that allows the minimum tilt off set angle to be manually set. For example, a rotatable member with a protuberance can be provided where the protuberance is configured to impinge on a screw at one end of its range of rotation. As the screw is unscrewed, the range of rotation of the rotatable member can be decreased and the minimum tilt off set angle can be increased and vice versa. Using the adjustable tilt off set mechanism, a user or operator may be able to manually adjust the handling characteristics of the device.

Figure 9A:
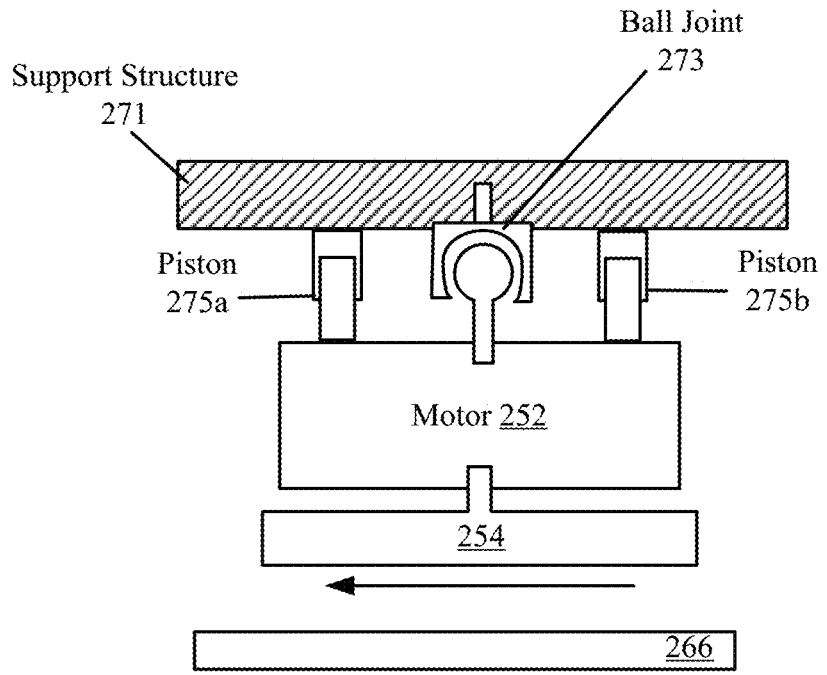
FIGS. 9A to 9B are illustrations of two orientation control mechanisms for a hover engine in accordance with the described embodiments.

Next, another example of a magnet carrier which can be tilted through multiple degrees of freedom is described. In FIG. 9A, hover engine including a magnet carrier 254 coupled to a motor 252 is shown. The hover engine is coupled to a support structure 271 via a ball joint 273. Two pistons, 275a and 275b, are shown which are coupled to the hover engine and the support structure 271. The pistons, 275a and 275b, can be used to push the hover engine downward and change a tilt angle of the magnet carrier 254 relative to a substrate 266. A plurality of different pistons can be used to tilt the motor in a plurality of different directions. Other types of actuators can be used which generate a downward force on the hover engine to tilt the magnet carrier 254 and the example of a piston for the purposes of illustration only.

Figure 9B:
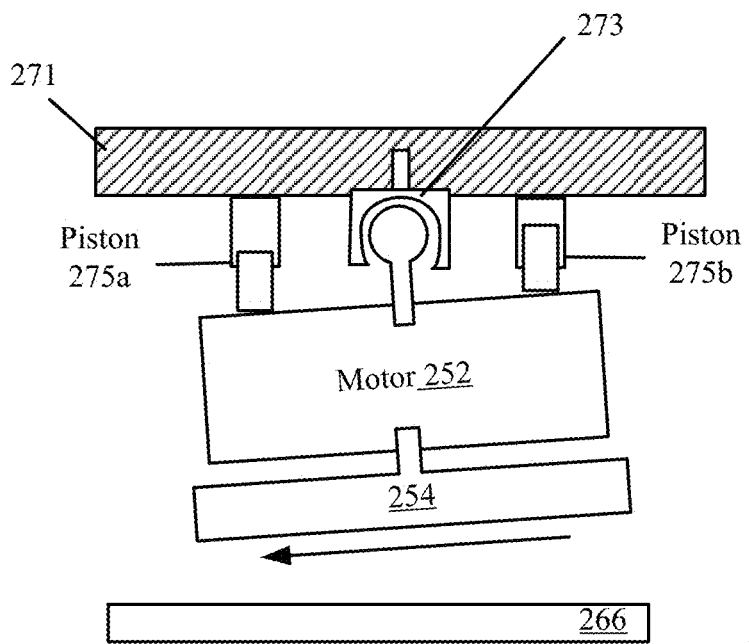

In FIG. 9B, a first piston 275A is shown extended downwards, which tilts the motor 252 and magnet carrier 255 downwards on one side. To bring the motor 252 back to a horizontal position, the second piston 275b can be extended downwards which causes the first piston to shorten 275a. To tilt the motor 252 and magnet carrier 254 in the opposite direction, the second piston 275b can be extended a greater amount, which forces the first piston to shorten 275a. In various embodiments, multiple pairs of pistons can be used to tilt the motor in different directions and change a direction in which a force is generated as a result of tilting the magnet carrier. The pistons can be coupled to the motor and/or the support structure via an appropriate joining mechanism which may possess some rotational degrees of freedom.

Vehicles Including Flight Data

Figure 10A:
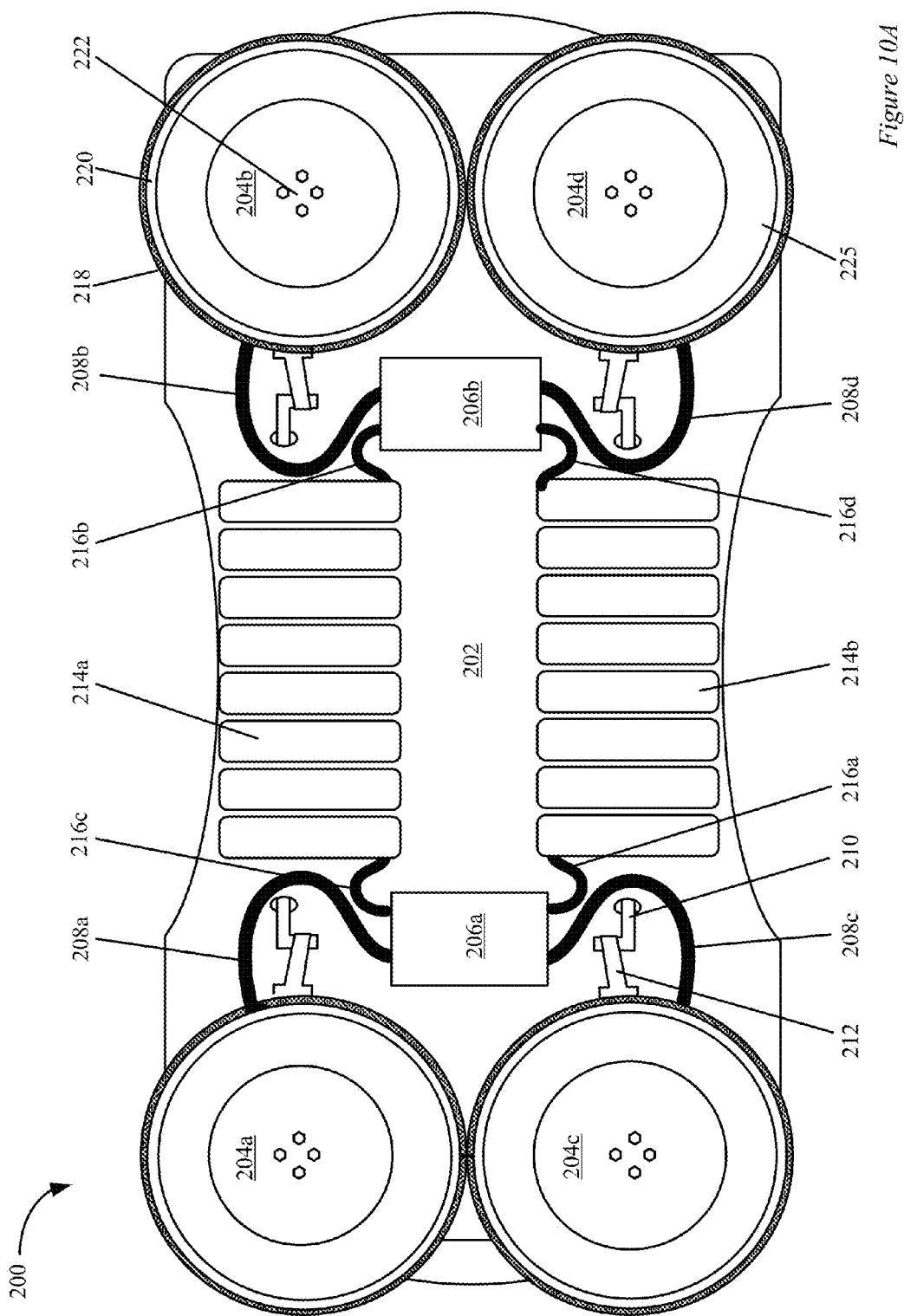
FIGS. 10A, 10B and 10C are a bottom, top and side view of a battery powered hoverboard in accordance with the described embodiments.

In this section, flight data including performance from two vehicles is presented. First, a description of the vehicles is presented then the test results are shown. FIG. 10A is a bottom view of vehicle 200. In FIG. 10A, the vehicle 200 includes four hover engines, 204a, 204b, 204c and 204d. The hover engines are of equal size and use similar components, i.e., similar motor, number of magnets, magnet carrier diameter, etc. The dimensions of the vehicle 200 are about 37.5 inches long by 4.5 inches high by 18.5 inches wide. The weight of the vehicle unloaded is about 96.2 pounds.

Each hover engine includes a magnet carrier, such as 225, with a motor (not shown) and engine shroud 218 with a gap between the shroud 218 and magnet carrier 225 to allow for rotation. The magnet carrier 225 is mechanically connected to the motor via fasteners 222. The motor, which mount below the magnet carriers in the drawing, provides the input torque which rotates the magnet carrier. In alternate embodiments, a single motor can be configured to drive more than one magnet carrier.

The magnet carriers, such as 225 are 8.5 inches in diameter. The magnet carriers are configured to receive sixteen one inch cube magnets. Thus, the total volume of the magnets on the vehicle is sixty four cubic inches. As will be described below, other magnet carrier designs with different dimensions carrying different magnet volumes can be used.

Figure 20:
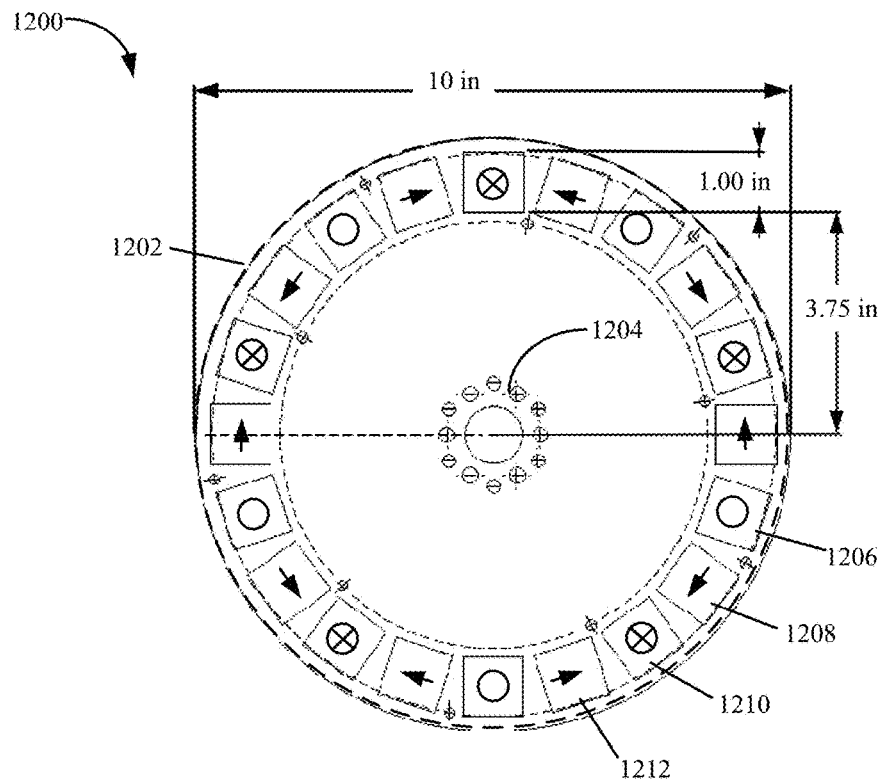
FIGS. 20 and 21 are top and perspective views of a rotor including cubic magnets arranged in a circular pattern in accordance with the described embodiments.

The sixteen magnets on each magnet carrier were arranged in a circular pattern similar to what is shown in FIG. 20. The polarity arrangement pattern is similar to what is shown in FIG. 20 except the pattern including two guide magnets and two pole magnets is repeated one less time. As described below, other polarity arrangement patterns are possible and this example is provided for the purposes of illustration only.

Neodymium N50 strength magnets are used. The magnets each weigh about 3.6 ounces (force). Therefore, the total magnet weight for one hover engine is about 3.6 pounds (force). Other magnet types and strengths can be used and N50 magnets are provided for the purposes of illustration only.

In one embodiment, the motors can be a q150 DC brushless motor from Hacker Motor (Ergolding, Germany). The motor has a nominal voltage of 50 Volts and a no load current of 2 Amps. The weight is about 1995 grams. The speed constant is about 52.7/min. The RPM on eta max is about 2540. The torque on eta max is about 973.3 N-cm. The current on eta max is about 53.76 Amps.

The hover engines each have a shroud, such as 218. The shroud 218 partially encloses the magnet carrier, such that a bottom of the magnet carrier is exposed. In other embodiment, the shroud can enclose a bottom of the magnet carrier. A tilt mechanism 212 is coupled to the shroud 218 of each hover engine. The tilt mechanism 212 is coupled to a pivot arm 210. The hover engines 204a, 204b, 204c and 204d are suspended beneath a support structure 202. The pivot arms, such as 210, extend through an aperture in the support structure.

The motors in each hover engine can be battery powered. In one embodiment, sixteen battery packs are used. The batteries are VENOM 50C 4S 5000MAH 14.8 Volt lithium polymer battery packs (Atomik RC, Rathdrum, Ind.). Each battery weighs about 19.25 ounces. The dimensions of the batteries are 5.71 inches by 1.77 inches by 1.46 inches. The minimum voltage is 12 V and the maximum voltage is 16.8 V.

The sixteen batteries are wired together in four groups of four batteries and each coupled to motor electronic speed controllers, such as 206a and 206b via connectors 216a and 216b to four adjacent battery packs. The four batteries in each group are wired in series in this example to provide up to about 60 V to the electronic speed controllers. Connectors 216c and 216d each connect to four batteries and an electronic speed controller. Two electronic speed controllers are stacked behind 206a and 206b. Thus, four brushless electronic speed controllers, one for each motor, are used. In one embodiment, the electronic speed controllers are Jeti Spin Pro 300 Opto brushless Electronic Speed Controllers (Jeti USA, Palm Bay, Fla.).

Figure 10B:
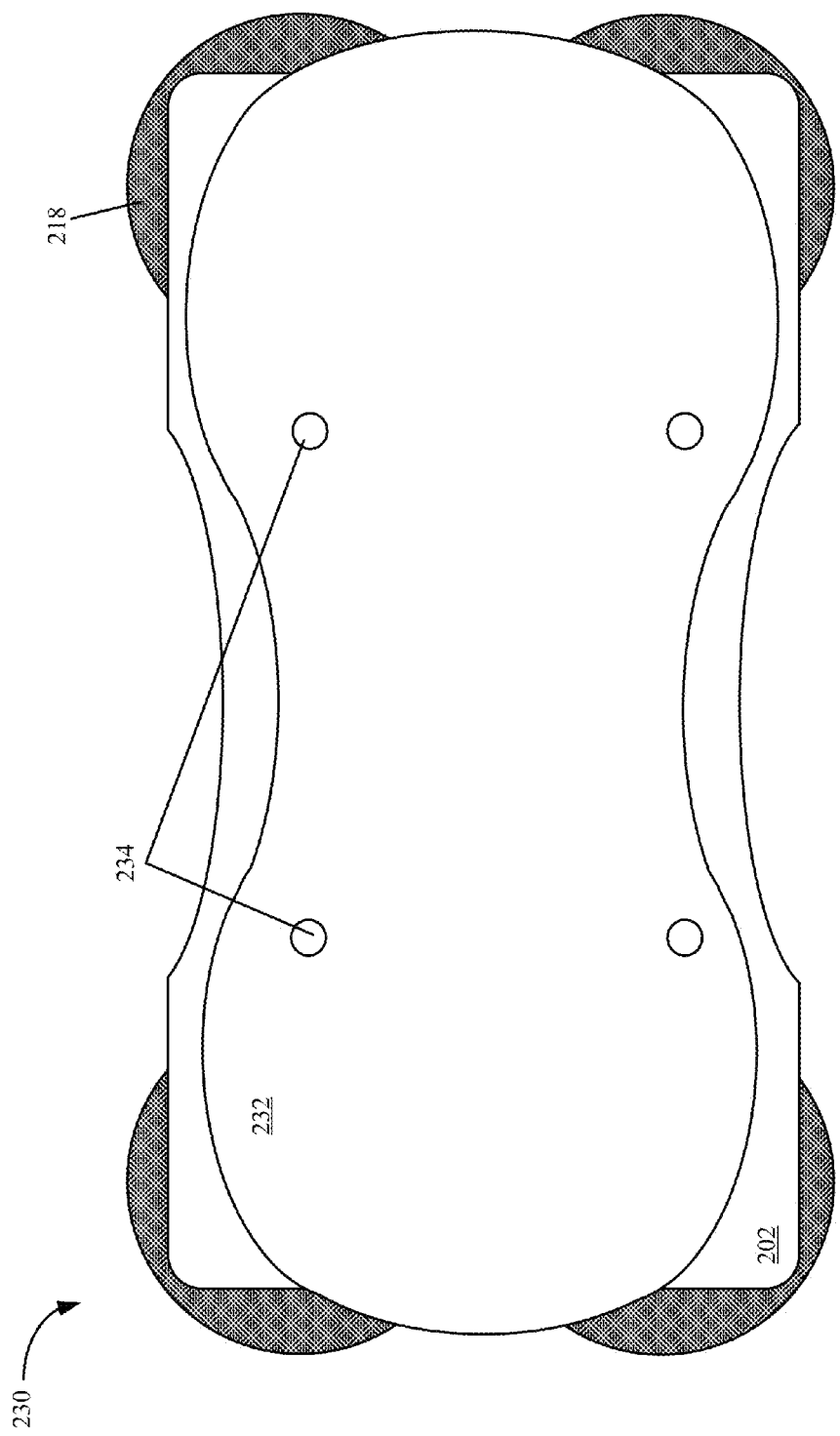

FIG. 10B is a top view 230 of the hoverboard. The hover engines are suspended beneath the central support structure 202 as described above with respect to FIG. 10A. The shrouds, such as 218, of the hover engines extend slightly beyond an edge of the support structure 202. The shrouds can be made strong enough to support a weight of a person without impinging any underlying parts, such as a rotating magnet carrier.

A rider platform 232 is mounted above the support structure. The top of the rider platform 232 may substantially flat, i.e., a minimal amount of protuberances. The protuberances may be minimized to allow a rider to move around the rider platform without tripping. Although, as described below, the rider platform may be configured to bend and flex and hence may be curved. In one embodiment, the rider platform may include foot straps for securing a rider's feet in place.

Some examples of materials which may be used to form support structure 202, shroud 218 and rider platform 232 include but are not limited to wood, plywood, plastic, reinforced plastic, polymers, glass filled nylon, fiber glass, reinforced composites, metals (e.g., aluminum), metal alloys, metal composite materials (e.g., an aluminum composite material), a hemp composite, composites with a honeycomb core or other inner structure, composites with a balsa core, expanded metal, etc.

The pivot arms 210, which are attached to each of the hover engine shrouds, such as 218, are coupled to the rider platform 232 at connection points 234. The rider platform can be formed from a flexible material. When a rider stands on the platform and shifts their weight from quadrant to quadrant, the rider platform can flex. The flex can cause the pivot arm coupled to each of connection points 234 to move downwards which causes the hover engine coupled to each pivot arm to tilt. As described above, when the hover engine is tilted, a force can be generated which is approximately aligned with the tilt axis.

The rider can shift their weight and the amount of weight distributed to each pivot arm by changing their foot position on the rider platform 232 and the amount of weight distributed to each foot. Thus, the amount of force distributed to each pivot arm can be controlled and hence the amount of tilt to each hover engine can be varied. By varying the tilt, an amount of translational force output by each hover engine in a particular direction can be controlled. As described above, these forces can be used to control spin, such as starting or stopping a spin and controlling a rate of spin. The forces can also be used to steer the hoverboard.

Figure 10C:
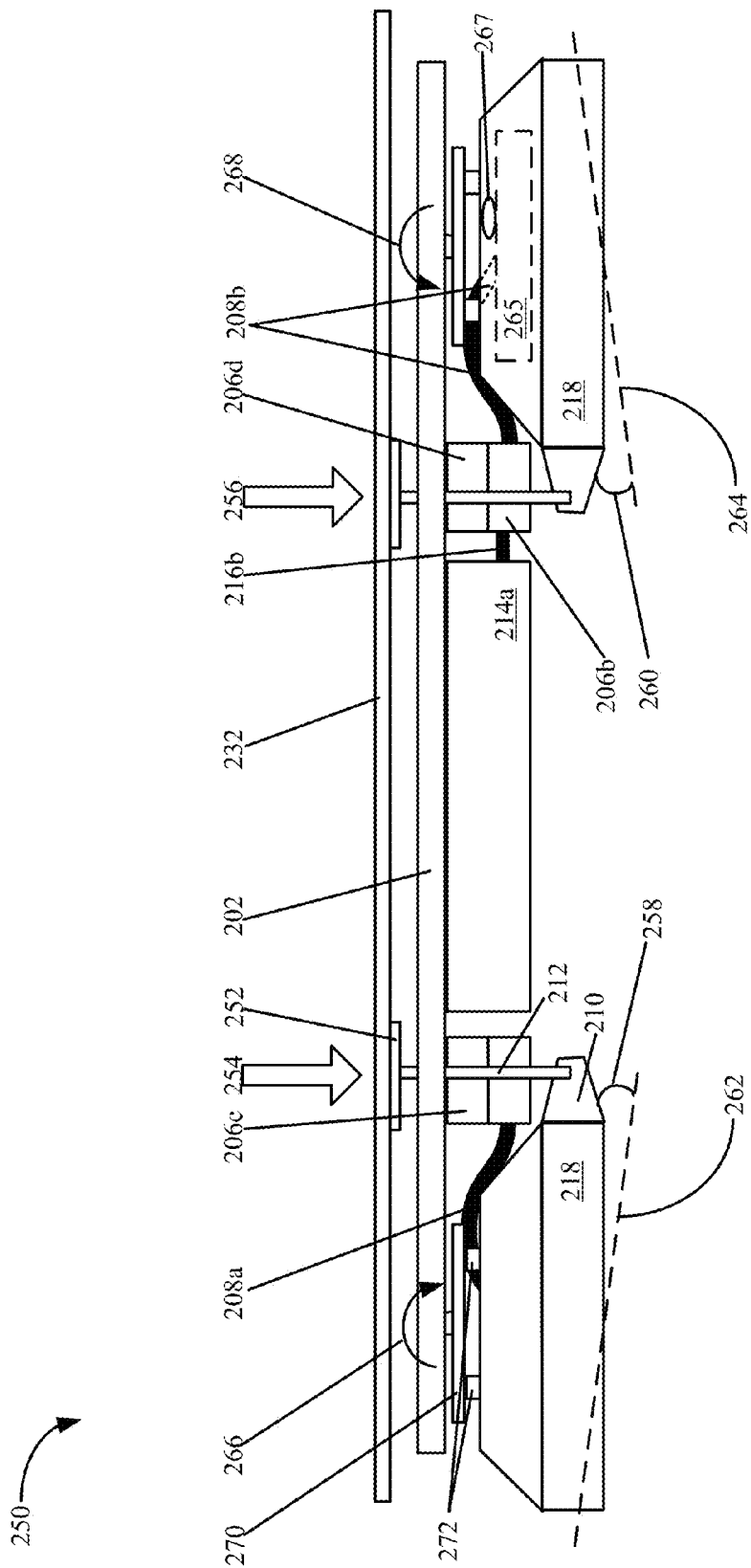

FIG. 10C is a side view 250 of a hoverboard. As can be seen in the FIG. 10C all of the components need to operate the hover engines, such as the batteries and speed controls are suspended from the bottom of support structure 302 and packaged below a height of the bottom of the hover engine. As described above, the height of the hoverboard from the bottom of the hover engine to the top of the rider platform is about 4.5 inches. Thinner designs are possible and this example is provided for the purposes of illustration only.

In this embodiment, the rider platform 232 is supported at the ends and coupled to the structure 202 via members 274a and 274b. This configuration allows the rider platform 232 to bend in the middle, such as when weight is applied at location 254 and 256 above the pivot arms, such as 210. In an alternate embodiment, the rider platform may be supported by a member, which bisects it lengthwise. Then, the rider platform 232 may be bent on either side of this central member when weight is applied.

In yet another embodiment, the rider platform 232 may be sectioned to allow portions to move independently of one another. The individual sections can be coupled to the hoverboard such that they may be flexed to actuate one of the tilt mechanisms. In another embodiment, the individual portions may be coupled to the hoverboard via a hinge mechanism. The individual portions can then be rotated about the hinge.

When a hinge mechanism is used, a stiffer material may be utilized for the individual section. However, a repositioning mechanism, such as one or more springs or flexible foam, may be used to return the individual portion to an original position after a force is removed. The repositioning mechanism, such as springs, can also be used to affect the amount of force required to move the individual section.

The hover engine shrouds are coupled to a hinge mechanism 272. The hinge mechanism 272 hangs from the support structure 202. The hinge mechanism provides for rotation about one axis. Some examples of hinge mechanisms which may be utilized include but are not limited to a butt hinge, a barrel hinge, a flush hinge, a continuous hinge, a pivot hinge, a coiled spring pin hinge and self-closing hinges. A gap is provided beneath the hinge mechanism, the gap allows wires 208b from the speed controller 206b to reach the motor 265 encircled by the shroud 218. The electronic speed controllers, such as 206b, are each connected via connectors, such as 216b, to four adjacent battery packs (see FIG. 10A). In alternate embodiments, the shroud 218 can include one or more apertures (e.g., 267) which allow wires to be passed to the motor 265.

In this example, the hinges allow each hover engine to rotate through some angle, such as 266 and 269, about one rotational axis. As described above with respect to FIGS. 9A and 9B, joints which allow for more rotational degrees of freedom are possible and this example is provided for the purposes of illustration only. The bottom of the shrouds, such as 218, when tilted is illustrated by the dashed line 262 and 264. The tilt angles 258 and 260 are defined as the angle between the shrouds are horizontal and the bottom of the shrouds when tilted as indicated by lines 262 and 264.

In one embodiment, the hover engines can be configured to tilt up to ten degrees in one direction. In operation, when the weight is removed from locations 254 and 256, the rider platform 232 may unbend and the shrouds may return to a first position. When weight is added, the rider platform may flex by some amount at each location and the shrouds may each tilt by some amount.

As described above, the amount of tilt associated with each hover engine may be constrained. Further, the amount of tilt doesn't have to be same for each hover engine. For example, one hover engine can be allowed to rotate up to ten degrees while a second hover engine can be allowed to rotate up to only five degrees. In particular embodiments, a hover engine can be configured to rotate through up to 10 degrees, up to 20 degrees or up to 30 degrees of total rotation. The rotation directions 266 and 268 are shown for each hover engine. In one embodiment, each hover engine is allowed to rotate in only one direction. In another embodiment, a hover engine may be allowed to rotate in two directions, such as angles of plus or minus ten degrees past the horizontal.

Next, some flight data is described for two vehicles. The first vehicle is similar in design to the vehicle described with respect to FIGS. 10A, 10B and 10C. During the test, a data logger was connected to one of the motors, such as 265. The data logger was used to record amps, voltage and RPM of the motor. The data logger is an elogger v4 (Eagle Tree Systems, LLC, Bellevue, Wash.). The data recorded during the test is presented below in Table 1.

For the test, the unloaded weight of vehicle #1 at the time of zero seconds is 96.2 pounds. As described above, the vehicle includes four hover engines and is similar in configuration to vehicle 200. The voltage, amps and RPM are measurements from one of the hover engines. The height is measured from the bottom of the magnets on a magnet carrier in one of the hover engines to the surface of the copper test track. The copper test track is formed from three, ⅛ inch thick, sheets of copper.

TABLE 1

Flight test data for vehicle #1
Test Vehicle #1

| Time (sec) | Total weight (lbs) | Power (Watts) | Voltage (Volts) | Current (Amps) | RPM | Hover Height (mm) |
|---|---|---|---|---|---|---|
| 0 | 96.2 | 855 | 64.64 | 13.22 | 3195 | 24.4 |
| 19.6 | 184 | 1479 | 62.93 | 23.50 | 3020 | 19.9 |
| 33.8 | 273.2 | 2141 | 61.22 | 34.97 | 2848 | 15.5 |
| 46.9 | 362.4 | 2836 | 59.62 | 47.58 | 2689 | 14.2 |
| 57.7 | 450.4 | 3381 | 58.22 | 58.07 | 2549 | 11.9 |
| 69.2 | 499.6 | 3665 | 57.42 | 63.82 | 2486 | 10.7 |
| 83.3 | 550 | 4092 | 56.46 | 72.48 | 2394 | 11 |
| 95.5 | 579.6 | 4316 | 55.92 | 77.18 | 2361 | 8.2 |
| 103.3 | 609.2 | 4418 | 55.60 | 79.47 | 2329 | 7.5 |
| 110.7 | 629.4 | 4250 | 55.71 | 76.30 | 2355 | 7.9 |
| 118.7 | 649.7 | 4363 | 55.27 | 78.95 | 2314 | 7.3 |

In a second vehicle (not shown), a chassis was formed from plywood. The vehicle dimensions were 46 inches by 15.5 inches by 5 inches. The vehicle weighed seventy seven pounds unloaded. Two hover engines with magnet carriers of fourteen inches in diameter were used. The hover engines were secured in place and a mechanism, which allowed the hover engines to be tilted, was not provided.

Each magnet carrier included thirty two cubic inch magnets arranged in a circular pattern similar to what is shown in FIG. 20. The polarity arrangement pattern is similar to FIG. 20 as well. However, the polarity arrangement pattern including the two guide magnets and two pole magnets is repeated more times as compared to FIG. 20.

Two Hacker motors are used (one for each magnet carrier Hacker motor model no. QST-150-45-6-48 with a $K_V$ of 48 is used to power each magnet carrier. The motor dimensions are 150 mm by 45 mm and the number of windings in the motor is 6. Each hacker motor is coupled to one of the magnet carriers and an electronic speed controller.

For this vehicle, Jeti Spin Pro 200 Opto brushless Electronic Speed Controllers (Jeti USA, Palm Bay, Fla.) are used. The same battery type as described above for the first test vehicle was used. However, only eight batteries were used for the second vehicle as compared to the first test vehicle. The batteries are two divided into two groups of four and wired in series to provide a nominal voltage of about sixty Volts to each motor.

A test was conducted where the second vehicle was allowed to hover in free flight unloaded and then plate weights were added to the vehicle. The plates were weighed before the test began. The vehicle was operated over three −⅛ inch thick pieces of copper.

The current, voltage and RPM, for one of the motors, were measured in flight using the Eagle system data logger. The distance of the bottom of the magnets to the copper, referred to as the hover height, was measured by hand. Test results for the flight are shown in Table 2 as follows.

TABLE 2

Flight test data for vehicle #2
Test Vehicle #2

| Time (sec) | Total weight (lbs) | Power (Watts) | Voltage (Volts) | Current (Amps) | RPM | Hover Height (mm) |
|---|---|---|---|---|---|---|
| 0 | 77 | 1853 | 61.3 | 30.2 | 2942 | 26.9 |
| 10 | 165 | 3333 | 58.8 | 56.7 | 2820 | 22.3 |
| 17.1 | 254 | 4700 | 56 | 84 | 2686 | 18.3 |
| 23.1 | 343 | 5944 | 52.6 | 113 | 2525 | 14.6 |

A Second Hover Vehicle Example

Figure 11A:
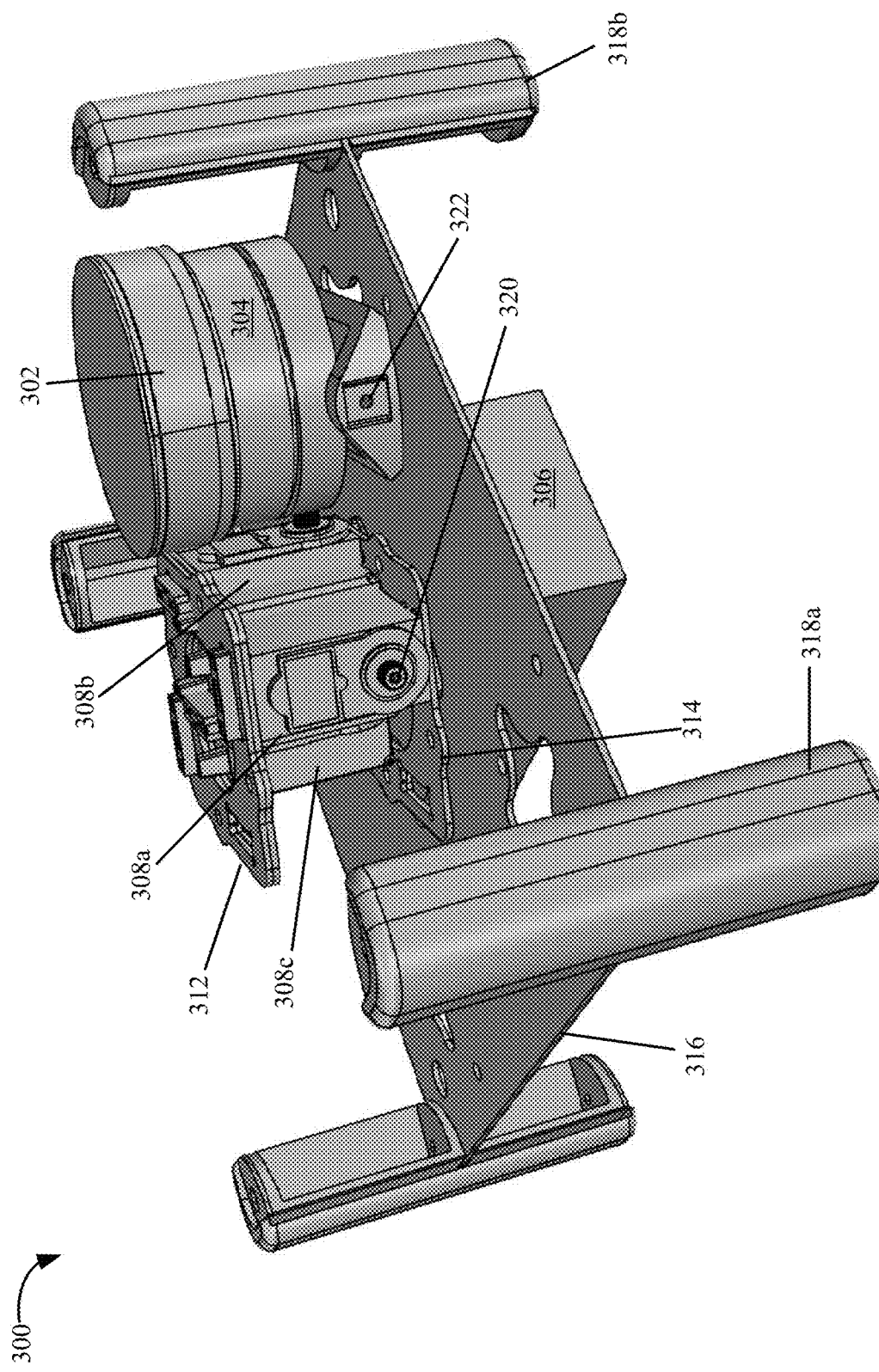
FIGS. 11A-11C are perspective, top and bottom views of a magnetically lifted device in accordance with the described embodiments.
Figure 11C:
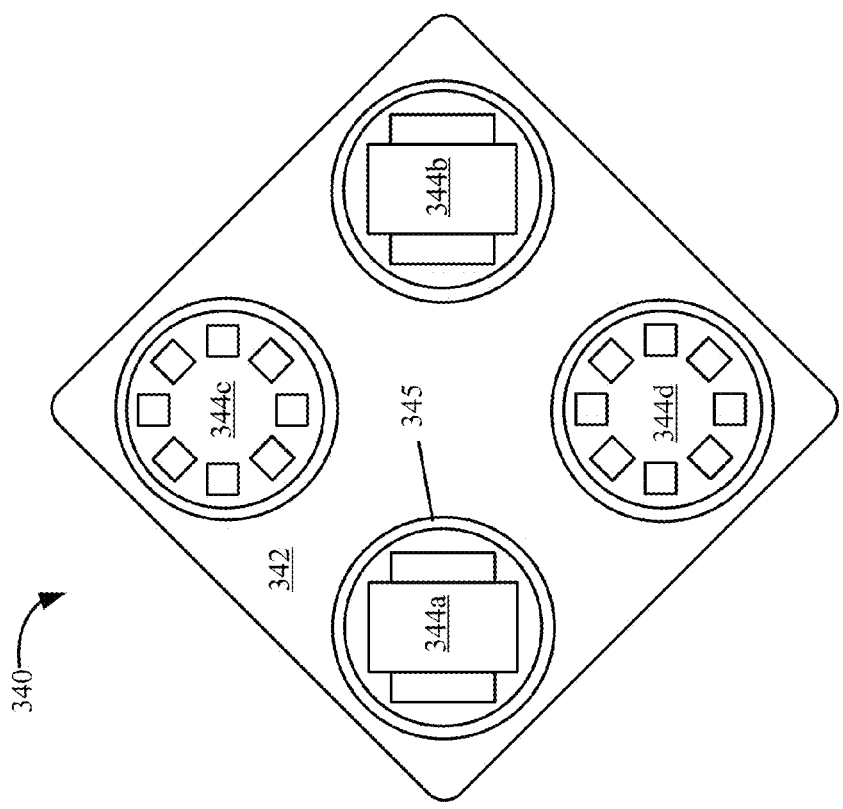
Figure 11B:
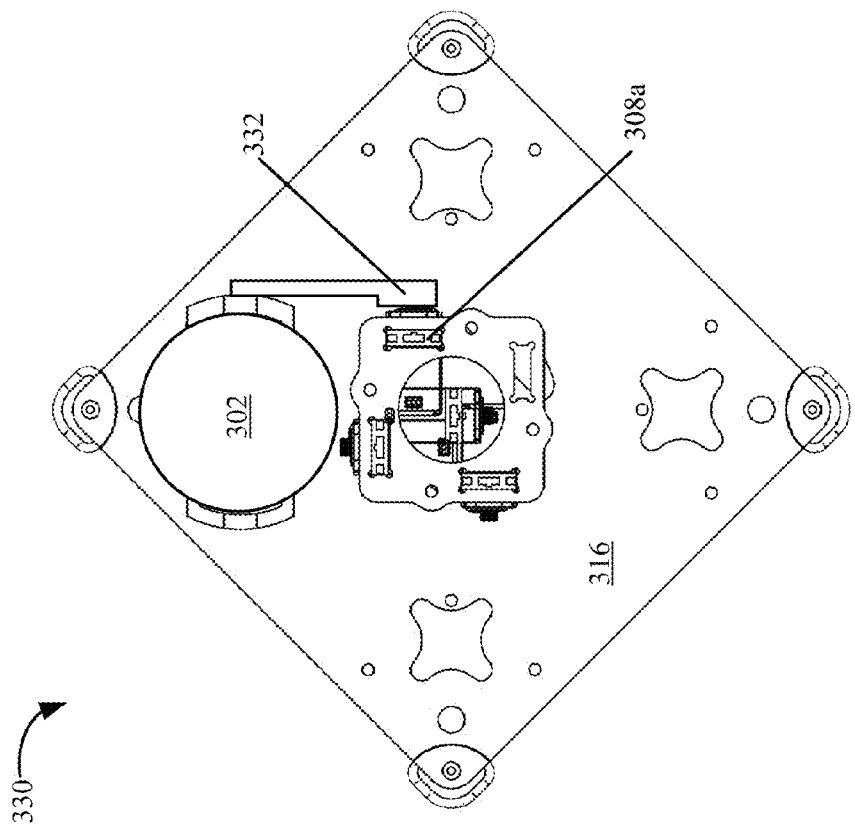

A second hover vehicle is described with respect to FIGS. 11A to 11C. The second hover vehicle includes four actuatable magnet carriers. The magnet carriers can be actuated to move the hover vehicle from position to position. Details of a Navigation, Guidance and Control (NGC) system, which can be utilized with the vehicle, are described below with respect to FIGS. 14 to 19.

FIGS. 11A-11C are perspective, top and bottom views of the second hover vehicle 300, which is a magnetically lifted device. In FIG. 11A, the perspective view is provided with the outer housing of the device 300 removed. In addition, the perspective view shows a bottom of the vehicle 300. In operation, the vehicle 300 would be flipped over such that the magnet carrier 302 faces a conductive substrate.

With the outer housing removed, a frame including 1) four posts, such as 318a and 318b, and an interior plate 316, is exposed. The four posts, such as 318a and 318b are each attached to the interior plate 316. For example the four posts can be secured to the interior plate 316 using a bonding agent or a fastener, such as screw. The outer housing may be formed from six rectangular panels which are each attached to the four posts, such as 318a and 318b. In one embodiment, the device 300 can be about 25 cm by 25 cm by 12 cm and weight about 4.5 to 5.5 kg unloaded. In another embodiment, the device 300 can be about 21 cm by 21 cm by 10.16 cm and weigh about 2.2 to 3.5 kg unloaded. Each device can be configured to carry a payload of about 2.27 kg. Depending on the power storage capacity of the vehicle, the vehicle weight and the payload weight, the flight time can be between about four to fifteen minutes on a single battery charge.

In FIG. 11A, a single motor 304, a single magnet carrier 302 and three actuators 308a, 308b and 308c are shown. A fully assembled vehicle can include i) four motors, such as 304, which each rotate a magnet carrier, such as 302, ii) four magnet carriers, such as 302, which are configured to generate magnetic lift and propulsion, when spun over a conductive substrate, such as but not limited to a metal plate, iii) four servo-motors, such as 308a, 308b and 308c, iv) control circuitry, which controls a rotation rate of the motors, moves the servos from position to position and communicates wirelessly with a remote device, such as a smart phone or a wireless controller and a v) battery 306, which provides power to the motors, the servo-motors and the control circuitry. In this example, the battery 306 is secured to the interior plate 316. In one embodiment, the device 300 can communicate wirelessly using Bluetooth.

In one embodiment, the control circuitry can include a single Q Brain 4×20Amp Brushless electronic speed controller (Hobbyking.com). The device is configured to receive power from a battery, such as a lithium polymer (LiPo) battery, with a voltage of approximately 7.4 volts or 14.8 V. For example, a 2S LiPo battery includes two cells connected in series and outputs about 7.4 Volts. Whereas, a 4S LiPo battery includes four cells connected in series and outputs about 14.8 Volts. In particular embodiment, the battery 306 can be a Venom 25c 2s 5000 mAh 7.4 Volt LIPO battery or a Venom 35C 4s 5000 mAh 14.8 LIPO battery (Atomik RC, Rathdrum, Id.). These batteries weigh about 320 g and 527 g, respectively.

The single unit (not shown), which provides speed controller functions, can output power to each of the four motors, such as 302, where the amount of power to each motor can be controlled to control a rotation rate of each motor. Thus, the single unit can split power from the battery 306 to each of the four motors. In one embodiment, the amount of power output to each motor can be controlled to allow each motor to have a different rotation rate. The different rotation rates can be used to provide some control functionality, such as yaw control. In this example, the weight of the speed controller is about 112 grams. In alternate embodiments, the speed control functions can be provided a single unit or via multiple units, such as a separate speed controller for each motor.

In one embodiment, the control circuitry can include a flight control board (not shown), such as a HobbyKing KK2.1.5 Multi-Rotor control (HobbyKing.com). The flight control board can receive sensor information from an accelerometers, gyros and compasses on board the device. For example, sensors can include a 3-axis accelerometer, a 3-axis gyroscope, a 3-axis compass and combinations thereof.

A processor on the flight control board can receive sensor data from the sensors and then generate control signals which are sent to electronic speed controller (or controllers) and servo-motors, such as 308a, 308b and 308c. The flight control board can also be configured to receive control signals from a remote device, such as a smart phone or other type of radio controller and in response generate control signals to control the motors, such as 302, the servo-motors or combinations thereof. In one embodiment, the device 300 can include a Bluetooth receiver configured to communicate with the flight control board. In various embodiments, controlled flight generated using the flight control board and/or control signals from a remote device can include one or more of up, down, backwards, forwards, left, right, yaw and pitch movements. These movements can be instantiated via independent control of each of 1) a tilt angle of a magnet carrier, Which is coupled to the motor, a 2) rotation rate of the magnet carrier and combinations thereof.

In device 300, four servo-motors can be clustered together in a center of the device between the four motors. The four servo-motors can be held together using frame components 312 and 314. The cluster of four servo-motors can be coupled to the interior plate 316. In one embodiment, the servo-motors can each be Hitec HS-5485HB servos (Hitec RCD USA, Inc., Poway, Calif.). The servos can be configured to receive 4.8 V or 6.0V. The weight of each servo is about 45 grams. The torque output, depending on the voltage input, for each servo is about 5.2 or 6.4 kg/cm. For vehicles using larger magnet carriers and/or larger motors, servos with a greater torque output can be used.

Each motor 304 and 302 magnet carrier can be configured to rotate about an axis 322 through some angle range. A mechanical linkage (see FIG. 11B) can be provided from the servo output 320, which causes the motor about the axis 322. The tilt axis 322 is located near a top of the motor 304 (As described above, the vehicle is shown in an upside down orientation in FIG. 11A). In other embodiments, the tilt axis 322 can be located closer to the bottom of the motor 304 and the rotatable magnet carrier 302.

In various embodiments, the mechanical linkage can be configured to convert an output angle of rotation from the servomotors to an input angle of rotation about axis 322 according to some ratio. For example, when the ratio is one to one, an output angle of rotation from the servo of one degree in a particular direction can cause an input angle of rotation of the motor 304 and magnet carrier 302 of one degree in the particular direction. In another example, when the ratio is five to one, an output angle of rotation from the servo of five degrees in a particular direction can cause an input angle rotation of the motor 304 and magnet carrier 302 of one degree in the particular direction. The ratio can be selected based upon a needed accuracy of the tilt control of the magnet carrier and a needed transit speed to move the magnet carrier from a first position to a second position in a control scheme. Thus, ratios between one to one and five to one or greater than five to one can be utilized and the example above is provided for the purposes of illustration only.

In FIG. 11B, a top view 330 of the device 300 shown in FIG. 11A is illustrated. In FIG. 11B, the axis of rotation of servo 308a and the tilt axis of rotation for magnet carrier 302 are aligned approximately parallel to another. This configuration allows for a relatively straight mechanical linkage 332 between the servo 308a and magnet carrier/motor combination. In other embodiments, the axis of rotation of servo 308a and the tilt axis of rotation for magnet carrier 302 may be angled relative to one another. In this instance, a more complex, multi-part mechanical linkage can be provided, such as a two part mechanical linkage hinged together in some manner. For example, a two part mechanical linkage can be coupled to one another using a flexible material.

In FIG. 11B, when fully assembled, four servos can be coupled to four motors. As shown for servo 308a and magnet carrier 302, the rotation axis through which the torque is output from the servo 308a, is approximate parallel to the tilt axis of the magnet carrier 302 and motor. In various embodiments, the rotation axis through which the torque is output from a servo and the tilt axis of a magnet carrier and motor to which it is coupled don't have to parallel to one another.

When assembled, the rotation axis through which the torque is output from each of the servos, 308b and 308c, which are adjacent to servo 308a, are rotated approximately ninety degrees relative to the rotation axis through which torque is output from servo 308a. In further embodiments, less than four or more than four motor, magnet carrier and servo combinations can be used. Thus, the angle between the axis through which torque is output from a servo and the axes from which torque is output from the adjacent servos can be greater than ninety degrees or less than ninety degrees. For example, a vehicle can include three magnet carrier, servo and motor combinations and can have servos with axes through which the torque is output that are approximately one hundred twenty degrees orientated relative to one another. In yet other embodiments, a first portion of the magnet carrier and motor combinations can be provided without a servo while a second portion of the magnet carrier and motor combinations can be provided with a servo. When the magnet carrier and motor is non-tiltable, the orientation of the magnet carrier and motor can be fixed at an angle of zero or greater relative to the interior plate 316.

FIG. 11C shows a bottom view 340 of the device 300 of FIG. 11C. In one embodiment, a bottom portion 342 of the housing can include four apertures, where a bottom of the each magnet carrier, such as 344a, 344b, 344c and 344d is approximately parallel to an outer surface of bottom portion 342 or extends beyond the outer surface of bottom portion 342. The apertures are sized to provide some gap, such as 345, between a side of the magnet carrier 344a and an inner surface of the aperture. In another embodiment, the 342 bottom of surface can be formed without apertures and the magnet carriers can be enclosed within an interior of the vehicle 300. In this embodiment, a non-conductive material and non-ferromagnetic material may be used beneath the magnet carriers.

In FIG. 11C, two magnet configurations are shown. Magnet carriers 344a and 344b use a first magnet configuration and magnet carriers 344c and 344d include a second magnet configuration. The magnet polarity arrangement for magnet carriers 344a and 344b can be similar to pattern 1292 in FIG. 24. The magnet polarity arrangement for magnet carriers 344c and 344d can be similar to the pattern shown in FIG. 2. In various embodiments, all the magnet carriers may use the same magnet polarity pattern and magnet configuration (geometric arrangement of each magnet relative to one another) and may use the same volume of magnets. In other embodiments, the magnet polarity arrangement, the magnet configuration and the volume of magnets can vary from magnet carrier to magnet carrier on a vehicle.

In one embodiment, four magnet carriers, such as 344c, can be used. The magnet carriers can be approximately three inches in diameter. In one embodiment, the portion of the magnet carrier, which holds the magnets, can be formed from an injection molded plastic. The eight magnets on each magnet carrier can be N52 strength, 12 mm cubes. The motors can be Himax (Max Products, LLC, Lake Zuric, Ill.) brushless out runner motors (HC6320-250). The motor weighs 450 g. The max power and max RPM are 1700 Watts and 10,000 RPM, respectively. The diameter of the motor is 63 mm, the Length of the motor 51 mm and the shaft diameter is 8 mm. The $K_v$ for the motor is 250 RPM/Volt. Other motors with varying power outputs and dimensions and other magnet carriers with different diameters, magnet volumes, magnet configurations and magnet strengths can be used and these examples are provided for illustrative purposes only.

Hover Engine Examples

Next, with respect to FIGS. 12A-13C, two hover engine configurations, a hinge mechanism, which can be used with a hover engine, and two magnet configurations, which can be used with a hover engine, are described. A first example hover engine is described with respect to FIGS. 12A-12C. A second example hover engine and an associated hinge mechanism is described with respect to FIGS. 13A-13C.

Figure 12A:
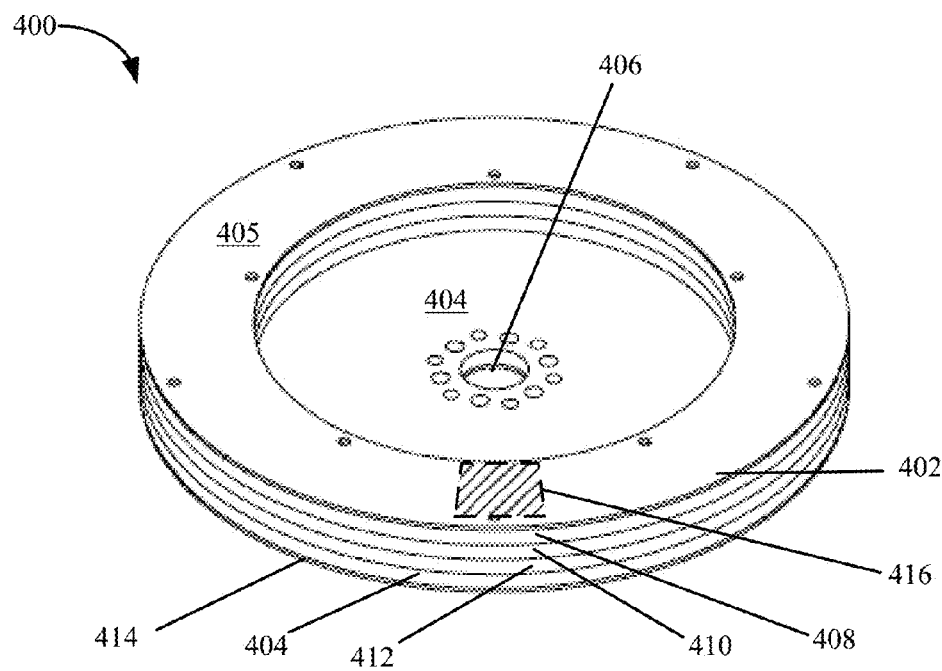
FIGS. 12A to 12C are illustrations of a hover engine in accordance with the described embodiments.

FIG. 12A is a perspective view of a magnet carrier 400. The magnet carrier 400 is 10 inches in diameter. In various embodiments, the magnet carriers used on a device, such as a hoverboard, can be between four and fourteen inches in diameter. However, for other devices, larger or smaller diameter magnet carriers may be used.

Generally, the size of the magnet carrier will depend on the volume of magnets to be accommodated and the arrangement of magnets used. As will be described in more detail below different magnet configurations allow for and require different packaging schemes. The total volume of magnets which are used will depend on a desired maximum payload weight to be lifted and an operating height. Once, the total volume of magnets is determined, it can be distributed among one or more hover engines in selected configurations. Based upon the volume of magnets used in a hover engine and a selected magnet configuration, i.e., the distribution of the magnet volume on the magnet carrier and polarity directions utilized, appropriate motors needed to rotate the magnet carrier can be selected where a motor may turn one or more magnet carriers. As an example, the volume of magnets on a hoverboard, which can be distributed among one or more magnet carriers, can be between thirty and eighty cubic inches.

In general, various ratios of motors to magnet carriers can be utilized in a hover engine. For example, a hover engine can include one motor which turns one magnet carrier. As another example, a hover engine can include one motor which drives two or more magnet carriers. In another example, a hover engine can include two motors which drive one magnet carrier. In general, one or more motors can be paired with one or more magnet carriers where the number of motors can be less than equal to or greater than the number of magnet carriers. Thus, the example of a hover engine including one motor and one magnet carrier is provide for the purposes of illustration only and is not meant to be limiting.

Returning to FIG. 12A, the magnet carrier includes a raised outer ring 405. A distance from a bottom of the magnet carrier 400 to a top of the outer ring is about 1.13 inches. This height allows one inch cubed magnets to be accommodated. In one embodiment, twenty one inch cube magnets are arranged within the outer ring. To accommodate more cubic magnets arranged in a circle, such as four more magnets to provide an additional repetition of the polarity pattern, a larger outer ring can be used. Using less cubic magnets, a smaller radius may be employed. Different shaped magnets and different polarity patterns can allow for different packaging schemes. Thus, this example, where the magnets are arranged in a ring is provided for the purposes of illustration only and is not meant to be limiting.

In one embodiment, the magnet carrier 400 including the outer ring 405 can be formed from a number of layers, 402, 408, 410, 412, 404 and 414, from top to bottom, respectively. Layers 402 and 414 form a cover over the top and bottom portions of the magnets in the outer ring. In one embodiment, layers 402 and 408 are about 0.065 of an inch thick. In alternate embodiment, one or both of layers 402 and 408 can be eliminated. In one embodiment, the top and bottom layers can be formed from a material such as aluminum. In another embodiment, the top layer 402 can be formed from a material with magnetic properties, such as mu-metal, iron or nickel.

Layers 408, 410, 412, 404 each include twenty apertures to accommodate twenty magnets. More or less magnets and hence more or less apertures can be utilized and this example is provided for illustrative purposes only. The total thickness of the layers is one inch and each layer is 0.25 inch thick. In one embodiment, two layers are formed from polycarbonate plastic and two layers are formed from aluminum. The polycarbonate plastic can reduce weight. In various embodiments, the thickness of each layer, the material used for each layer and the number of layers can be varied. For example, different metals or types of plastics can be used. As another example, a single material can be used for each of the layers.

When the layers are aligned, the one inch cube magnets can be inserted through the layers. For different shaped or different size magnets, such as rectangular shaped magnets, trapezoidal shaped magnets or 1.5 cubic inch magnets, a different aperture shape or size can be used. In one embodiment, an adhesive can be used to secure the magnets in place, such as super glue. When secured, the bottoms of the magnets are approximately flush with the bottom of layer 404. This feature can maximize the height between the bottom of the magnets and the substrate when a vehicle using the magnet carrier design 400 is hovering.

One or more layers can include apertures, such as 416, that allow fasteners to be inserted. The fasteners can secure the layers together. In another embodiment, an adhesive can be used to secure one or more of the layers to one another. In alternate embodiment, the layers 404, 408, 410 and 412 can be formed as a single piece.

Figure 12B:
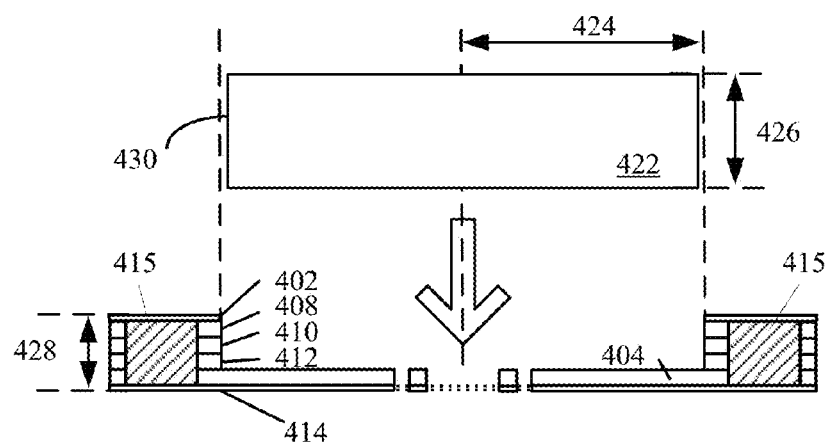

FIG. 12B is a side view of magnet carrier 400 with an embedded motor 422. The cross sections of two magnets, 415, are shown within the outer ring 405. The top of the magnets is flush with the outer top of layer 408 and the bottom of the magnets is flush with the bottom of layer 404.

In various embodiments, the magnet carrier 400 can be configured to receive magnets between 0.5 and 2.5 inches of height.

In one embodiment, the top of the magnets may extend above the top of the 408. Thus, the outer ring 405 may only extend partially up the sides of each magnet. This feature may allow the magnets to be secured in place while reducing weight.

In alternate embodiments, using different magnet configurations, the magnets may be positioned beneath the motor. Further, the motor doesn't necessarily have to be direction above the magnet carrier 400. For example, a belt, gearing or some other torque transmission mechanism may be used to place the motor to the side of the magnet carrier 400. Further, in some embodiments, a motor may drive multiple magnet carriers. In addition, the motor rotational axis and the axis of rotation of the magnet carrier don't have to be parallel to one another. For example, the motor rotational access can be angled to the axis of rotation of the magnet carrier, such as perpendicular to the axis of rotation. Then, a belt and/or gearing system can be used to transfer and change the direction of the torque output from the motor.

The inner radius 424 of the outer ring 405 is greater than a radius of the motor 422. Thus, the motor can be inserted within the outer ring and secured to layer 404 such that the magnet carrier 400 can be rotated when the motor is operated. Thus, the outer ring extends along the side 430 of the motor. An advantage of mounting the motor in this manner is that the overall height profile of the hover engine may be reduced as compared to mounting the motor 422 at a height above the top of the outer ring.

In various embodiments, the height 428 height of the outer ring may be less than the height of the motor 426, such that the outer ring extends partially up the side 430 of the motor 422. In another embodiment, the height 428 of the outer ring 405 and the height of the motor can be approximately equal. In yet another embodiment, the height 428 of the outer ring can be greater than the height of the motor.

It may be desirable to increase the height 428 to accommodate taller magnets. Taller magnets may be used to increase the amount of magnetic lift which is generated when the magnets, such as 415 are at a greater distance from a substrate. The volume of a magnet including its height can affect the strength of the magnetic field at a particular distance which extends from a magnet.

In various embodiment, a trade-off can be made between the distributing the magnets over a greater height range or over a greater area on the bottom of the magnet carrier. For given volume of magnets, the foot print on the bottom of the magnet carrier can be reduced by using taller magnets. Reducing the foot print may allow a smaller radius magnet carrier to be used. However, a height of the hover engine may be increased.

Alternatively, the volume of magnets can be spread out over a larger area to provide a larger foot print of magnets on the bottom of the magnet carrier. The larger foot print allows the maximum height of the magnets to be reduced and possible the maximum height of the hover engine to be reduced. However, a larger foot print may require a magnet carrier with a larger radius.

The motor, such as 422, used to rotate a magnet carrier can be electric or combustion based. In general, any type of motor which outputs a suitable amount of torque can be used. An electric motor requires a power source, such as battery or a fuel cell, to supply electricity. A combustion motor requires a fuel which is combusted to operate the motor. Battery types include but are not limited to batteries with a lithium or zinc anode, such as lithium ion, lithium polymer or a zinc-air system.

An electric motor can be configured to output torque about a rotational axis. The electric motor can include a configuration of wire windings and a configuration of permanent magnets. Current is provided through the windings to generate a magnetic field which varies as a function of time. The magnetic field from the windings interacts with magnetic field from the permanent magnets to generate a rotational torque. AC or DC motors can be utilized, such as an induction motor or a DC brushless motor.

In various embodiments, the windings can be configured to rotate while the magnets remain stationary or the magnets can be configured to rotate while the windings remain stationary. An interface, such as a shaft, can be provided which couples the rotating portion of the motor to the magnet carrier 400. In FIG. 26A, the magnet carrier 400 is configured to interface with the motor at 406.

The non-rotating portion of the motor 422 can be integrated into a motor housing which surrounds the magnets and the windings. The motor housing can include an interface which enables it to be attached to one more structures associated with a device. In another embodiment, non-rotating portion of the motor can include an interface which allows it to be directly attached to one or more structures associated with the magnetically lifted device.

In a particular embodiment, the core of the motor 422 can be stationary where both the magnets associated with the motor and the magnets associated with the magnet carrier rotate around the stationary core. One non-rotating support structure can extend from the core which allows the motor and magnet carrier to be coupled to the device. A second non-rotating support structure can extend from the core which provides support to a portion of a shroud which is interposed between a bottom of magnet carrier and the substrate which supports the induced eddy currents (e.g., see FIG. 13A).

The arrangement of magnets in the motor 422 can include poles which are substantially perpendicular to the axis of rotation of the motor (often referred to as a concentric electric motor) or can include poles which are substantially parallel to the axis of rotation of the motor (often referred to as an axial electric motor). In one embodiment, a winding configuration, such as the winding configuration associated with an axial motor, can be used to induce eddy currents in a substrate. In these embodiments, there are no rotating parts and the magnet carrier and the magnets associated with an electric motor are eliminated. As part of a hover engine, the windings can be tilted relative to a device to generate control forces in a manner previously described above.

In yet another embodiment, the magnets associated with the motor 422 can be removed and a motor winding can be designed which interacts directly with the magnets in the magnet carrier. For example, a winding can be placed above magnets 415 to interact with the magnetic flux above the magnets or a winding can be placed around the outside of magnets 415 or around the inside of magnets 415. A current applied to the winding to cause the magnet carrier to rotate. As described above, rotation of the magnet carrier can cause eddy currents to be induced in a portion of a substrate.

As an example, the motor 422 can include an outer ring configured to rotate. The magnet carrier 400 can mounted be to the outer ring of the motor 422 instead of to a shaft extending from the center of the motor. This type of motor design can be referred to as an outboard design. This feature may allow the portion of layers 404 and 412 within the inner radius 424 of the outer ring 405 to be removed such that the bottom of the motor is closer to the bottom of the outer ring 405. One advantage of this approach is that the overall height of the magnet carrier 420 and motor 422 may be reduced.

In a particular embodiment, the outer ring 430 of the motor and the outer ring 405 of the magnet carrier may be formed as an integrated unit. For example, the outer ring of the motor 422 can have a layer extending outwards from the side 430. The layer extending from the side 430 can include a number of apertures through which magnets can be inserted. Optionally, one or more layers with apertures, such as 408, 410 and 412, can be placed over the magnets.

In general, in a hover engine, the support structures associated with the magnet carrier, the stator of the motor, the shroud and housing can be integrated with one another. For example, an enclosure for the motor and magnet carrier can include an integrated shroud. In another example, the structure forming the rotor for the motor can be integrated with the structure for the magnet carrier. In another example, all or a portion of the structure forming the stator of the motor can be integrated with a housing and/or shroud associated with the hover engine.

Figure 12C:
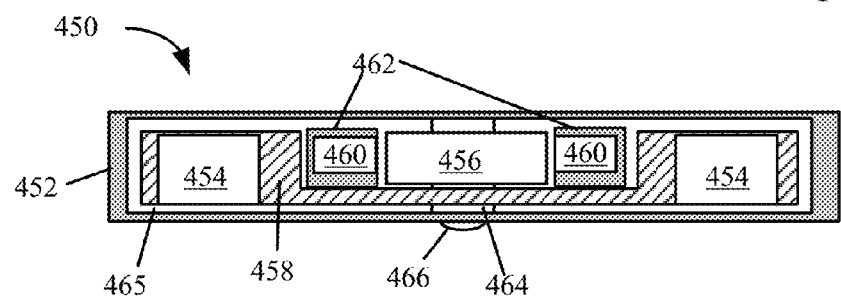

FIG. 12C is a side view of a hover engine 450 having a magnet carrier 465 integrated with a motor in accordance. The hover engine 450 includes a stationary core 456 with windings configured to interact with magnets 460 to rotate the magnets. The core is attached to the support structure 464. The support structure 464 can provide a first interface to attach the hover engine to a hover board. In addition, the support structure 464 can be coupled to a housing 452 which surrounds both motor and the magnet carrier 465. The support structure 464 may be used to help maintain a gap between the bottom of the magnet carrier 465 and the housing 452.

In one embodiment, a small protuberance 466 may be provided at the end of support structure 464. The small protuberance 466 can be formed from a metal or a material with a low friction coating, such as a Teflon coated material. The small protuberance can provide a small stand-off distance when the hover engine is near the ground, such as during take-off and landing. It can help prevent the magnet carrier 465 from impinging the ground. In particular embodiments, the protuberance 466 can be coupled to a portion of the hover engine which rotates or a portion which remains static during operation.

The magnet carrier 465 includes a structure 458 surrounds the magnets 454. As described above, the structure 462 surrounding magnets 460 and the structure 458 surrounding magnets 454 can be formed as a single piece. The magnets 454 and 460 may be shaped differently and have different sizes relative to one another.

In various embodiments, bearings (not shown) can be provided between the support structure 464 and the structure 458 to allow the magnet carrier 465 to rotate about the stationary core. In lieu of or in addition to bearings between the magnet carrier structure 458 and the support structure 464, bearings can be provided at one or more locations between the housing 452 and the structure 458. For example, bearings may be placed between the bottom of the magnet carrier 465 and the housing 452 to help maintain the spacing between the housing 452 and the magnet carrier 465 on the bottom of the magnet carrier. In another example, a bearing may be placed between the side of the magnet carrier and the side of the housing 452 to maintain the spacing between the inner side of the housing 452 and the side of the magnet carrier.

In one embodiment, the height of the hover engine can be less than three inches. In another embodiment, the height of the hover engine can be less than two inches. In yet another embodiment, the height of the hover engine can be less than one inch. The magnets are packaged between a top and a bottom height of the hover engine. Thus, in each of these examples, the maximum height of the magnets will be at most the same as the height of the hover engine. Typically, the maximum height of the magnets will be less than the height of the hover engine.

Figure 13A:
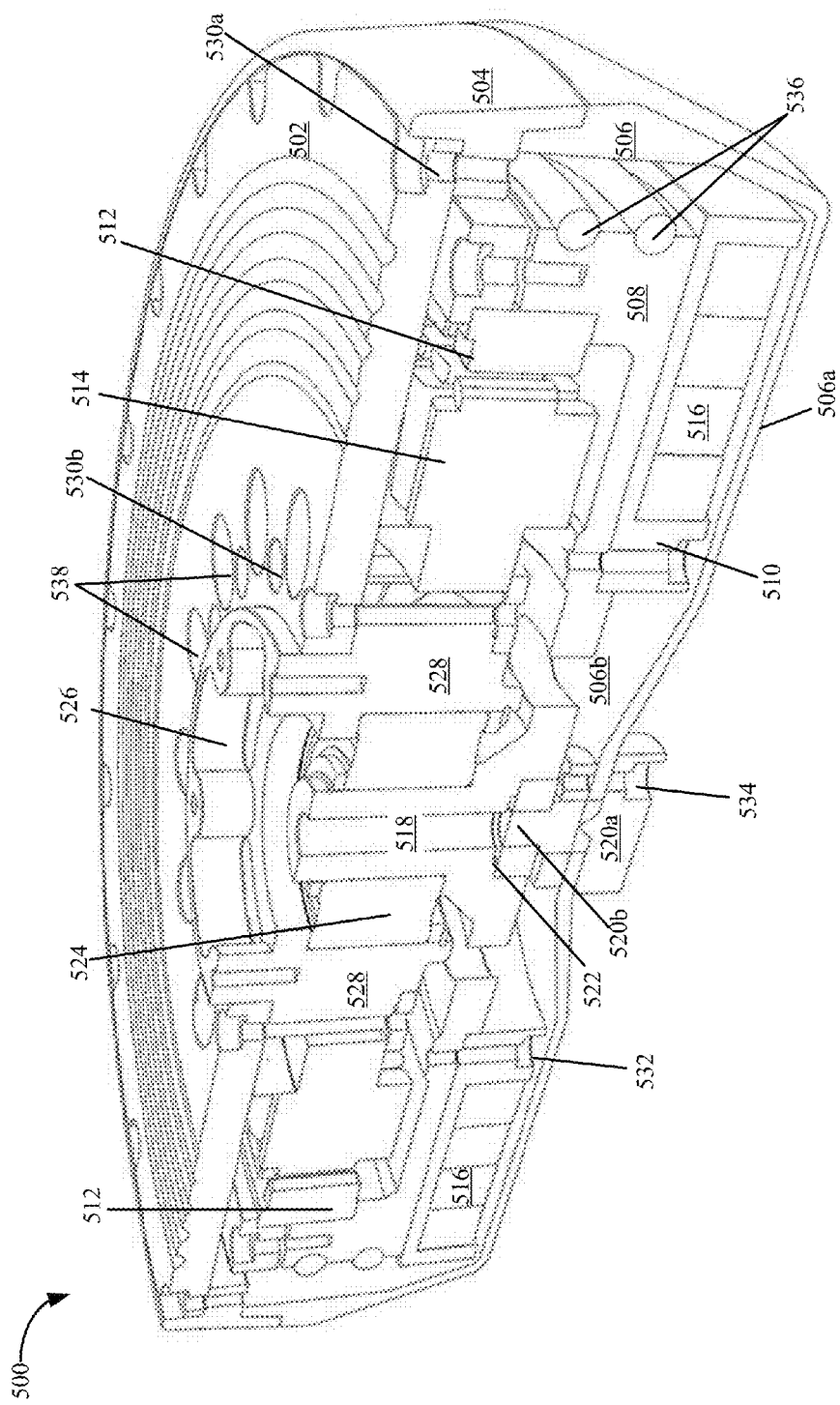
FIG. 13A is a perspective cross section of a hover engine in accordance with the described embodiments.

FIG. 13A is a perspective cross section of a hover engine 500. The hover engine 500 includes component which remain stationary during operation and components which rotate during operation. In this example, components 502, 504 and 506, which form an outer housing for the hover engine, component 528 and component 520 remain stationary during operation.

Component 528 extends from the top cover 502. It provides support for motor windings 514 and a bearing 524 which supports a rotating shaft 518. The motor windings 514 are opposite magnets 512, which extend circumferentially around the device 500. When current is supplied to the windings 514, the windings interact with the magnets 512 to induce a rotational torque. The rotational torque can cause component 508 to rotate. Rotatable component 508 includes the rotatable shaft portion 518 which extends through the core of the hover engine.

The motor includes the stator portion with windings 515 and a rotor component 508 with a first set of magnets 512. In one embodiment, the motor can be an UTO out-runner motor kit by Applimotion, Inc. (Loomis, Calif.). For various motor configurations, the stator outer diameter can vary from 0.6 to 6.7 inches. The stator includes windings 514. The stator length can vary from 0.7 to 2.3 inches. The rotor inner diameter can vary from 0.6 to 6.9 inches. The rotor includes a first set of magnets 514 formed into a ring. Torque output from the motors can vary from 1.1 to 744.2 oz-inches. The current associated with the motor can be between 1.3 and 20.7 amps.

In the embodiment, the motor is a UTO-200, which has a stator outer diameter of 6.7 inches and the rotor inner diameter is approximately 7 inches. For this motor, the stator length can be varied between 1, 1.2 and 1.4 inches to provide a torque output of 650.5, 573.8 and 744.2 oz-inches. The motors utilize 30, 30 and 40 magnet poles respectively. The radial dimensions of 500 allow one of these motor configurations to be accommodated. The height the hover engine 500 can be adjusted to accommodate motors with different stator lengths.

In one embodiment, the rotor 508 can include grooves around an outer diameter. The grooves can be used to support the two rings 536. In one embodiment, the two rings 536 can be used to provide vibrational damping. In alternate embodiments, rings 536 may not be utilized.

A carrier component 510, which holds a second set of magnets 516, is secured beneath component 508 and hence rotates as component 508 rotates. The second set of magnets can cause lift and propulsive forces to be generated when the second set of magnets rotates above a conductive substrate as described above with respect to FIGS. 1 to 4C. In this example, a first portion of the second set of magnets is beneath the stator component of the motor. A second portion of the second set of magnets is beneath the motor magnets 512.

In particular, the motor magnets 512 are positioned between an inner radius of the second set of magnets 516 and an outer radius of the second set of magnets 516. For some magnet configurations, it may be advantageous to have a larger bottom surface area of the magnets, which face the conductive substrate, and a lower magnet height as compared to a smaller bottom surface area of the magnets and a greater magnet height. This configuration which extends both the stator and rotor components of the motion can allow the bottom surface area of the second set of magnets 516 to be increased.

Cross sections of four magnets are shown on each side of the cross section. In one embodiment, these four magnets can represent a cross section of the magnet pattern which includes four radially disposed rows of magnets. In one embodiment, each of the magnets is a cube with a 12 mm side length. However, other magnet configurations and magnets sizes are possible and the example of four rows of 12 $mm^3$ magnets is provided for illustrative purposes only.

In one embodiment, the outer housing can be formed from three components, 502, 504 and 506. Component 502 is secured to component 504 via fasteners inserted through apertures such as 530a and 530b. When secured together, components 502 and 504 form an upper and side portion of the housing for motor 500. Component 502 can include apertures, such as 538, to provide air flow within the hover engine for cooling purposes. Other aperture locations are possible, such as on components 502, 504 or 506, and these aperture locations are provided for illustrative purposes only.

The component 502 includes a ring portion 526 with apertures for fasteners, which extends into the interior of hover engine. Component 528, which supports the bearing 524 and stator portion of the motor, is the portion of component 526, which extends into the interior of the hover engine. The apertures can be used to attach the hover engine 500 to a vehicle support structure in a fixed orientation or to a hinge mechanism which allows the hover engine to be tilted. An example of a hinge mechanism, which can be coupled to the hover engine 500, via ring structure 526, is described below with respect to FIGS. 13B and 13C.

The lower portion of the housing 506 includes a first portion 506a, which extends beneath the second set of magnets 516, and a second portion 506b. The portion 506b is at a different height than portion 506a, as it extends into an inner core of the hover engine. The interior of carrier 510, which holds the second set of magnets 516, is hollow, and as described above, suspended from component 508. The hollow portion provides room for portion 506b to extend upwards.

At the axis of rotation of the motor, which is through shaft 518, a stationary structure with two pieces, 520a and 520b, is located on either side of the housing portion 506b. The two pieces are secured together via fastener through apertures 534. In one embodiment, piece 520b can be integrally formed with a lower portion of the housing 506. A bearing 522 is placed above component 520b. The shaft portion 518 rests on bearing 522 and the bearing 522 rests on component 520b, which is stationary. The bearing allows shaft to rotate relative to the stationary portion 522b.

When not in flight, the hover engine can rest on component 520a and the weight of a vehicle and payload can be supported on this component. In one embodiment, the payload can be a person. The weight of the vehicle and payload can be transferred through portion 520a, 520b, bearing 522 and shaft 518. The shaft exerts force on bearing 524 which is secured within the extended portion 528 of the top cover 502. Thus, the force is transferred from the bearing t to the cover 502.

An advantage of this approach is the bottom portion of housing 506a can be made thinner, which reduces the minimum distance between the bottom of magnets 516, and the conductive substrate. Structure 506a can be made thinner because it doesn't have to support the weight of the vehicle and payload when it is resting or a greater weight if the vehicle strikes the ground. If components 520 and 520b were not present and structure 506a extended across a bottom of the hover engine 500, structure 506a would have to be made much thicker to support a weight of the vehicle and the payload, such that it doesn't bend and impinge into the rotating components. By extending the structure 520a into the interior portion between the magnets 516, the structure 520a may extend only slightly below the bottom of the housing 506a, which again helps to maintain the minimum distance between the bottom of magnets 516 and the conductive substrate.

FIG. 13B is an outside perspective view 550 of the hover engine 500 shown in FIG. 13A. FIG. 13C is a side view of the hinge mechanism shown in FIG. 13B. In this embodiment, a hinge mechanism 560 is coupled to the top cover 502 of the hover engine housing. As described above, the hover engine can be coupled to a support structure in a fixed orientation such that the hover engine is non-tiltable.

The hinge mechanism 560 includes a top portion 562 and a bottom portion 564. An aperture 572 in top portion 562 provides a path for wires which provide current to the motor to extend into the hover engine. When a battery is used, the current can pass through an electronic speed controller and then into the motor. Four links, such as 566a and 566b, couple the top portion 562 and the bottom portion 564. Each link rotates around two axes. In one embodiment, bearings, such as 568 and 570, can allow each link to rotate about each of its two axes. Using multiple rotation axes in the hinge mechanism allows the weight of the hover engine to be distributed. This approach can generate less wear and stress on the hinge mechanism 560 as compared to when a single rotational axis is used in the hinge mechanism. Although not shown, a force can be applied to the hover engine from an actuator or from a user to cause a tilt of the device.

Vehicle Configurations and Navigation, Guidance and Control (NGC)

Next, various configurations of magnetically lifted devices including multiple hover engines are described with respect to FIGS. 14-19. In particular, arrangements of hover engines and then their actuation to provide movement are described. In addition, Navigation, Guidance and Control (NGC) functions, which can be applied to magnetically lifted devices, are discussed.

Figure 14:
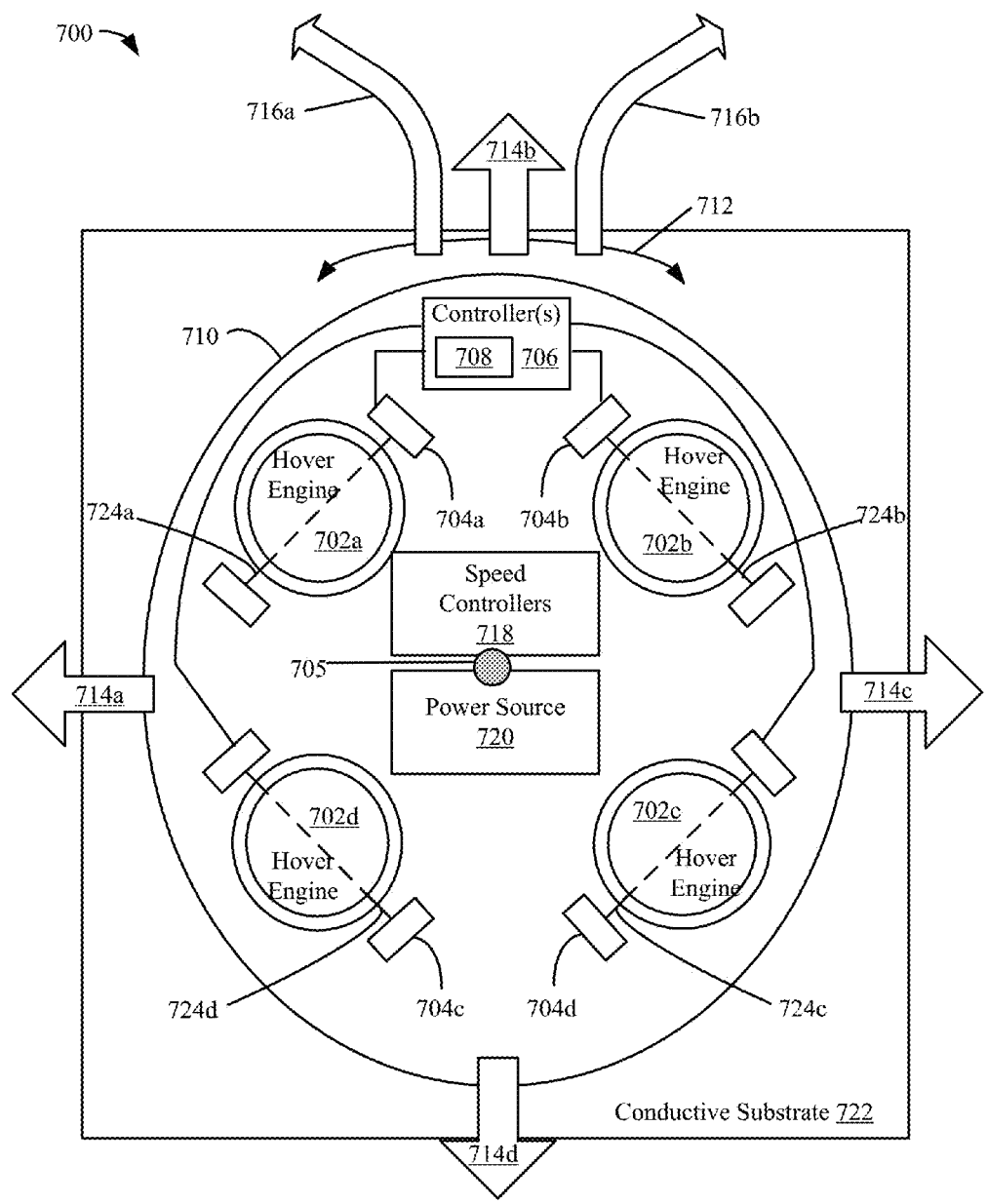
FIG. 14 is an illustration of a magnetically lifted device with four tiltable hover engines in accordance with the described embodiments.

FIG. 14 shows a top view of a vehicle 700 configured to operate over a conductive substrate 722. The vehicle 700 includes four hover engines, 702a, 702b, 702c and 702d. Each hover engine includes a magnet carrier and a motor and a mechanism which enables a propulsive force to be output from each hover engine. In one embodiment, each of the hover engines 702a, 702b, 702c and 702b can be tilted around an axis, such as 724a, 724b, 724c, 724d, via control of an actuator. In particular embodiments, the hover engines can each be individually actuated so that the direction and amount of the tilt angle as a function of time can be individually changed for each of the four engines.

In alternate embodiments, two or more hover engines can be controlled as a unit. For example, two or more hover engines can be mechanically coupled to a single actuator. The single actuator can move both hover engines simultaneously. In another example, the two or more hover engines can be digitally coupled such that the two or more hover engines are always moved together simultaneously, i.e., a movement of one hover engine specifies some specific movement of another hover engine, such as both being tilted in the same manner. When independently controlled, the movement of one hover engine can affect the movements of other engines, such as to implement GNC functions. However, a second hover engine may not be always constrained to a specific control movement in response to the movement a first hover engine as in the case when two hover engines are controlled digitally and/or mechanically controlled as unit.

The actuators associated with each hover engine can be coupled to one or more controllers 706 and an IMU 708 (Inertial Measurement Unit). The actuators can each also have a separate controller which responds to commands from the controller 706. The controller 706 can also be coupled to a power source 720 and one or more speed controllers 718. The one or more speed controllers 718 can be mechanical speed controller or electronic speed controllers. The power source can be on-board or off-board. The hover engines are secured via a housing and associated support structure 710.

The center of mass of the vehicle is indicated by the circle 705. The center of mass affects the moments generated when each of the four hover engines are actuated. In particular embodiments, the vehicle can include a mechanism which allows the center of mass to be adjusted in flight, such as a mechanism for moving a mass from one location to another. For example, in an airplane, fuel can be moved from one tank to another to affect the center of mass characteristics.

An IMU 708 works by detecting the current rate of acceleration using one or more accelerometers, and detects changes in rotational attributes like pitch, roll and yaw using one or more gyroscopes. It may also include a magnetometer, to assist calibrate against orientation drift. Inertial navigation systems can contain IMUs which have angular and linear accelerometers (for changes in position). Some IMUs can include a gyroscopic element (for maintaining an absolute angular reference).

Angular accelerometers can measure how the vehicle is rotating in space. Generally, there is at least one sensor for each of the three axes: pitch (nose up and down), yaw (nose left and right) and roll (clockwise or counter-clockwise from the cockpit). Linear accelerometers can measure non-gravitational accelerations of the vehicle. Since the can move in three axes (up down, left & right, forward & back), there can be a linear accelerometer for each axis.

A processor can continually calculate the vehicle's current position. First, for each of the six degrees of freedom (x, y, z and θx, θy and θz), the sensed acceleration can be integrated over time, together with an estimate of gravity, to calculate the current velocity. Then, the velocity can be integrated to calculate the current position. These quantities can be utilized in the GNC system.

Returning to FIG. 14, as described above, the forces generated from changing a tilt of a rotating magnet carrier relative to the substrate 722 are directed primarily along the tilt axes when the vehicle is parallel to the substrate 722. For example, a tilt of hover engine 702a can generate a force which is primarily parallel to axis 724a.

With the tilt axes arranged at an angle to one another as shown in FIG. 14, a combination of magnet carriers can be actuated to generate a net linear force in any desired direction. Further, the magnet carriers can be actuated in combination to cancel moments or if desired induce a desired rotation in a particular direction. In addition, different combinations of magnet carriers can be actuated as a function of time to generate a curved path in a desired direction(s) as a function of time. Yet further, a combination of magnet carriers can be actuated so that the vehicle moves along linear or curved path and rotates around an axis while moving along the path.

The tilt control can be used alone or in combination with rotational velocity control of each hover engine. The translational and lifting forces which are generated can vary as a function of the rotational velocity and a hover height. A rotational speed of a hover engine can be varied relative to other hover engines or in combination with other hover engines to change the magnitude of lifting and drag forces which are output from the one or more hover engines. For example, the rotational velocity control may be used to counter imbalances in forces, such as resulting from a shifting center of mass. For an electric motor, the one or more controllers 706 can control the speed controllers 718 to change the rotational velocity of a hover engine.

In the example of FIG. 14, angles can be defined relative to the tilt axes. For example, the angle between tilt axis 724a and 724b is approximately ninety degrees. The angle between tilt axis 724a and 724c is approximately ninety degrees and the angle between tilt axis 724a and tilt axis 724c is 180 degrees.

In one embodiment, the tilt axes of the hover engines opposite one another can be parallel to one another, i.e., an angle of one hundred eighty degrees. However, the angle between the tilt axes of the hover engines adjacent to one another don't have to be equal. In particular, the angle between tilt axes 724a and 724b can be a first angle and the angle between tilt axes 724a and 724c can be one hundred eighty degrees minus the first angle where the first angle is between zero and one hundred eighty degrees. For example, the angle between tilt axes 724a and 724b can be ten degrees and the angle between tilt axes 724a and 724c can be one hundred seventy degrees. In general, the angles between all of the tilt axes, 724a, 724b, 724c and 724d can be different from one another.

In FIG. 14, the hover engines can be tilted to generate various movements, such as left, 714a, right 714b, forward 714b and back 714b. Further, the hover engines can be tilted as a function of time to cause the vehicle 700 to follow a curved path, such as 716a and 716b. In addition, the hover engines can be tilted to cause the vehicle 700 to rotate in place in a clockwise or counterclockwise rotation 712. For example, without rotating, the vehicle 700 can be controlled to move in a first straight line for a first distance, and then move in a second straight line perpendicular to the first straight line for a second distance. Then, the vehicle 700 can rotate in place.

A vehicle with a configuration similar to vehicle 700 was constructed. The vehicle cylindrically shaped with a diameter of 14.5 inches and a height of 2.125 inches. The vehicle weighed 12.84 pounds unloaded. Tests were performed where the vehicle carried more than twenty five pounds of payload beyond its unloaded weight.

Four hover engines are used. Each hover engine includes a magnet carrier which is 4.25 inches in diameter. Sixteen ½ inch cube magnets are arranged in each magnet carrier in a circular pattern. The arrangement is similar to the configuration shown in FIG. 20 which employs twenty magnets. N52 strength Neodymium magnets are used.

One motor is used to turn each magnet carrier. The motors were Himax 6310-0250 out runners. The motors each weigh 235 grams. The optimum working range for the motors is 20 to 35 Amps with a max current of 48 Amps. The motors are cylindrically shaped with a length of 32 mm and a diameter of about 63 mm. The motor power is about 600 Watts and the motor constant, $K_v$, is about 250.

Electronic speed controllers were used for each motor. In particular, Phoenix Edge electronic speed controller (Edge Lite 50, Castle Creations, Inc. Olathe, Kans.) were used. The speed controllers are coupled to batteries. In this embodiment, two VENOM 50C 4S 5000MAH 14.8 Volt lithium polymer battery packs are used (Atomik RC, Rathdrum, Id.)

Four Hitec servos were used (FIS-645MG Ultra Torque, Hitec RCD USA, Inc. Poway, Calif.) as actuators. The servos put out a maximum torque of 133 oz-in and operate between 4.8 and 6V. Depending on the size of the hover engine which is actuated, different servos with varying torque output capabilities may be used and this example is provided for illustrative purposes only.

In addition, one actuator is shown per motor. In alternate embodiments, a single actuator can be used to tilt more than one hover engine. In yet other embodiments, a plurality of actuators can be used to change an orientation of a magnet carrier and/or motor. In further, embodiments, one or more actuators in combination with an input force provided from a user can be used to change an orientation of a magnet carrier and/or motor.

The servos are used to tilt a motor and a magnet carrier in unison. The control system is configured to independently tilt each hover engine including the motor and magnet carrier. In a particular embodiment, the motor and magnet carrier are configured to tilt through a range of −10 to 10 degrees. Ranges, which are greater or small than this interval can be used and this example is provided for the purposes of illustration only.

In one embodiment, the same tilt range can be implemented for each hover engine. In other embodiments, the tilt range can vary from hover engine to hover engine. For example, a first hover engine can be tilted between a range of −15 to −15 degrees and a second hover engine can be tilted between −5 and 10 degrees.

A Hobbyking KK2.1.5 Multi-rotor LCD Flight Control Board with 6050MPU and an Atmel 644PA was used for control purposes. The board is 50 mm×50 mm×12 mm and weighs 21 grams. The input voltage is 4.8-6V. The gyro/accelerometer is a 6050MPU InvenSense, Inc. (San Jose, Calif.). It has a MEMS 3-axis gyroscope and a 3-axis accelerometer on the same silicon die together with an onboard Digital Motion Processor™ (DMP™) capable of processing complex 9-axis Motion/Fusion algorithms.

The vehicle was able to climb up sloped surfaces. In a test on a flat track, an acceleration of 5.4 ft/sec$^2$ was measured, which is about 0.17 g's. The acceleration depends on the thrust force which is output, the overall weight of the vehicle, the tilt angle of the magnet carriers and the magnet carrier magnet configuration. Thus, this example is provided for the purposes of illustration only.

In particular embodiments, a vehicle can be controlled via a mobile control unit. The mobile control unit can be coupled to a vehicle via a wireless or wired communication link. The mobile control unit can include one or more input mechanisms, such as control sticks, a touch screen, sliders, etc.

The mobile control can receive inputs from the input mechanisms and then send information, such as commands, to the vehicle. A command could be move right, move in some direction or rotate in place. The GNC system on the vehicle can receive the command, interpret it and then in response generate one or more additional commands involving controlling the actuators and/or hover engines to implement the commands. For examples, one or more of the actuators on the vehicle can be controlled to implement a received movement or rotation command.

In one embodiment, the mobile control unit can be a smart phone, with a touch screen interface. An application executed on the smart phone can generate an interface on the touch screen which is used to input control commands. In addition, the application can be configured to output information about the vehicle's performance to a display, such as speed, orientation, motor RPM, flight time remaining, etc. The smart phone can be configured to communicate with the vehicle via a wireless communication interface, such as but not limited to Bluetooth.

In another embodiment, a hand-held control unit, such as one used to control a quad copter or radio controlled car can be used. Hand-held control units can include multiple channels, a channel switch, a digital display, an antenna, control sticks, trims and an on/off switch. One example is a Spektrum DX6i DSMX 6-Channel transmitter (Horizon Hobby, Inc., Champaign, Ill.). Next, some details of tilting a magnet carrier to control a vehicle are described.

Figure 15A:
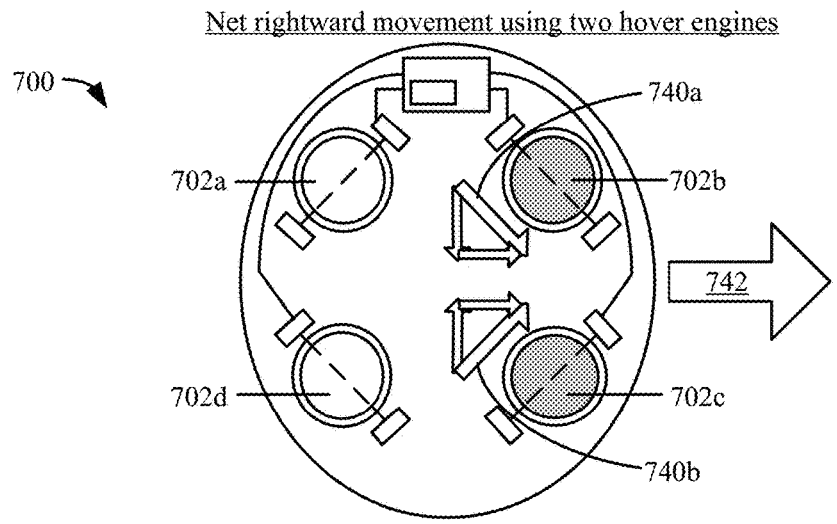
FIGS. 15A to 15C are illustrations of a magnetically lifted device with four tiltable hover engines tilted in various configurations in accordance with the described embodiments.
Figure 15B:
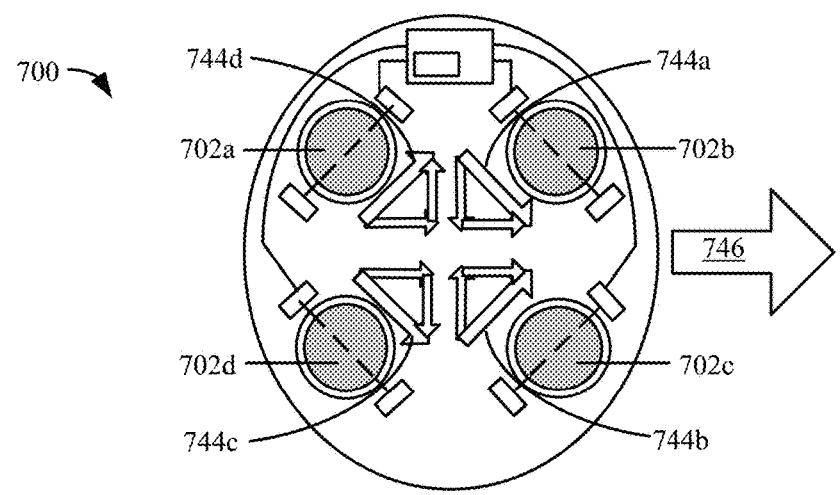
Figure 15C:
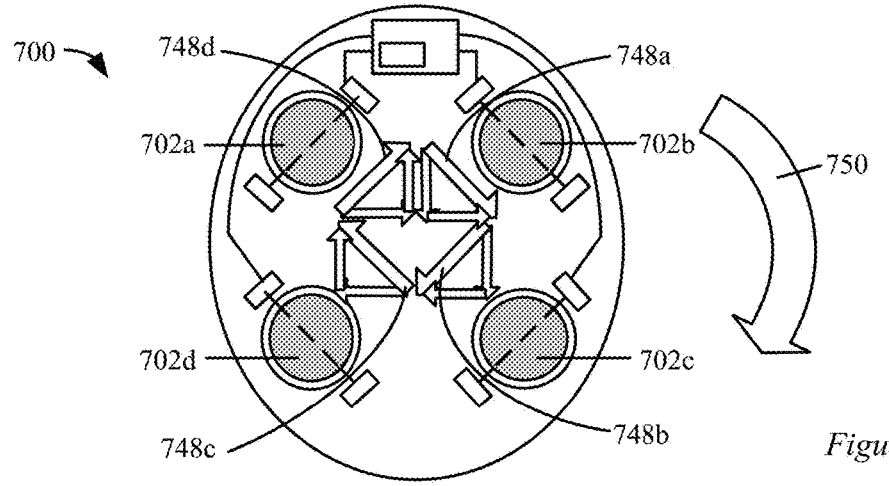

FIGS. 15A, 15B and 15C, show some examples of actuating different combination of hover engines to produce a movement or rotation. In FIG. 15A, two hover engines 702b and 702c, which are shaded, are actuated to produce a net rightward force 742 which can move the vehicle to the right 742. The direction of the net force generated by each of the two hover engines is shown by the adjacent arrows, 740a and 740b. Hover engine 702b generates a net force 740a with a downward and rightward force component. Hover engine 702c generates a net force 740b which is upwards and to the right.

The upward and downward translational forces cancel when the two hover engines are actuated to generate the same magnitude of force which results from the eddy currents induced in the substrate. The rightward force component are additive and produce a net translational force to the right. When the two hover engines are an equal distance from the center of mass of the vehicle, the moments generated from the two hover engines cancel one another and thus rotational stability can be maintained.

The hover engines, even when identical, may not be actuated the same amount. For example, the vehicle 700 can be tilted such that one of hover engine 702b and 702c is closer to the substrate. The distance of the hover engine to the substrates affects the force output from the hover engine as a result of its tilt. Hence, different tilt angles may be required to balance the forces output from each hover engine.

Further, when the vehicle 700 is loaded, the center of mass can shift depending on how the weight of the payload is distributed. Thus, the center of mass can shift from the unloaded state to the loaded state and the two hover engines may no longer be an equal distance from the center of mass of the vehicle. In this instance, when a pair of hover engines each generates the same amount of net force, a net moment may be present because the two hover engines are different distances from the center of mass. Thus, the combination of hover engines which are used and the amount of actuation of each hover engine may have to be adjusted to account for the shifting center mass due to payload shifts or the overall orientation of the vehicle 700 relative to the substrate over which it is operating.

The magnitude of the effects resulting from changes in the center of mass will depend on how much the center of mass shifts from the loaded to unloaded state. Further, in some instances, the center of mass can shift during operation if the payload is allowed to move during operation or if the payload is being lessened. For example, if a fuel is consumed during operation of the vehicle, the center of mass of the vehicle may change due to the fuel being consumed. As another example, if one or more persons is riding on a vehicle and can move around, the center of mass may change. Thus, in particular embodiments, the center of mass may be changing dynamically during operation and the GNC system can be configured to account for the shifts in the center of mass of the vehicle when maintaining rotational and translational control.

In FIG. 15B, a net rightward movement is generated using four hover engines. In this example, all four hover engines, 702a, 702b, 702c and 702d are actuated to generate a net force 746 in the rightward direction. In general, the hover engines can be actuated to generate a net translational force which is substantially in the rightward direction. In particular, the hover engines are actuated to cancel translational forces in other than rightward directions. Further, hover engines can be actuated such that the net moment acting on the vehicle is zero. As described above, to rotate the vehicle, a net moment can be generated which rotates the vehicle in a clockwise or counter-clockwise direction.

In FIG. 15C, the four hover engines, 702a, 702b, 702c and 702d, are shown actuated in a manner which causes a net moment in the clockwise direction. The translational forces associated with the four hover engines cancel one another. Thus, the vehicle can rotate in place.

In the example of FIGS. 15A, 15B and 15C, all four hover engines' tilt axes are orientated about the edges of a rectangle. This configuration allows the vehicle to move upward/downward or left/right on the page with equal ease. In other embodiments, the hover engines tilt axes can be located around the perimeter of a parallelogram. Thus, the hover engine may more easily generate a translational forces in particular directions, such as left/right on the page versus up/down on the page. Further, in some embodiments, as described above, mechanisms can be provided which allow the direction of a tilt axes to be changed on the fly. Thus, it may be possible to change the configuration of the hover engine tilt axes on the fly.

In the example of FIGS. 15A, 15B and 15C, the force vector generated by each hover engine is assumed to be an equal distance from the center of mass of the vehicle. In other embodiments, the hover engines can be different distances from the center of mass of the vehicle. For example, a pair of two hover engines can each be a first distance from the center of mass and a second pair of hover engines can each be a second distance from the center of mass.

Further, even when the hover engines are the same distance from the center of mass the hover engines can be configured to output different levels of propulsive forces. For instance, one hover engine may use a greater volume of magnets than another hover engine to output more force. In another example, the rotational velocities of two identical hover engines can be different, which can cause the hover engines to output different levels of propulsive forces relative to one another. In one embodiment, multiple hover engines used on a vehicle can be identical and operated at a similar rotational velocity so that they each output a similar amount of force.

In general, when a plurality of actuatable hover engines are used, each hover engine can be positioned at a different distance from the center of mass or combinations of hover engines may be positioned at the same distance from the center of mass. Further, the size of each hover engine, the magnet configurations used on each hover engine and the resultant force output by each hover can vary from hover engine to hover engine on a vehicle. Although, combinations of hover engines within the plurality of hover engines can be selected with equal force generating capabilities. A GNC system can be designed which accounts differences in hover engine placement location on a vehicle and force generation capabilities which differ between hover engines. In addition, the GNC system can be configured to account for dynamic loading and dynamic orientation changes of a vehicle, which affect the forces and moments output from each hover engine.

In the examples above, the magnet carriers which are part the hover engines are configured to generate lift, propulsive and rotational forces. In other embodiments, it may be desirable to specialize the hover engines. For example, a first hover engine can be configured to primarily generate lift and may be not actuatable for generating propulsive forces. Then, additional hover engines can be configured to generate some portion of the lift and can be actuatable to generate propulsive and rotational forces as well which can be used to control and direct a vehicle. Some magnet configurations may be more suitable for generating propulsive forces as compared to lifting forces. Hence, when multiple hover engines are used on a vehicle, the magnet configurations may be varied between the hover engines.

Figure 16:
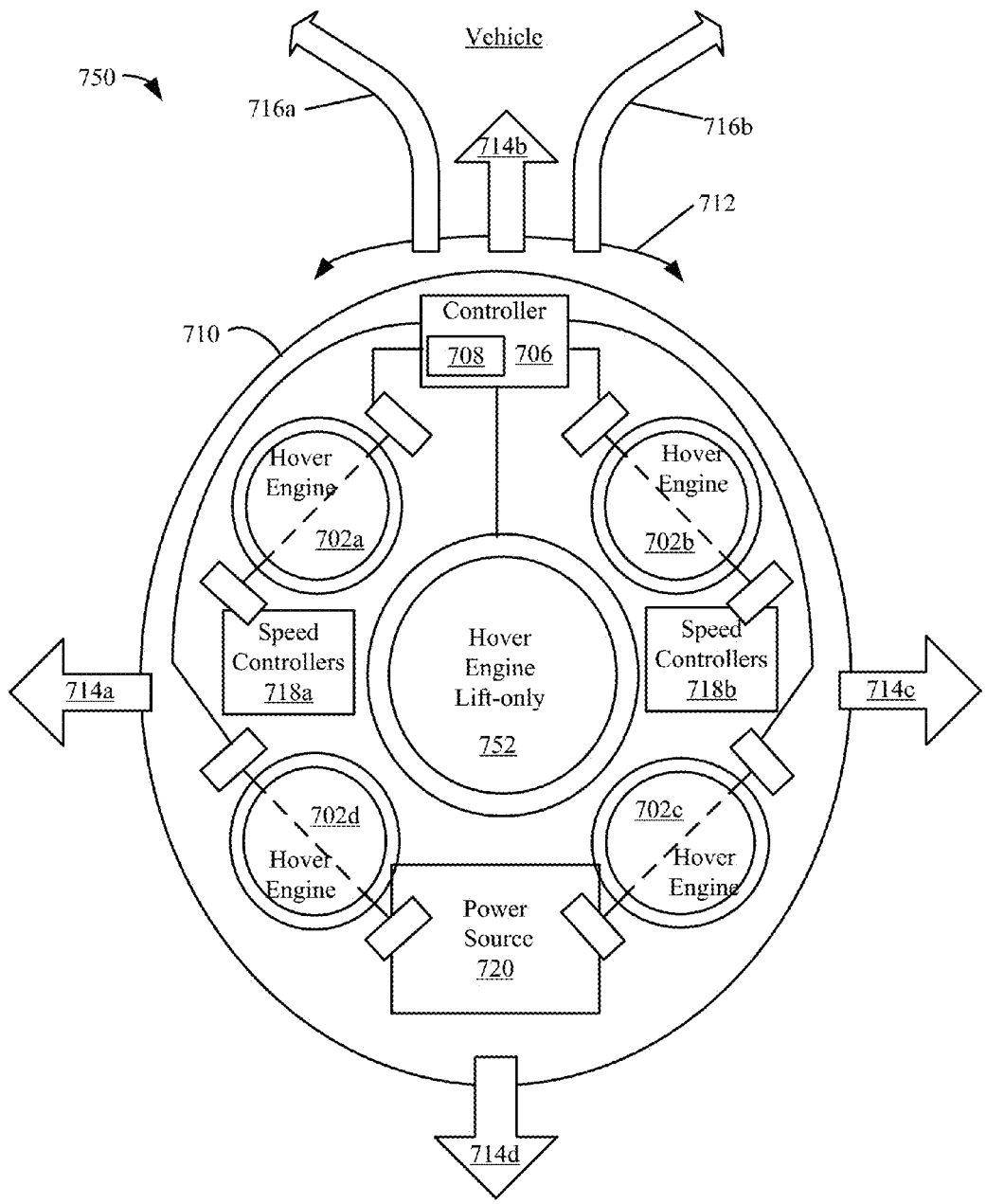
FIG. 16 is an illustration of a magnetically lifted device with four tiltable hover engines and one fixed hover engine in accordance with the described embodiments.

FIG. 16 shows an example of vehicle 750 with five hover engines. Four of the hover engines are configured in the manner described above with respect to FIG. 14. However, a fifth hover engine 752 located in the center of the vehicle is configured to generate lift only and is non-actuatable whereas four hover engines, similar to what was previously described, can be actuated to generate the propulsive, rotational and control forces.

In particular embodiments, the four hover engines, 702a, 702b, 702c and 702d, may not be able to hover the vehicle alone. For example, in one embodiment, the four magnet carriers may not be able to hover an unloaded vehicle and may require some lift to be generated from the lift-only engine. In another embodiment, four magnet carriers may be able to hover the vehicle while it is unloaded. However, if the vehicle carries some amount of payload, then operating the lift only hover engine may be needed.

In one embodiment, the height above the surface of the bottom of the magnets in the propulsive hover engines and height above the surface of the bottom of the magnets in the lift only hover engine can be offset from one another when the magnet carriers in the propulsive hover engines and the lift only hover engines are parallel to the surface. For example, the height of the bottom of the magnets in the propulsive magnet carriers can be positioned at a distance farther away from the surface than the height of the bottom of the magnets in the lifting magnet carrier. The amount of force needed to tilt a magnet carrier in a hover engine relative to the surface can increase as the magnet carrier gets closer to the surface. The amount of force increases because magnetic forces are generated non-linearly and increase the closer the magnets are to the surface. Thus, by keeping the propulsive magnet carriers farther away from the surface than the lifting magnet carriers during operation, it may be possible to utilize less force to tilt the propulsive magnet carriers. Magnet carriers with less magnet volume on the propulsive magnet carriers as compared to the lifting magnet carriers can also lessen the force output from the propulsive magnet carriers and hence require less force to tilt than the lifting magnet carriers.

In one embodiment, a mechanism can be provided, separate from the tilt mechanism, which can be used to control a distance of a hover engine, such as the propulsive magnet carrier from the surface. For example, the mechanism can be configured to move the hover engine in the vertical direction closer or farther away from the surface. This capability can also be used when the vehicle is first started. For example, while at rest, the bottom of the vehicle can rest on the ground and the hover engines can be pulled up into the vehicle enclosure. Then, the hover engines can be started. After the hover engines reach a certain velocity the hover engines can be moved relative to the vehicle such that the hover engines are closer to a bottom of the vehicle.

Since the propulsive hover engines may not be needed to carry the full lift load, in some embodiments, it may be possible to use smaller propulsive and control magnet carriers than if the control and propulsive magnet carriers are also used to carry the entire lift load. One advantage of using this approach is that if the control and propulsive magnet carrier can be made smaller (e.g., a smaller radius and moment of inertia), the amount of force used to actuate the magnet carriers can be smaller. Thus, it may be possible to use smaller, lighter and less expensive actuators.

Another advantage of using hover engines specialized for lift or control is that the operating conditions of the hover engine used to generate lift most efficiently can be different than the operating conditions used to generate the propulsive and control forces most efficiently. Thus, when some of the hover engines are used primarily for lift only, these hover engines may be operated at different conditions as compared to the hover engines configured to generate control forces. For example, to generate relatively more propulsive forces, a control hover engine can be operated at a rotational velocity which is near peak drag, i.e., a lower lift to drag ratio as compared to a higher rotational velocity. In contrast, a lift-only hover engine may be operated at a higher rotational velocity to minimize drag and maximize lift because, as described above, after peak drag the drag force on a hover engine can decrease and the lift to drag ration can increase as the rotational velocity increases.

Next, the NGC system, which can be used to control a hover engine configuration to move a magnetically lifted vehicle, is described. First, each of the functions of navigation, guidance and control (NGC) are briefly discussed. These functions can be incorporated as logic for an NGC system implemented as circuitry on a magnetically lifted device. For example, the NGC system can be a component of the controller 706 in the previous figures.

First, navigation is figuring out where you are and how you are oriented relative to a defined reference frame. For example, where you are could be in your car in the driveway, and your orientation is trunk of the car towards the curb. In this example, the reference frame is a flat earth.

Second, guidance involves figuring out a path to take. In particular, guidance is figuring out how to get where you want to go based on where you are. Guidance comes after navigation, because if you don't know where you are, it is difficult to figure out which way to go. Guidance has potentially a very large number of solutions. However rules and constraints can be imposed to limit the solution size.

As an example, you know you are in your driveway with your backside towards the curb. How do you get to the store? A rule can be imposed that you have to follow the predefined system of roadways. This limits your guidance options. You might also include rules about obeying speed limits and stop signs. This shrinks the solution space further. You may also have vehicle limitations. For example, a four cylinder Corolla might not have the same acceleration capability as a Ferrari. This notion can be applied to different configurations of hover engines which can have different performance characteristics.

When the rules and limitations are combined, a guidance solution that defines orientation, velocity, and acceleration as functions of time can be obtained. In the guidance space, there can be flexibility to impose or relax the rules to achieve the performance which is desired. For instance, per the example above, when one is trying to reach a destination very quickly for some reason, one may choose to ignore speed limits for some period of time.

Control is getting the vehicle to perform as the guidance solution asks it to perform. This means accelerating, decelerating, maintaining velocity, etc. so that the vehicle follows the guidance solution as closely a desired. In the current example, the driver is the control system. Thus, he or she monitors the speed and acceleration and can make minute adjustments to maintain the desired conditions. In the examples above, the NGC system can make adjustments to the tilt angles of the hover engines to maintain the desired conditions.

Thus, the combination of navigation, guidance, and control allows a magnetically lifted vehicle to be moved in a desired way. As disturbances do enter the system, it may be important to regularly update the navigation, guidance, and control solutions. A system updated in this manner can form a closed loop system. The closed loop system may allow for more accurate motion of the vehicle under GNC.

In alternate embodiments, an open-loop controller, also called a non-feedback controller, can be used. An open-loop controller is a type of controller that computes its input into a system using only the current state and its model of the system. A characteristic of the open-loop controller is that it does not use feedback to determine if its output has achieved the desired goal of the input. Thus, the system does not observe the output of the processes that it is controlling.

For a magnetically lifted vehicle, the GNC can include combinations of 1) velocity control, 2) waypoint management, 3) acceleration/de-acceleration curves (profiles), 4) velocity profiles, 5) free path, which combines acceleration/de-acceleration profiles and velocity en route and 6) navigation. Navigation can include utilizing one or more of a) dead reckoning, b) an indoor positioning system, c) retro-reflectors, d) infrared, e) magnetics, f) RFID, g) Bluetooth, f) ultrasound and g) GPS. An indoor positioning system (IPS) is a solution to locate objects inside a building, such as a magnetically lifted vehicle, using radio waves, magnetic fields, acoustic signals, or other sensory information collected by appropriate sensors. Various types of sensors sensitive to different types of energies can be used in a navigation solution. Thus, these examples are provided for the purpose of description and are not meant to be limiting.

A method of GNC can involve establishing acceleration/de-acceleration profiles (curves, limits, etc.), which may include establishing velocity acceleration/de-acceleration profiles (curves, etc.). Next, a route can be created. The route can be converted into x and y path points on a surface.

In one embodiment, waypoints can be added. Typically, start and end are waypoints by default. What happens at waypoints (null, stop, specific velocity, etc.) can be defined. Path segments can be defined by waypoints.

Next, the orientation for each path segment (relative to velocity direction, relative to fixed point, spinning profile, etc.) can be defined. With the path segments defined, the GNC system can maneuver the vehicle along each path segment according to user defined velocity/acceleration profiles and orientations. Finally, the current position (x, y) of the vehicle can be monitored relative to a preplanned route with regular navigation updates. As the vehicle moves, a current position and desired position can be compared based upon the sensor data. Then, the system can be configured to correct for errors.

In some embodiments, the hover height of a vehicle can be controlled. Thus, the system can be configured to determine a height profile of a vehicle along a path segment. Then, while the vehicle is maneuvered along the path segment, the system can receive sensor data which is used to determine a height of the vehicle. The system can be configured to compare the measured height from the desired height and then correct for errors.

Next, an embodiment of a GNC system is described with the respect to FIGS. 17, 18 and 19 is discussed. In one embodiment, the GNC system can be used to control a vehicle with tiltable hover engines, such as vehicle 700 in FIG. 14. In this example, a wireless controller is used to control the vehicle. The wireless controller can generate input signals in response to user commands.

A proportional-integral-derivative controller (PID controller) is a control loop feedback mechanism (controller) often used in industrial control systems. A PID controller can calculate an error value as the difference between a measured process variable and a desired set point. The controller can attempt to minimize the error by adjusting the process through use of a manipulated variable.

The translational motion control for the vehicle can use a PID control system for lateral acceleration control 800. Two lateral acceleration inputs can be received from the user via the wireless controller. These inputs can be fed into their own individual PID control loops, as in FIG. 17.

Inside the control loop, the input can be differenced with the acceleration output feedback measured by the accelerometer. The resulting difference is the error. The error can be fed into the PID controller, which can have three components, the proportional control, the integral control, and the differential control.

The proportional element multiplies the error by a proportional gain, $K_p$. The integral element computes the sum of the errors over time, and multiplies this by the integral gain, $K_I$. The differential control differences the current input with the previous input, and multiples this difference by the differential gain, $K_D$. The proportional, integral, and differential elements are then summed and sent to the mixing logic as shown in equation 810 of FIG. 18.

The outputs from the mixing logic are sent into the plant, G. The resulting translational acceleration is the output from the plant. The vehicle's translational acceleration is measured by the accelerometers. This measured acceleration is fed back to the beginning of the PID control loop.

The spin control for the vehicle can use a PI (Proportional-Integral) control system 820 for yaw speed control, as shown in the block diagram in FIG. 19. A yaw acceleration input is received from the user via an RC controller. This yaw input can be differenced with the yaw output feedback measured by the gyroscope. The resulting difference is the error. This error can be fed into the PI controller, which has two components, the proportional control and the integral control. The proportional element multiplies the error by a proportional gain, $K_p$.

Magnet Configurations

In this section, various magnet configurations which can be used in magnet carriers are described with respect to FIGS. 20-27. Prior to describing the magnet configurations some terminology is discussed. Typically, a permanent magnet is created by placing the magnet in an outside magnetic field. The direction of the outside magnetic field is at some orientation relative to the geometry of the permanent magnet which is being magnetized. The direction of the outside magnetic field relative to the geometry of the permanent magnet when it is magnetized determines the poles of the permanent magnet where the north and south poles describe the polarity directions of the magnet.

In the examples below, a magnet carrier will have an axis of rotation. A first group of magnets can be referred to as "poles." Poles can have a polarity direction which is approximately parallel to the axis of rotation of the magnet carrier. Although, in some embodiments, magnets can be secured in the magnet carrier such that there is an angle between the polarity direction of the magnet and the axis of rotation of the magnet carrier. In addition, as described above, mechanisms can be provided which allow an orientation of a permanent magnet to be dynamically changed on a magnet carrier.

A second group of magnets can be referred to as "guides." The guides can be secured in a magnet carrier such that the angle between the polarity direction of the guides and the axis of rotation is approximately ninety degrees. However, the angle between the guide magnets and the axis of rotation can also be offset by some amount from ninety degrees. When pole magnets are secured in a magnet carrier with alternating polarity directions, the magnetic field lines emanating from the north pole of one pole magnet can bend around to enter into the south pole of an adjacent pole magnet and the magnetic field lines emanating from the south pole of one pole magnet can bend around to enter into the north pole of an adjacent magnet. Typically, the guide magnets can be placed between the poles. The "guide" magnets can guide the path of the magnetic fields that travel between the pole magnets.

The combination of pole magnets and guide magnets can be secured in a magnet carrier to form a configuration of polarity regions. On a magnet carrier, this configuration can be referred to a polarity arrangement pattern. In some of the examples below, a polarity arrangement pattern of the magnet carrier can be formed from a first polarity arrangement pattern which is repeated. For example, the polarity arrangement pattern can be formed from a first polarity arrangement pattern which is repeated two, three, four, five times, etc. In other embodiments, the polarity arrangement pattern of a magnet carrier can be formed from a first polarity arrangement pattern and a second polarity arrangement pattern where the first polarity arrangement pattern or the second polarity arrangement pattern is repeated one or more time.

A polarity region in a polarity arrangement pattern can have a common polarity direction. The polarity region can be formed from one or more magnets polarized in the common direction associated with the polarity region. In the examples which follow, single magnets, such as one inch cubic magnets, are described as forming a polarity region. However, multiple magnets of a smaller size can be used to form a polarity region. For example, a one inch cube polarity region can be formed from eight one half inch cubed magnets or sixteen one quarter inch cube magnets all arranged in the same direction. Thus, the examples below are provided for the purposes of illustration only and are not meant to be limiting.

An overall polarity arrangement pattern generated on a magnet carrier using permanent magnets can form a magnetic field with a particular shape and density of magnetic field lines. The magnetic field is three dimensional in nature and can be quite complex. The strength of the field at different locations can depend on the volume distribution of magnets and their associated strength.

Magnetic fields are generated when current is moved through a wire. For example, current passing through a wire coil generates a magnetic field which approximates a bar magnet. A magnet constructed in this manner is often referred to as an "electromagnet." In various embodiments, the magnetic field shapes and density of magnetic field lines from an arrangement of permanent magnets can be approximated by using arrangements of wires and passing current through the wires. Thus, the example of permanent magnets is provided for the purposes of illustration only and is not meant to be limiting.

A magnet carrier can have a top side and a bottom side. When eddy currents are generated, a bottom side can face the conductive substrate where eddy currents are induced by the rotation of the magnet carrier. Often, when permanent magnets are used, the permanent magnets can have at least one flat surface. As examples, cubic shaped magnets have six flat surfaces, whereas, cylindrically shaped magnets have two flat surfaces which are joined by a curved surface. In some embodiments, the at least one flat surface on each of the permanent magnets on a magnet carrier can be secured on a common plane. The common plane can reside close to the bottom side of the magnet carrier.

In alternate embodiments, a magnet carrier can be curved or angled. For example, the magnet carrier can be convex or concaved shape and/or include other curved portions. The bottom of magnets of the magnet carrier can be arranged to follow the bottom surface of the magnet carrier including curved surfaces. The magnets can have flat bottoms, such as cubic magnets. However, in other embodiments, the magnets can be formed in curved shapes to help confirm to the curvature of the magnet carrier.

As an example, a hover engine can be configured to operate within a pipe or a trough where the inner surface of the pipe includes a conductive substrate. The magnet carrier of the hover engine can be bowl shaped and bottom of the magnets on the magnet carrier can be arranged to follow outer surface of the bowl shape. When a magnet carrier is placed next to a curved surface, a larger proportion of the magnets on the magnet carrier can be closer to the inner surface of the pipe as compared to if the magnets were arranged in a common plane, such along the bottom of a flat disk.

Next, some magnet and magnet carrier configurations are described. FIG. 20 shows a magnet carrier 1200. The magnet carrier 1200 has a ten inch outer diameter. Twenty one inch cube magnets are arranged around the circumference of a circle. In particular, one inner radial side of each of the twenty one inch cube magnets is approximately tangent to a 3.75 inch radius circle.

The inner radial distance provides a small gap between each magnet. The gap between magnets increases as the radial distance increases. A minimum inner radial distance allows the magnets to approximately touch one another. The inner radial distance can be increased, which for the same amount of magnets increases the minimum gap between the magnets.

A structure of about 0.25 inches thick is provided between the outer radial edge of the magnets and the outer diameter 1202 of the magnet carrier. In one embodiment, the center of the magnet carrier can include a number of mounting points, such as 1204. The mounting points can be used to secure the magnet carrier 1200 to a rotatable member, such as a rotatable member extending from a motor.

The polarity arrangement pattern of the magnet carrier includes ten pole magnets and ten guide magnets. The polarity arrangement pattern is formed front a first polarity arrangement pattern as exemplified by magnets 1206, 1208, 1210 and 1212. In this example, the first polarity arrangement pattern is repeated four times. In other embodiments, the first polarity arrangement pattern can be used once on a magnet carrier or can be repeated two, three four times. etc. Further, more than one ring of magnets can be provided, which utilize the first polarity pattern. For example, the first polarity pattern can be repeated twice in an inner ring and then four times in an outer ring as shown in FIG. 20.

In the example above, the volume of each pole and guide magnet is the same. In other embodiments, the volume of the pole magnets and the guide magnets can vary from magnet to magnet while still maintaining the overall polarity arrangement pattern. For example, the volume of the pole magnets can be half the volume of the guide magnets. In another example, the volume of the pole magnets can be double the volume of the guide magnets.

The shape of pole and guide magnets is cubic with a one cubic inch volume for each magnet. In other embodiments, the volume of each polarity region can be maintained but a different shape can be used. In yet other embodiments, the polarity arrangement pattern can be maintained but different volume size can be used for each polarity region. For example, a single cubic magnet, with a 0.125 inch, 0.25 inch, 0.5 inch, 0.75 inch, 1 inch, 2 inch, 3 inch, 4 inch, 5 inch or more side can be used to provide each polarity region.

When twenty smaller cubic magnets are used, it is possible to arrange them around a smaller radius circle. When twenty larger cubic magnets are used, a larger radius circle is required. When the first polarity arrangement pattern is repeated more times and the magnet size is the same as in FIG. 20, a larger radius magnet carrier is required. When the first polarity arrangement pattern is repeated less times and the magnet size is the same, a smaller radius magnet carrier can be used. However, the magnets can also be arranged around the same radius but with a larger gap between magnets.

In FIG. 20, the pole and guide magnets which form the polarity arrangement pattern are arranged around a circle. In other embodiments, the magnets can be arranged around other shapes, such as a square or an oval. Some examples of using the first polarity arrangement pattern but arranging the magnets around a different shape are described with respect to the Figures which follow.

In the FIG. 20, the bottoms of the twenty magnets are arranged in a plane which is near the bottom of the magnet carrier 1200. The area of the bottom of the magnets is approximately twenty cubic inches and the volume of the magnets is approximately twenty cubic inches. In various embodiments, the area of the bottom the magnets closest to the bottom of magnet carrier 1200 divided by the Volume$^{2/3}$ is greater than or equal to one, i.e., Area/Volume$^{2/3} \geq 1$.

For magnet carrier 1200, the Area/Volume$^{2/3}$ equals about 2.71. In other embodiments, this ratio can be greater than or equal to two. In yet other embodiments, the ratio can be greater or equal to three. In further embodiments, this ratio can be greater than or equal to four. In yet other embodiments, this ratio can be greater than or equal to five.

Figure 21:
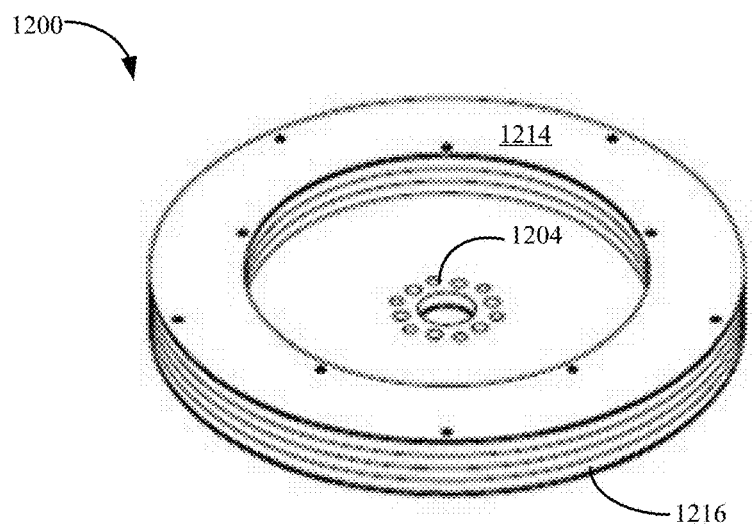

In FIG. 21, magnet carrier 1200 is shown secured in an enclosure with top piece 1214 and a bottom piece 1216. The enclosure is formed from a number of the layers. In this example, layers of aluminum and polycarbonate plastic are used where layers 1214 and 1216 are formed from aluminum. Other materials are possible and these are provided for the purposes of illustration only.

In one embodiment, the center region of the magnet carrier 1200 can provide a large enough space such that a motor can fit in this region. In other embodiments, a motor can be mounted above the top side 1214, such that a top side of the magnets is beneath the motor. In yet other embodiments, a motor can be mounted to the side of the magnet carrier 1200 and a transmission mechanism can be provided, such as a mechanism including belts and gears, to transfer a torque used to turn magnet carrier 1200. If the magnet carrier 1200 is bowl shaped, then the motor might fit partially or entirely below a top lip of the bowl.

Figure 22:
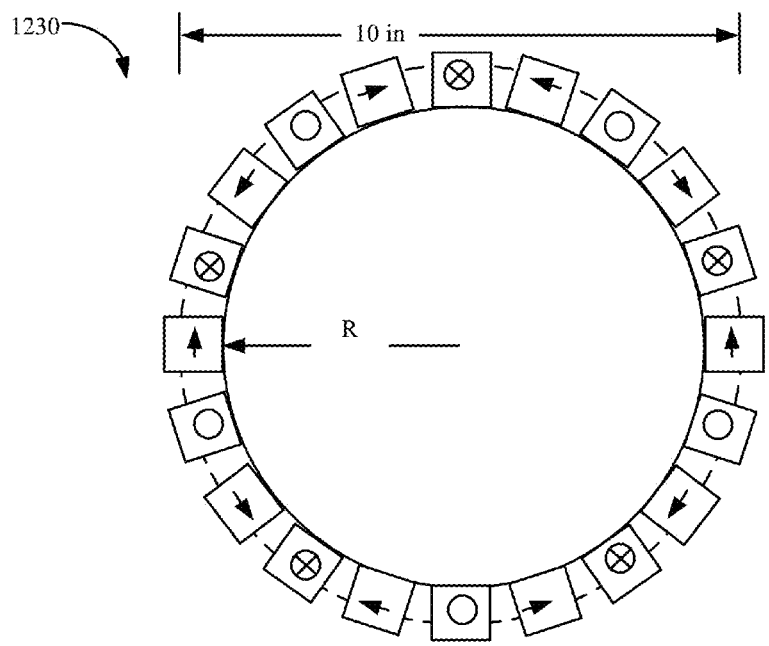
FIGS. 22 and 23 are top views of magnet configurations and polarity alignment patterns of magnets arranged in a circular pattern in accordance with the described embodiments.

In FIG. 22, a variation 1230 of the design 1200 in FIG. 20. In 1230, the number of magnets is twenty and the magnet volume is twenty cubic inches. The number of magnets is arranged around a larger circle as compared to design 1200. In particular, the radius of the circle is 4.25 inches instead of 3.75 inches. The increased circle radius results in a larger spacing between adjacent magnets. In one embodiment, design 1230 is configured in a magnet carrier with an outer diameter of eleven inches.

Figure 23:
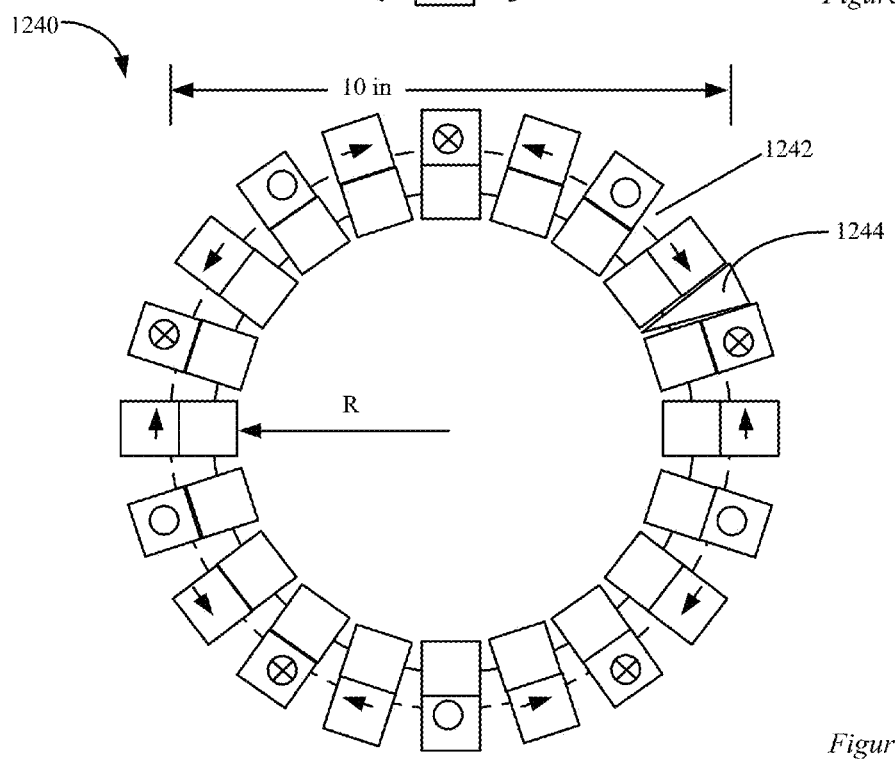

A second variation 1240 of design 1200 is shown in FIG. 23. In 1240, the number of magnets is twenty and the magnet volume is twenty cubic inches. However, magnets with half the height are used. The magnets are two inches by 1 inch by ½ inch (L×W×H). The magnets are arranged with the same starting position as shown in FIG. 20. However, each of the magnets extend radially outward an extra inch. To accommodate the additional radial length of the magnets, the radial distance of a magnet carrier can be increased.

The bottom area of the magnets is forty cubic inches. The area divided by the total volume$^{2/3}$ is about 5.43. In alternate embodiments, while maintaining a constant volume, this ratio can be increased by lowering the height of the magnets and extending their radially length. For example, in FIG. 23, the height of the magnets can be lowered to ⅓ inches and the length can be extended to three inches radially. For this design, the bottom area of the magnets is sixty square inches and the area divided by total volume$^{2/3}$ is about 8.14.

In 1240, a gap 1242 is shown between each magnet. In one embodiment, a magnet, such as triangle shaped magnet 1244 can be inserted in the gap. In one embodiment, the polarity of the gap magnet can be selected to match the polarity of the adjacent guide magnet or pole magnet. For example, the polarity of the adjacent guide magnet can be selected for all of the gap magnets or the polarity of the adjacent pole magnet can be selected for all the gap magnets. In another embodiment, two triangular shaped magnets can be placed in the gaps where one of the magnets' polarities matches the adjacent pole magnet and the other matches the adjacent guide magnet. In yet another embodiment, the twenty magnets can be custom shaped such that the magnets fit together with minimal gaps.

Figure 24:
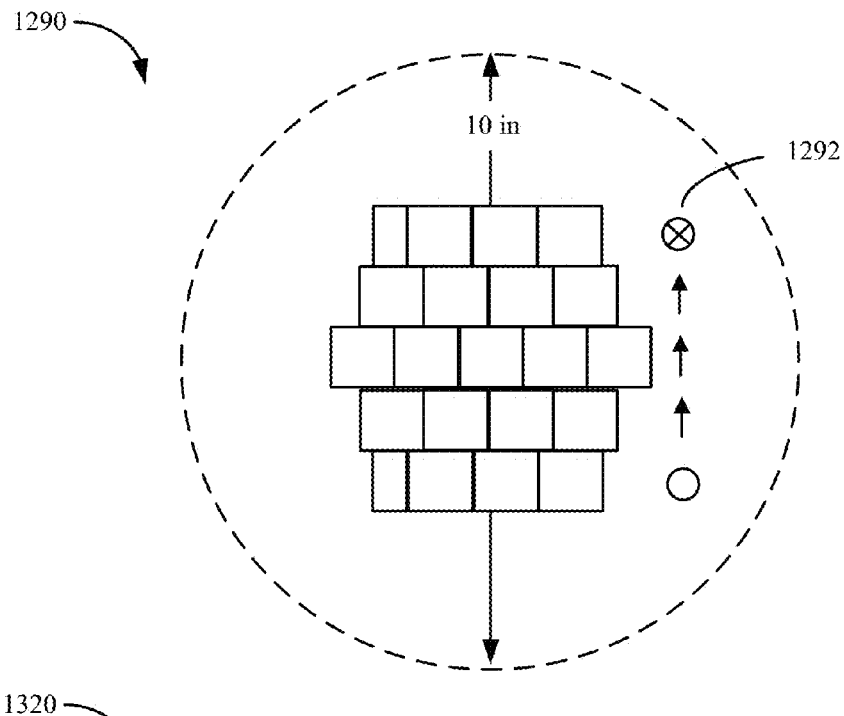
FIG. 24 is a top view of a magnet configuration and associated polarity alignment patterns which include magnets that span across the axis of rotation of a rotor in accordance with the described embodiments.

Yet another designs is shown in FIG. 24, the number of rows is five. In particular, two rows of 3.5 in by 1 in by 1 in magnets, two rows of 4 in by 1 in by 1 in and one row of 5 in by 1 in by 1 in magnets are provided for a total volume of 20 cubic inches of magnets. Five rows enable the magnets to fit in approximately a three inch radius circle. A circle with a twenty inch area has a radius of 2.52 inches, which is the smallest radius which can be used. Thus, design 1290 is approaching this limit while employing rectangular shaped magnets.

The polarity arrangement pattern 1292 is used for design 1290. Two poles and a single guide magnet polarity are used. The ratio of guide magnet volume to pole magnet volume is 1.86.

The polarity arrangement pattern 1292 employs three polarities regions. Many different designs alternatives are possible where the total volume of magnets in the design and the percentage of the total volume allocated to each of the three polarities vary from design. Further, the shape of magnets forming each of the three polarity regions can be varied from design to design. However, the percentage of the total volume allocated to each of the three polarity regions is different and the shape of each of the three polarity regions is different.

In FIG. 24, in one embodiment, a small space in the magnet configurations can be provided near the axis of rotation to allow a rotation member to extend through the space and attach to the structure of the magnet carrier. In another embodiment, a structure can be provided which extends over the top and sides of the magnets and a rotational member can be secured to this structure.

Figure 25:
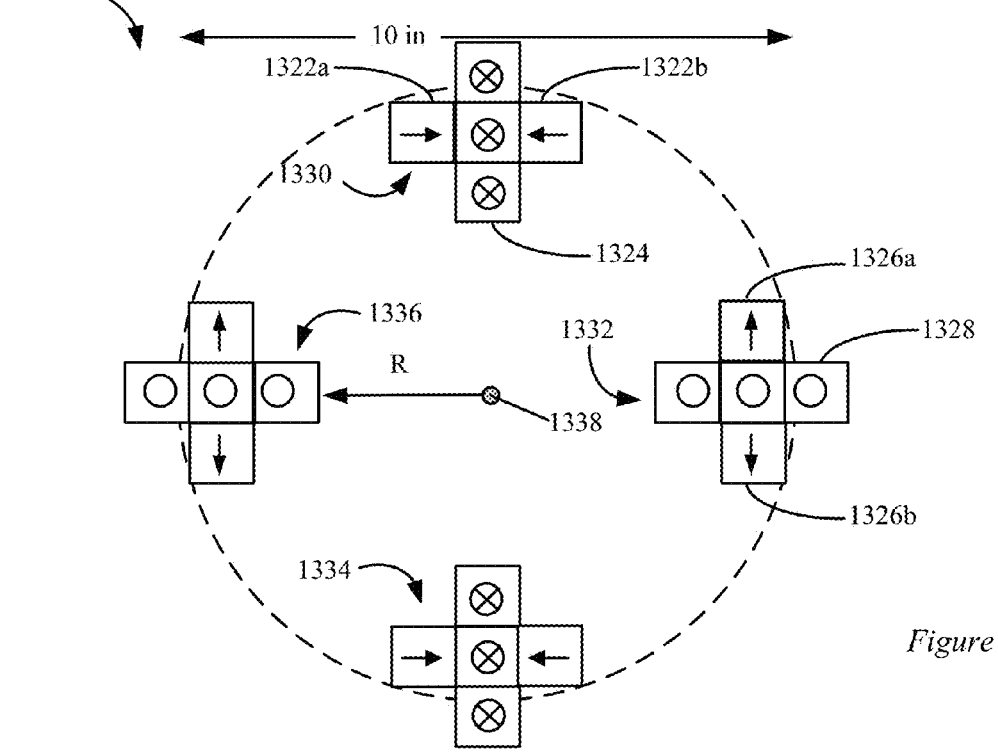
FIG. 25 is a top view of a magnet configuration and associated polarity alignment patterns which include magnets arranged in a cluster in accordance with the described embodiments.

Another magnet configuration 1320 is shown in FIG. 25. Again, twenty one inch cube magnets are shown. The magnets are arranged in four clusters, 1330, 1332, 1334 and 1336, each with five cubic inches of magnets. Each cluster includes pole and guide magnets.

As an example, cluster 1330 includes a pole section 1324 with three cubic inch magnets. The magnets in the pole section are arranged in along a radial line. The pole section 1324 is orientated to point into the page. Two guide magnets 1322a and 1322b point towards the center of the pole. The ratio of the guide magnet volume to pole magnet volume is 2/3.

Cluster 1332 includes pole section 1328. The pole section includes three one inch cube magnets aligned along a radial line from the axis of rotation 1338. The polarity of the magnets in the pole section 1328 is out of the page, i.e., the open circles represent a north poles and the circles with "X" inside represent a south pole. Two guide magnets 1326a and 1326b are provided. The polarity of the guide magnets is away from the pole section 1328.

The clusters 1330 and 1332 provide a polarity arrangement pattern. This pattern is repeated with clusters 1334 and 1336. In various embodiments, a magnet carrier can be formed with only clusters 1330 and 1332 or the polarity arrangement pattern can be repeated once, twice, three, four times, etc.

In various embodiments, the ratio of the guide magnet volume to pole magnet volume can be varied. Further, each individual cluster can be rotated by some angle. For example, the pole section can be aligned perpendicularly to a radial line from the axis of rotation 1338. In addition, the volume of magnets in each cluster can be varied. Also, the radial distance of the magnets from the center axis of rotation 1338 can be varied.

Yet further, the shape of the pole sections, such as 1324 and 1328, can be varied. For example, the pole sections 1324 and 1328 can be formed as a single cylindrically shaped magnet with a volume of three cubic inches, such as a one inch high cylinder with a radius of about a 0.98 inches or a ½ inch high cylinder with about a 1.38 inch radius. In the example of design 1320, the guide magnets in each cluster are arranged along a line. In other embodiments, the guide magnets don't have to be arranged along a line. The shape of the guide magnets can also be varied.

Figure 26:
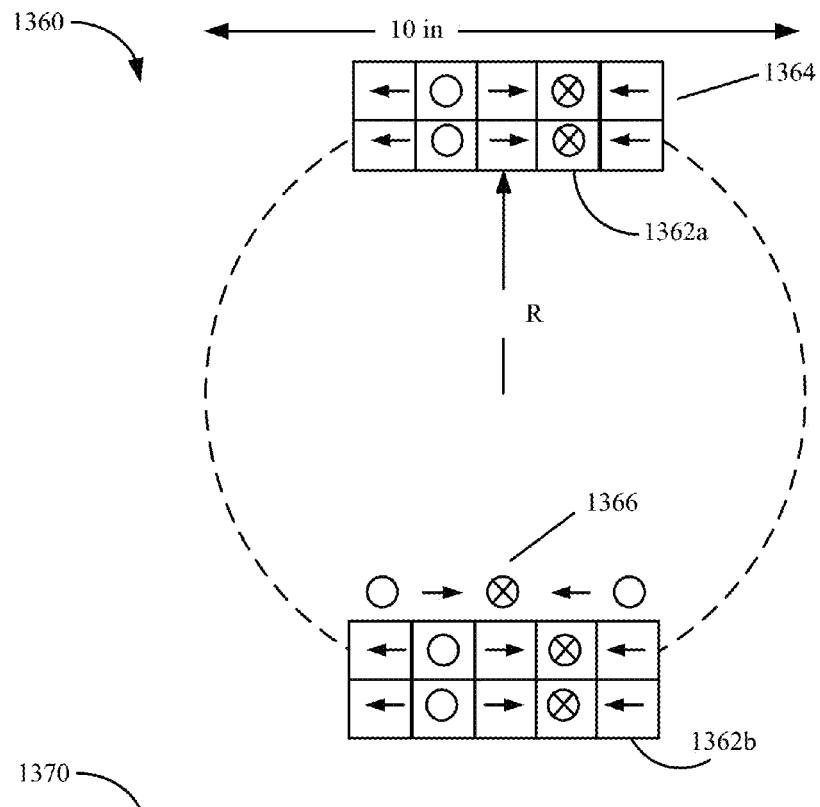
FIGS. 26 and 27 are top views of magnet configurations and associated polarity alignment patterns which include magnets arranged in linear arrays in accordance with the described embodiments.
Figure 27:
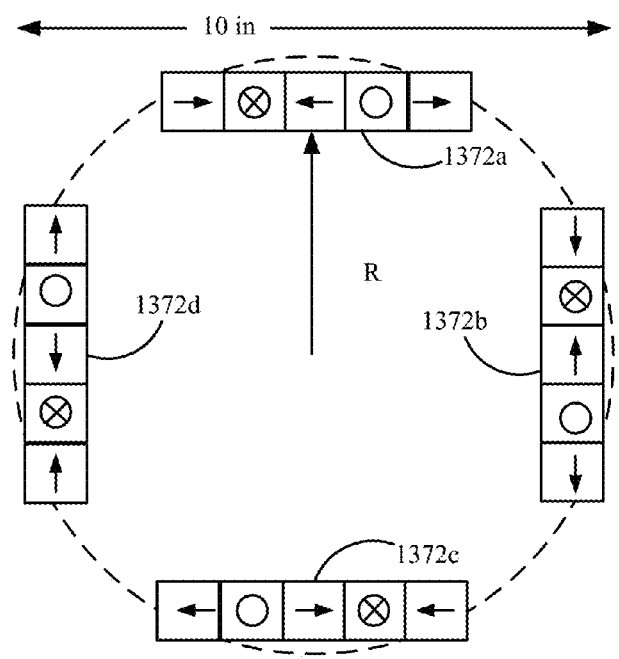

Yet another magnet configuration is described with respect to FIGS. 26 and 27. In these configurations, the magnets are clustered and arranged in a line where the amount of clusters can be varied. The designs 1360 and 1370 in FIGS. 26 and 27 each include twenty cubic inches of magnets. In design 1360, the magnet volume is divided into two rectangular clusters of ten cubic inches each, 1362a and 1362b. In design 1370, the magnet volume is divided into four clusters, 1372a, 1372b, 1372c and 1372d, each with five cubic inches of magnets in each cluster.

A single cluster of twenty cubic inches of magnets can be provided. This design might be incorporated on a magnet carrier with a single arm or a circular magnet carrier with a counter weight to balance the weight of the magnets. In general, one, two, three, four or more clusters can be distributed over a magnet carrier.

Two polarity arrangement patterns 1364 and 1366 are shown. These arrangements can be repeated on each cluster. Pattern 1364 includes two pole regions. Pattern 1366 includes three pole regions. In pattern 1364, the ratio of guide magnet volume to pole magnet volume is 1.5. In pattern 1366, the ratio of guide magnet volume to pole magnet volume is about 2/3. The ratio of the bottom area of the magnets (20 square inches) relative to the Volume$^{2/3}$ of the magnets is about 2.71. Again, like the other designs, this ratio can be varied.

In various embodiments, the ratio of guide magnet volume to pole magnet volume can be varied for patterns 1364 and 1366. In addition, the radial distance from the center axis of rotation can be varied. The radial distance affects the moment of inertia. Further, the relative velocity of the magnets relative to the substrate varies with RPM of the magnet carrier and the radial distance. Thus, the radial distance can be selected to obtain a desired relative velocity which is compatible with the RPM output capabilities of the motor and is compatible with packaging constraints.

In FIGS. 26 and 27, the magnets in each cluster are arranged in rectangles and are configured to touch one another. In various embodiments, the aspect ratio of the length relative to the width of the rectangular clusters can be varied as is shown in FIGS. 26 and 27. Further, spacing can be provided between the magnets in a polarity region or between different polarity region in the polarity arrangement patterns 1364 and 1366. The spacing might be used to allow structure which secures the magnets. Further, the magnets don't have to be arranged to form a rectangle. For example, the magnets can be arranged in arc by shilling the magnets relative to one another while allowing a portion of each adjacent magnet to touch. In general, many different types of cluster shapes can be used an example of a rectangle is provided for the purposes of illustration only. Additional magnet configurations which can be utilized with the hover engines and hover vehicles described herein are described in previously incorporated by reference application Ser. No. 14/737,442 and Ser. No. 14/737,444.

Translating Hover Engines

In this section, applications which involve translating hover engines are described. Ground transportation systems, such as cars or trains, are examples where translating hover engines can be utilized. In particular, for these applications, during operation, the translational velocity of the hover engine can be a significant fraction of the rotational velocity of the magnetic carrier used in hover engine. As will be described in more detail below, the addition of a translational velocity component to rotational velocity of magnetic carrier can affect the forces output from the hover engine.

Figure 28:
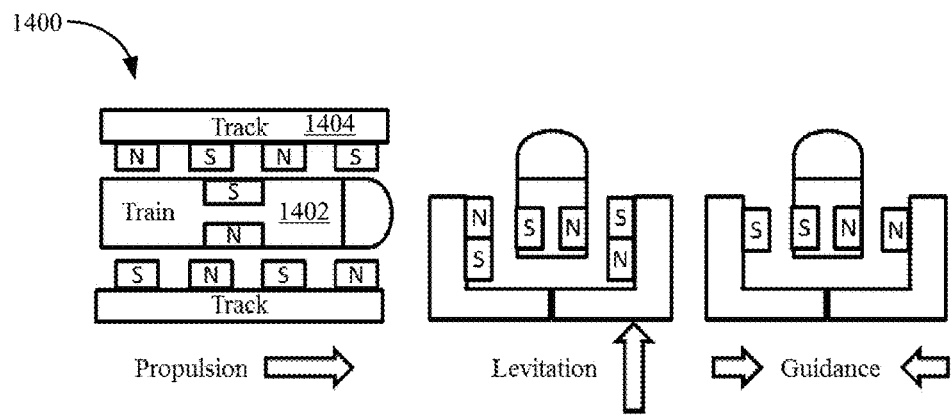
FIG. 28 illustrates application of magnetic forces in a Maglev system in accordance with the described embodiments.

In particular embodiments, a hover engine can be used in a Maglev train system. As shown in FIG. 28, Maglev train systems 1400 can use magnetic forces to lift, guide and/or propel train cars, such as 1404, along a track 1404. In different types of Maglev systems, superconducting magnets, permanent magnets and/or electro-magnets can be used to generate needed forces.

In electromagnetic suspension (EMS) systems, electro-magnets can be used to generate lift as well as for propulsion. Thus, the trains are able to hover in place. In electrodynamic suspension (EDS) systems, super conducting magnets are used to generate lift. However, the train needs to reach a lift-off speed of about 62 mph before enough lift is generated. Thus, in EDS, the train can't hover in place.

In an Inductrack approach, the tracks include copper coils which interact with permanent magnets on the train to generate lift. Lift is generated when the magnets on the train move relative to the copper coils on the track. Thus, like an EDS system, the train has to be accelerated to a lift off velocity before enough lift is obtained to support the train. Thus, in an Inductrack approach, the train is not able to hover in place. In Inductrack approach, some mechanism is needed to propel the train. Like EMS and EDS systems, electromagnetic propulsion can be used to propel a train using an Inductrack approach.

A characteristic of current Maglev systems is a complex track infrastructure, which is expensive to build and maintain. For example, in most maglev designs, the tracks include at least electromagnets and an associated electrical infrastructure to provide propulsion. Further, depending on the design, the tracks include permanent and/or electromagnets for steadying purposes and electromagnets for generating lift. In addition, the track may include conductors which interact with the magnets on the train to generate propulsion. Thus, in maglev systems, the tracks are much more complex than the simple rails used in traditional railroads. Thus, the costs associated with building and maintaining the tracks are much higher. Thus, new approaches for magnetically levitating trains are desired.

In this section, a system, including hover engines, that generates magnetic forces is described. The system can provide lift, propulsion and guidance for a vehicle, such as but not limited to a train. A feature of the system is that the lift, propulsion and guidance can be provided from a rotating magnet array incorporated in to a hover engine that operates over a very simple track as compared to traditional maglev tracks.

Simulations representative of a hover engine translating over a track at high speeds of up to 150 mph are described. The simulations predict that the forces output from a hover engine with a rotating magnet array can change with the addition of translational velocity component. In particular, the simulations predict that, during translation, RPM conditions exist where the magnetic drag associated with the hover engine is reduced to zero while significant lift is generated, i.e., infinite lift to drag.

As described herein, the condition where the magnetic drag is reduced to zero is called a zero drag RPM condition. When the RPM rate of the hover engine is raised above the zero drag RPM condition, thrust is generated. When the RPM rate of the motor is dropped below zero drag operating condition braking occurs. As described above, a rotational plane of a magnetic carrier can be tilted relative to a conductive surface to generate thrust which is aligned with the direction of the tilt axis. In contrast, as described in more detail below, with the additional of a translational velocity component, thrust or braking forces can be achieved without having to tilt the plane of rotation of the magnets in the magnet carrier relative to the conductive surface.

The zero drag RPM condition is affected by the magnitude of the translational velocity of the hover engine. It was predicted to increase as the translational velocity increased. The zero drag condition appears to be an equilibrium condition in that once an RPM rate is selected, the hover engine wants to arrive at and maintain a particular translational velocity associated with the zero drag condition. This effect allows the RPM rate of the hover engine to be controlled to control a velocity of a vehicle.

The power required to only hover versus hover and translate are compared. The simulations predict that the maximum required power at a given RPM occurs while only hovering. With the addition of translational velocity component, the power requirements are reduced. However, the lift output is also reduced.

In a Maglev train system, three separate systems are usually required to provide lift, propulsion and guidance. For example, one set of magnets and track infrastructure are used to provide lift, a second set of track infrastructure and magnets is used to provide propulsion and a third set of magnets and track infrastructure is used to provide guidance. This leads to a track infrastructure, which is complex, expensive to build and costly to maintain.

In addition, many maglev systems are not able to generate lift at all translational operating conditions, particular at low speeds. Thus, some systems require a lift off velocity to be achieved before sufficient lift is obtained. To meet this requirement, additional system components and track infrastructure are needed.

The existence of the zero drag condition in the system can provide a single system that uses a very simple track and inexpensive permanent magnets (as opposed to using super cooling) to generate the lift, propulsion and guidance forces used in a train system. The system works at low translational speeds or even when the translational velocity is zero. Hence, additional infrastructure and system complexity is not needed to generate a lift-off velocity like other Maglev systems.

Next, the performance of a translating hover engine is described in more detail with respect to FIGS. 29-44. Then, methods of controlling hover engines are described with respect to FIG. 45-46. As will be described in more detail below, the addition of a translational velocity component can significantly change the forces which are output from a hover engine.

In more detail, with respect to the following FIGS. 29-44, quantities obtained from finite element simulations of a translating hover engine are described. The finite element simulations solve Maxwell's equations in three dimensions. Predictions of lift forces, drag forces and power consumption, including the zero drag conditions, are presented. Then, with respect to FIGS. 45 and 46, a method of controlling a translating and hovering vehicle is described.

Figure 29:
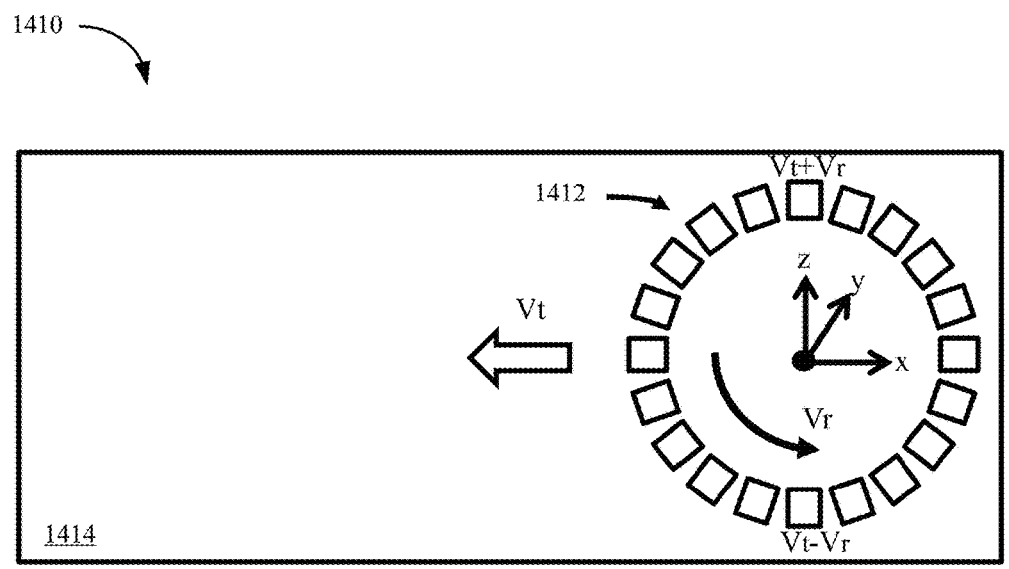
FIG. 29 illustrates a simulation set-up including the translation and rotation of magnets in a hover engine in accordance with the described embodiments.
Figure 30:
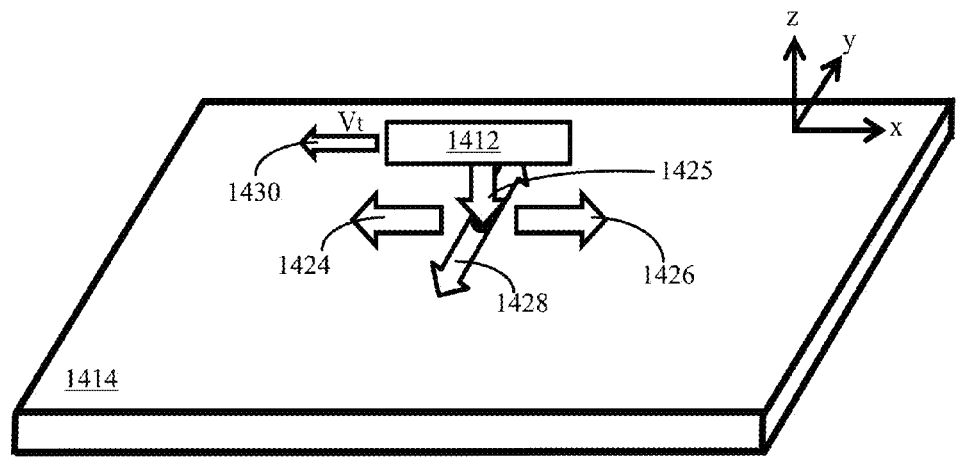
FIG. 30 illustrates forces on a track resulting from the translation and rotation of magnets in a hover engine on a vehicle in accordance with the described embodiments.

In more detail, with respect to FIGS. 29-30, a simulation set-up for predicting the forces generated from a translating hover engine is described. With respect to FIGS. 31-36, simulations of a magnetic array which is spinning and translating at a constant height 1.27 cm above 1.27 cm thick Aluminum surface are discussed. The magnetic array consists of twenty, cubic shaped, N48 strength, Neodymium magnets. The side length of each cubic magnet is 2.54 cm. The magnets are orientated such that the planar bottom of the magnets is parallel to a conductive substrate. Different configurations of magnetic arrays with different size magnets, different number of magnets, different types of magnets and different magnet arrangements can be utilized. Thus, the simulation configuration is provided for the purposes of illustration only and is not meant to be limiting.

The translational velocity of the magnetic array is varied between 0 and 150 mph. Further, the RPM value of the array is varied between 300 RPM and 9000 RPM. The translational motion of the magnets induces braking forces. However, the braking forces can be balanced by thrust generated from the rotational motion of the magnets to provide a zero drag condition. As mentioned above, zero drag conditions, where the magnetic drag goes to zero, are identified and discussed.

With respect to FIGS. 37-40, the effects of the height of the magnetic array above the surface on forces associated with a hover engine are discussed. In these simulations, a constant translational velocity of 100 mph is used and the height of magnetic array above the surface is varied between 0.635 cm and 2.54 cm. For the hover engine, the RPM values are varied between 300 RPM and 6000 RPM. In particular, the effects of height on the zero drag condition are discussed.

With respect to FIGS. 41-44, the effects of tilting a plane of rotation of the magnets in the magnetic array relative to a conductive substrate are discussed. In these simulations, the magnetic array is tilted 4 degrees relative to the surface, the translational velocity is fixed at 100 mph, the height above the surface is fixed at 1.27 cm and the RPM values of the magnetic array are varied. The tilt axis is along the direction of the translation motion. The effects of the tilt on propulsive and braking forces including the zero drag condition are discussed.

Finally, with respect to 45-46, two methods are discussed for controlling translating hover engines. In one example, the translational velocity of one or more hover engines can be adjusted via changes to the RPM rate of the hover engine. In another example, the translational direction of a pair of hover engines can be adjusted by creating a translation force differential between the hover engines.

In FIG. 29, a simulation set-up 1410 is shown. In the simulation, a magnetic array of twenty, N48 strength, neodymium magnets is used. The magnets are cubic with a 2.54 cm length. Based on a density of 7.4 g/cm3, the twenty magnets weigh about 2.43 kg.

The magnets are arranged in a circle. The center of each magnet is located about 11.43 cm from the axis of rotation. The polarity of the magnets is similar to the pattern shown in FIG. 20. As described above, other polarity patterns can be utilized with hover engines. Further, the geometric arrangement of the magnets and number of magnets used can be different. For example, the center of each magnet can be located a greater distance or a lesser distance from the axis of rotation than 11.43 cm. Thus, this example is provided for the purposes of illustration only and is not meant to be limiting.

The simulations are time dependent. In each simulation, the magnet array 1412 is impulsively spun up from rest to a fixed RPM. The RPM value is varied between simulations. For each simulation, the rotational velocity, Vr, is determined from the fixed RPM value. The rotational velocity is about the rotational axis of the magnet array 1412, which is aligned with the z axis in FIG. 29. When the magnet array 1412 translates, the rotational axis moves in accordance with the translation velocity Vt.

In a first group of simulations, the height above the track 1414 is fixed during each simulation while the translational velocity and the rotational velocity of the magnet array 1412 are varied. In other simulations, the height of the magnet array 1412 above the track 1414 is varied between values of 0.635 cm and 2.54 cm while the translation velocity is fixed and the rotational velocity of the magnets is varied. The track 1412 is modeled as 1.27 cm thick aluminum. Other conductive materials can be used and different track configurations can be utilized and a solid aluminum track is provided for the purposes of illustration only.

Initially, the translational velocity is set to zero for the first 35 ms during which a 3-D time dependent finite element analysis, which solves Maxwell's equations, is performed. It was found that 35 ms provided enough time for a steady state to be reached after the impulsive start. After 35 ms, the magnet array 1412 in the simulation is impulsively started at a fixed translational velocity while the fixed rotational velocity is maintained.

At 100 mph, the simulation is carried out for an additional 10 ms. The time fixes the travel distance (100 mph×10 ms) of the magnet array in the simulation. The same travel distance is used in each simulation. Thus, at higher velocities, to keep the distance constant, the simulation time is shorter. At lower velocities, the simulation time is longer.

The simulations are generated in 3-D using MagNet v7 by Infolytica (Montreal, CA). The code was validated by comparisons with experimentally measured forces for the magnet array 1412. The validation included grid resolution studies. In addition, the forces and solutions predicted from the MagNet were compared to forces predicted using Ansys Maxwell and Ansys Emag (Cecil Township, Pa.). The comparisons between the results predicted from MagNet, the experimental data, Maxwell and Emag were consistent with one another.

When a magnet array 1412 is both translating and rotating, the velocity of the magnetic fields underneath the magnets, which penetrate into the conductive material, vary across the array. For example, on one side of the array, as shown in FIG. 29, when the rotational velocity and translation velocity are parallel to one another, the velocity of the magnetic field lines emanating from the magnets is Vt+Vr within the track and on the other side of the array the magnetic field velocity is Vt−Vr. In between these points, the net velocity has a component in the x and y directions, which is perpendicular to Vt. The x and y components of the velocity varies according to the direction of Vr.

As shown in FIGS. 4A, 4B and 4C, the lift and drag forces output from the hover engine are a function of velocity. Hence, the different magnetic field velocities in the track underneath the magnetic array resulting from the combination of the translational velocity and rotational velocity cause the forces to vary across the array. The simulations predict that the variation in the forces across the magnet array 1412 result in net forces in the x, y and z direction. These forces are described, as follows, in more detail with respect to FIG. 30.

In FIG. 30, the forces on the track 1414 resulting from the translation and rotation of the hover engine are illustrated. Forces in the x, y and z direction are generated. The forces acting on the hover engine can be considered equal and opposite of those acting on the track 1414 for the purposes of discussion. Track forces are shown in the following figures.

The track 1414 is modeled as a homogenous piece of Aluminum whereas the magnet array 1412 includes twenty discrete equally spaced cubic magnets which rotate as a function of time. The magnets emit a magnetic field which changes position as the magnets in the magnet array 1412 move. The moving magnet field lines induce eddy currents in the track 1412. Interactions between the induced eddy currents in the track and the magnets in the hover engine generate a force 1425, which pushes the track downwards. This force can provide a prediction of the lift output from the hover engine. From the point of view of the track, this force is in the negative z-direction as is shown in the figures which follow.

The induced eddy currents in the track 1414 resist the motion 1430 of the magnets in the translational direction, which is in the negative x direction. This resistance pushes the track in the negative x direction. The resistance to the translational motion of the magnets in array 1412 causes a drag on the magnets in the hover engine in the positive x direction. Similarly, the track resists the counter-clockwise rotation of the magnetic field lines emanating from the magnets in the hover engines. This resistance generates a torque which rotates the track in the counter clockwise direction and a torque in the clockwise direction, which acts on the magnets in hover engine.

The torque on the magnets is overcome via the motor which turns the magnets. The motor uses a power source to operate. The power input to the track is torque times the angular velocity. This quantity can provide an estimate of how much power needs to be supplied to the motor. In particular, at least this amount power is needed by the motor to turn the magnets (The motor has associated losses which can require additional power). Hence, the power input into the track is plotted as a function of RPM for many of the simulations.

The velocity of the magnetic field lines in the track 1414, which emanate from the magnets in the magnet array 1412, is a combination of the rotational velocity and the translational velocity 1430 of the magnets in the hover engine. The rotational velocity contributes a velocity component in the x direction and a velocity component in the y direction. It varies as function of the distance from the rotational axis.

As described above with respect to FIG. 29, for the purposes of illustration, the magnets rotate counter clockwise in this simulation. Thus, for the portion of the magnets on the positive y side of the magnet array (the array is split by the x axis in FIG. 29), the translational velocity and a portion rotational velocity combine to increase the magnitude of the velocity of the magnetic fields in the track in the negative x direction. The maximum velocity in negative x direction occurs where the direction of the rotational velocity points in the negative x direction.

On negative y side of array, the translational velocity and a portion of the rotational velocity combine to decrease the velocity of the magnetic field lines in the track in the negative x direction, which is the direction of translation of the magnetic array 1412. When the rotational velocity is perpendicular to the translational velocity, the decrease in the velocity of the magnetic field lines in the negative x direction is zero. The maximum decrease in velocity of the magnetic field lines in the negative x direction occurs where the rotational velocity is parallel to the x axis and points in the positive x direction.

On the negative y side of the magnet array 1412, the velocity of the magnetic field lines in the track beneath the magnet array, including its direction, depends on the rotational velocities of the magnets in the magnetic array. When the maximum rotational velocity of only a portion of the magnets in the magnet array is greater than the translational velocity 1430 then at some location the velocity of the magnetic field lines emanating from the magnets, relative to the track is zero, which is the minimum value of the relative velocity. Under this condition, across the array on the negative y side, the net velocity of the magnetic field lines in the x direction can vary between a value of about Vt 1430 in the negative x direction and Vr–Vt in the positive x direction. When the maximum rotational velocity of any portion of the magnets in the array is less than the translational velocity, then the velocity of the magnetic field lines in track varies between Vt 1430 in the negative x direction and Vt–Vr in the negative direction.

Near the centerline of the array, along the x-axis, the rotational velocity, Vr, is perpendicular to the translational velocity, Vt 1430. Hence, near the centerline, the rotational velocity doesn't reduce the translational velocity 1430, Vt, and the relative velocity of magnetic field lines emanating from the magnets moves with a velocity, Vt 1430, through the track 1414. Thus, on the negative y side of the array, Vt 1430 can bound the range of the x component of the velocity of the magnetic field lines travelling through the track.

When the magnetic field lines are moving in the track 1414 in the positive x direction, the track resists this movement, which pushes the track backwards. A backwards force on the track can be considered as 1414 thrust from the hover engine. Thus, when Vr is greater than Vt 1430, some portion of the flux from the magnets on the negative y side of the magnet array provide thrust. The portion of the magnetic field lines providing thrust increases as Vr increases relative to Vt.

In addition, for a counter clockwise rotation, on the positive y side of the array, rotational motion of the magnets pushes the track 1414 forwards in the negative x direction. On the negative y side of the array, the rotational motion pushes the track 1414 backwards in the positive x direction. At rest, i.e., zero translational velocity, these forces balance and there is not a net force in the x direction.

As described with respect to FIGS. 4A, 4B and 4C, the drag, which is the resistance to the motion of the magnetic field lines in the track 1414, decreases as the velocity increases. With the addition of translational motion 1430, the force 1424 that pushes the track 1414 forward in the negative x direction associated with the movement of the magnets on the positive y side of the array is lowered because the translational motion in the x direction combines with the rotational motion in the x direction to increase the velocity of the magnetic field lines in the negative x direction. On the negative y side of the array, the force 1426 that pushes the track 1414 backward is increased because the translational and rotational velocities combine to reduce the relative velocity.

When the force 1424 that pushes the plate forward on the positive y side is less than the force 1426 that pushes the plate backwards on the negative y side, a net force which pushes the plate backwards is generated. This net backwards force on the plate is equivalent to thrust output from the hover engine. The maximum thrust from this effect occurs when the force difference between the positive y side and the negative y side of the magnet array is the largest.

For the magnetic array 1412 which is simulated, under some conditions, a first force generated from the magnetic field lines moving in the positive x direction that pushes the plate in the positive x direction as a result of Vr being greater than Vt, and a second force resulting from the rotational motion pushing the plate in the positive x direction more than it pushes it in the negative x direction resulting from the larger relative velocity on one side of the magnet array as compared to the other side balances a third force pushing the plate in the negative x direction resulting from the magnets translating in the negative x direction. When the three forces balance, the net force in the x-direction due to the motion of the magnets is zero. This condition is the zero drag condition referred to above, which is described in more detail below.

Finally, the magnet array consists of discrete magnets, which are spaced relative to one another and rotate. Thus, the portion of the magnet array on either side of the x-axis may not be symmetric. The asymmetry can create side forces 1428 which may oscillate and change directions as the magnet array 1412 rotates.

In general, side forces can be balanced by deploying groups of hover engines. For example, two hover engines can be deployed such that the side forces output from either hover engine cancel one another. In other embodiments, when a side force is detected, one or more hover engines can be controlled to output side forces which balance out the detected side force.

Figure 31:
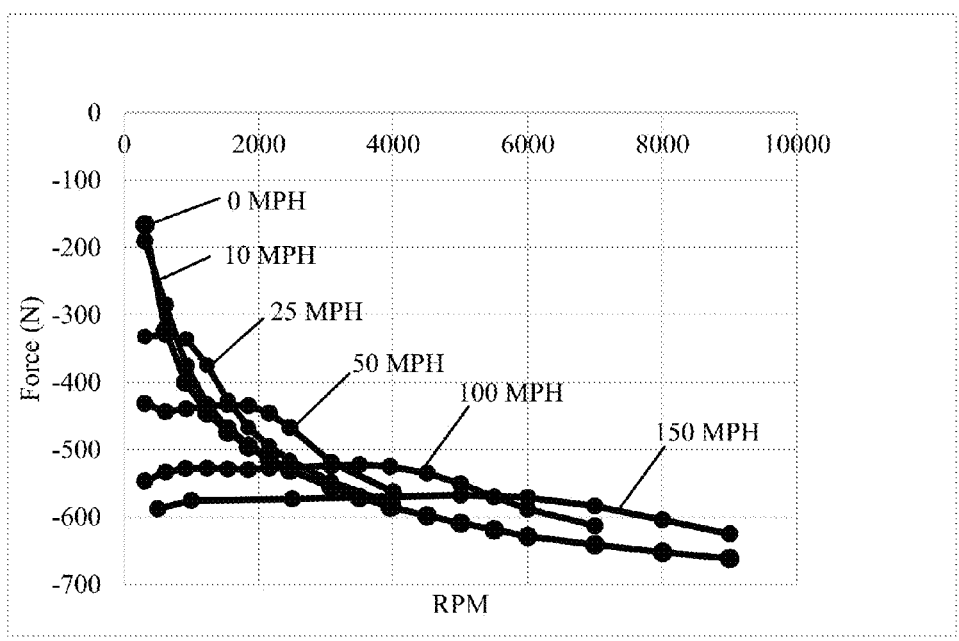
FIG. 31 is a plot of the push on a track from magnets in a hover engine as a function of RPM for various translational velocities in accordance with the described embodiments.

FIG. 31 shows the push on the track from the magnet array 1412 from a fixed height of 1.27 cm above the track. The plot shows the push for velocities of 0 (no translation), 10 mph, 25 mph, 50 mph and 100 mph, 150 mph. At low RPM, when the translation velocity is much greater than the rotational velocity, additional push is generated from the translational motion of the magnetic array 1412. Thus, the predicted push on the track is greater than the push generated from rotation alone of the magnetic array 1412.

When the rotational velocity of the magnets is much greater than translational velocity, the rotational velocity dominates and the push output from the hover engine is consistent with rotation only. This effect is visible in the curves for the 10 mph and 25 mph translational velocity. For example, the 10 mph curve is on the top of the 0 mph curve in FIG. 31.

The 25 mph curve converges to the 0 mph curve at about 2500 RPM. At 3000 RPM, the average rotational magnet velocity is about 75 mph. Thus, at 3000 RPM, the ratio of translational velocity to the average rotational velocity at the center of the magnets is about 1/3. In actuality, as portions of the magnet are at different radial distances, the ratio of the translational velocity to the rotational velocity varies across the magnets in the radial direction. In addition, different magnet arrangements can have the same average rotational velocity while having different geometric arrangements. Thus, for given velocity, the value of the ratio between the translational velocity and the average rotational velocity, where the push curve at rest and the push curve while translating converge, may vary from geometry to geometry.

At intermediate ratios between the translational and rotational velocities, the predicted push is less than rotation alone. For example, 4000 RPM provides an average rotational velocity of about 100 mph. At 4000 RPM rotation and 100 mph translation, the predicted push is less than the push predicted for rotation alone.

Figure 32:
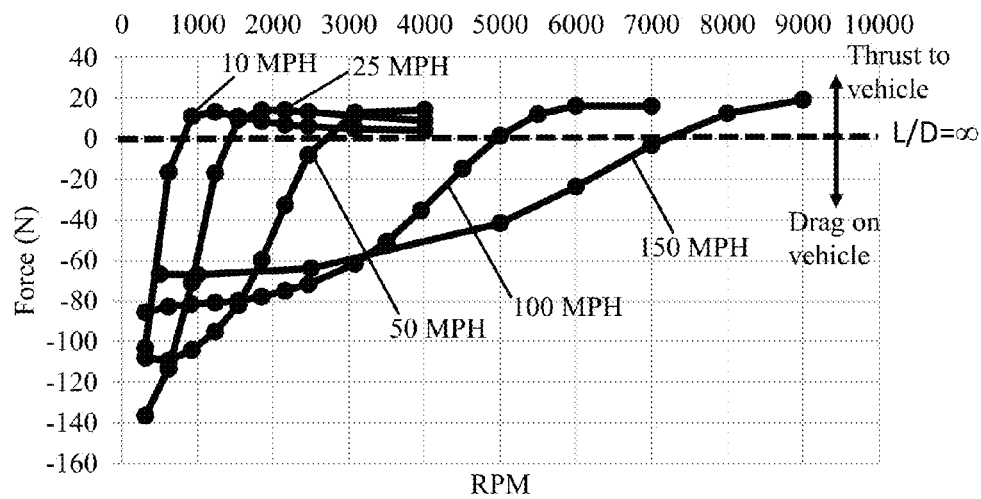
FIG. 32 is a plot of the drag on a track from magnets in a hover engine as a function of RPM for various translational velocities in accordance with the described embodiments.

FIG. 32 shows plots of the predicted force in the x direction, i.e., the direction of translational motion as a function of RPM. For each translational velocity, an RPM value exists where the forces in the x direction are zero. This condition is referred to as the zero drag condition, where the lift to drag ratio is infinity.

The zero drag condition occurs above the RPM value where the average rotational velocity of the magnet array is greater than the translational velocity. For example, at 10 mph, the zero drag condition occurs when the average rotational velocity is twice the translational velocity. At 150 mph, the zero drag condition occurs at rotational velocity which 1.2 times greater than the translational velocity. Thus, as the translational velocity is increased, the ratio between the rotational velocity and the translational velocity where the zero drag condition occurs appears to decrease.

Below the zero drag RPM value, a force is predicted in the direction of translation. This force can be used for braking. For example, a hover engine can be controlled to rotate at the zero drag condition associated with a particular cruise speed. When braking is desired, the RPM rate of the motor and, hence, the magnet array in the hover engine can be reduced to the RPM rate below the zero drag condition to slow the vehicle.

The RPM value where the zero drag condition occurs decreases as the translational velocity decreases. Thus, in the example above, a new zero drag condition (current set RPM value of the motor) is approached as the vehicle slows down. If the translational velocity drops below the translational velocity associated with the zero drag condition associated with the current RPM value of the motor, thrust is generated and the translation velocity will increase until the forces balance and zero drag is obtained.

The zero drag condition may be an equilibrium condition. In particular, for any RPM value and sufficient initial translational velocity, there is a translational velocity where the hover engine wants to cruise. Therefore, when a desired cruise velocity is selected, the RPM value of the hover engine is controlled to match the desired cruise velocity. After the RPM value of the hover engine is set, the hover engine will output forces, which push it towards the translational velocity associated with the new RPM value where the drag is zero.

As described in the previous paragraph, above the zero drag RPM value, a force is predicted in the direction opposite of translation. The force can be used for propulsion. For example, a hover engine can be operating at the zero drag RPM value associated with a particular velocity. Then, the hover engine can be commanded to increase its RPM rate. Initially, the hover engine generates thrust. However, as the translational velocity increases, the thrust will diminish until a new equilibrium is reached.

The rate of thrust increase with RPM increase is highest just after the zero drag condition RPM value. Then, as the RPM further increases, additional increases in the RPM may provide little if any additional thrust. As described above with respect to FIG. 30, thrust is generated from the rotational motion of the magnet array because one side of the magnet array pushes the hover engine forward greater than the other side pushes the hover engine backwards.

The difference between the push and pull on the hover engine from the opposite sides of the magnet array can determine how much thrust is generated. The difference between the push and pull is the result of the translational velocity adding to the rotational velocity on one side and decreasing it on the other. As the rotational velocity is increased relative to the translational velocity, the behavior of the hover engine approaches the behavior of a hover engine at rest. For a hover engine at rest, the push and pull forces balance on either side of the magnet array and no thrust is generated. Thus, additional increases in the RPM value don't necessarily increase the thrust.

Figure 33:
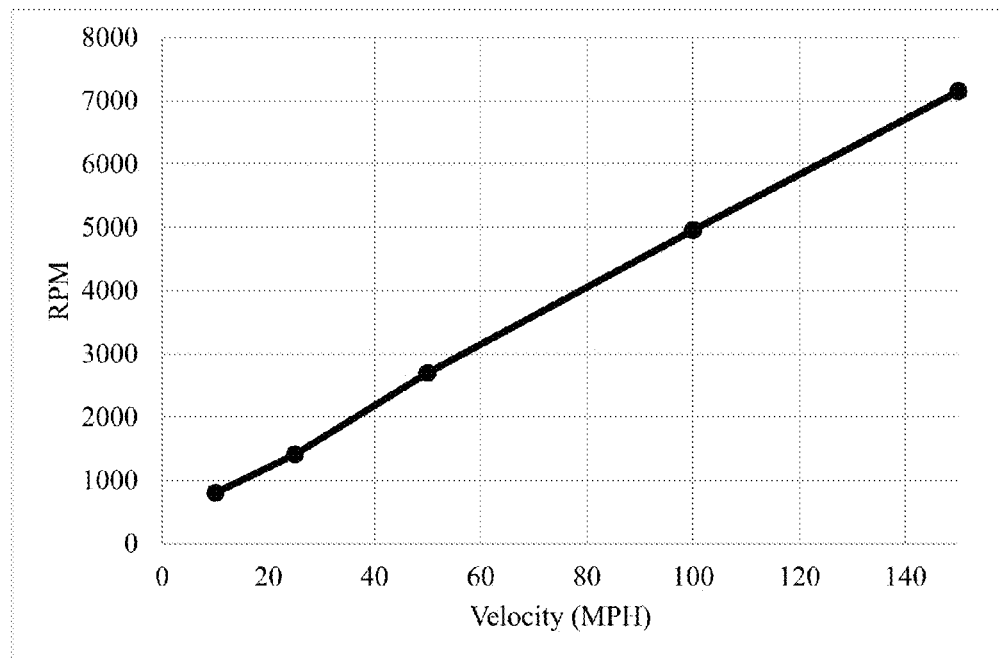
FIG. 33 is a plot of the Zero drag RPM values as a function of translation velocity in accordance with the described embodiments.

FIG. 33 is a plot of the zero drag RPM values versus the translational velocity. For the magnet array 1412, the relationship appears to be relatively linear for the velocity range considered, i.e., 10-150 mph. In FIG. 33, the slope is about 44 RPM/mph. The shape of this plot may vary for different magnet configurations.

Figure 34:
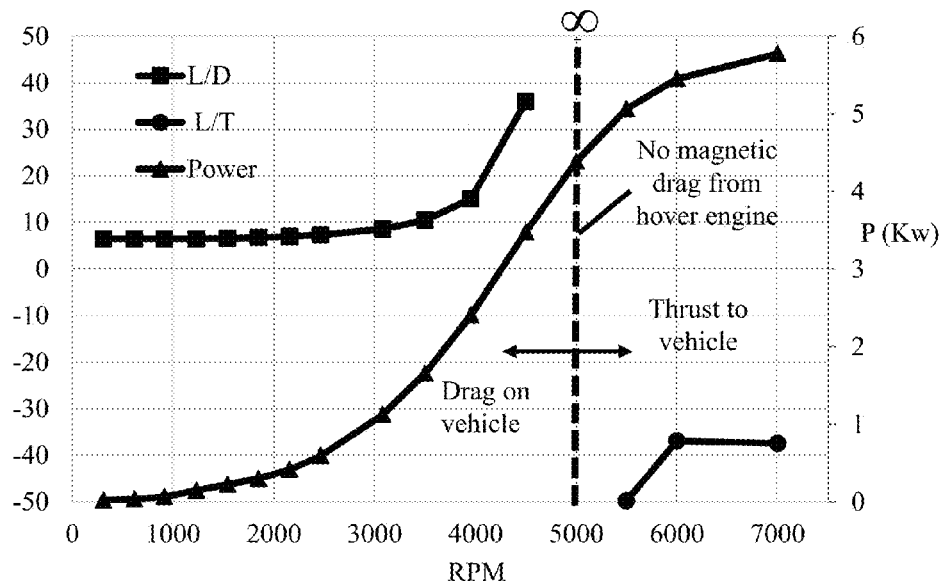
FIG. 34 is a plot of Lift/Drag, Lift/Thrust ratios and power input into the track versus RPM as a function of translation velocity in accordance with the described embodiments.

FIG. 34 is a plot of the lift to drag and lift to thrust on a hover engine as function of RPM with a magnet array travelling at 100 mph at a fixed height of 1.27 cm above the track. In this comparison, the magnitude of the lift is considered the same as magnitude of the predicted push on the track. In addition, the power input into the track is plotted. The power is discussed in more detail with respect to FIG. 35.

The L/D for a non-rotating magnet array 1412 is about 6.7, i.e., the translation of the magnets alone generate lift. At about 3500 RPM, 4000 RPM and 4500 RPM, the L/D is about 10.5, 15 and 36, respectively. At 5000 RPM, the drag is approximately zero and an infinite L/D is obtained.

Above 5000 RPM, thrust is generated. At 5500 RPM, 6000 RPM and 7000 RPM, the thrust is 2%, 2.7% and 166 percent of the lift force, which is generated. For these RPM values, the thrust relative to the weight of the magnets in the magnet array 1412 is approximately, 0.48, 0.67 and 0.69, respectively.

Figure 35:
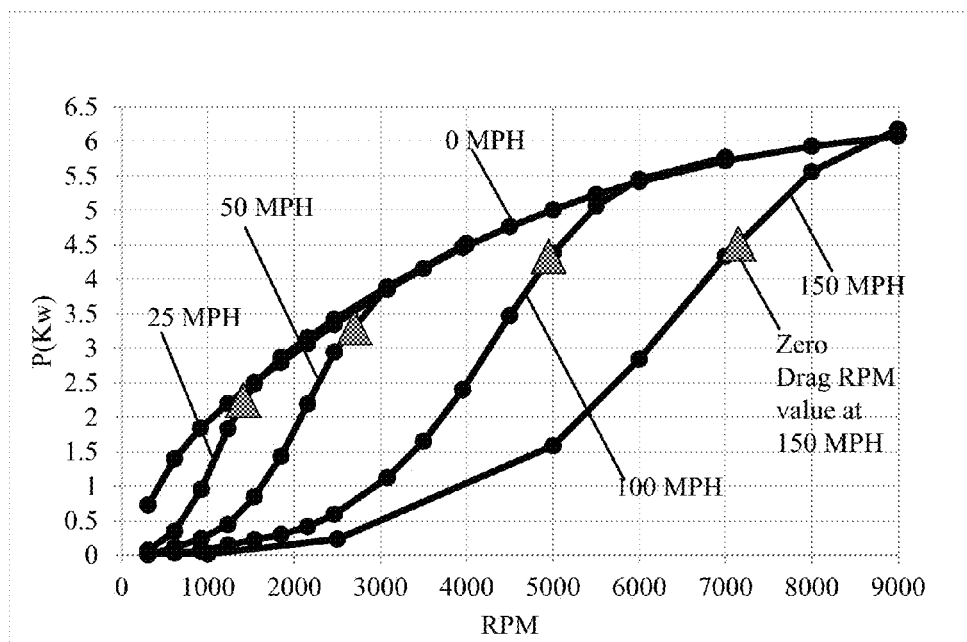
FIG. 35 is a plot of the power input to the track from magnets in a hover engine as a function of RPM for various translational velocities including the zero drag condition at each translation velocity in accordance with the described embodiments.

FIG. 35 is a plot of the power input to the track. The power is determined from the predicted torque about the z axis times the angular velocity. Power curves are plotted as a function of RPM for translational velocities of 0, 25, 50, 100 and 150 mph. The zero drag RPM value at each velocity is also shown.

For this configuration, the curves indicate that the maximum power requirements occur when the hover engine is hovering at rest at a given RPM. The curves suggest that if the power requirements are met to hover a vehicle at rest at a given RPM, additional power is not needed to operate the hover engines at the given RPM while the vehicle is translating. In particular, FIG. 35 indicates, wider many different combinations of RPM and translational velocity, significantly less power is needed when the magnetic array is translating and rotating as compared to hovering in place. However, as shown above in FIG. 31, less lift is also generated during translation and rotation as compared to hovering in place.

As the rotational velocity becomes large relative to translational velocity, the power requirements are similar to the power requirements of the hover engine at rest. For example, at a 25 mph translational velocity, a hover engine with the magnet array 1412 operating above about 1400 RPM requires the same amount of power as if the hover engine is hovering in place. As another example, at 100 mph, a hover engine operating above 5500 RPM requires the same amount of power as if the hover engine were hovering in place.

In FIG. 35, the zero drag condition RPM values are plotted for each translational velocity above 0 mph. The power at the zero drag condition is less than the power required to hover at rest. The percentage reduction in power to operate at the zero drag condition as compared to the power required to hover at rest increases as the translational velocity increases.

Figure 36:
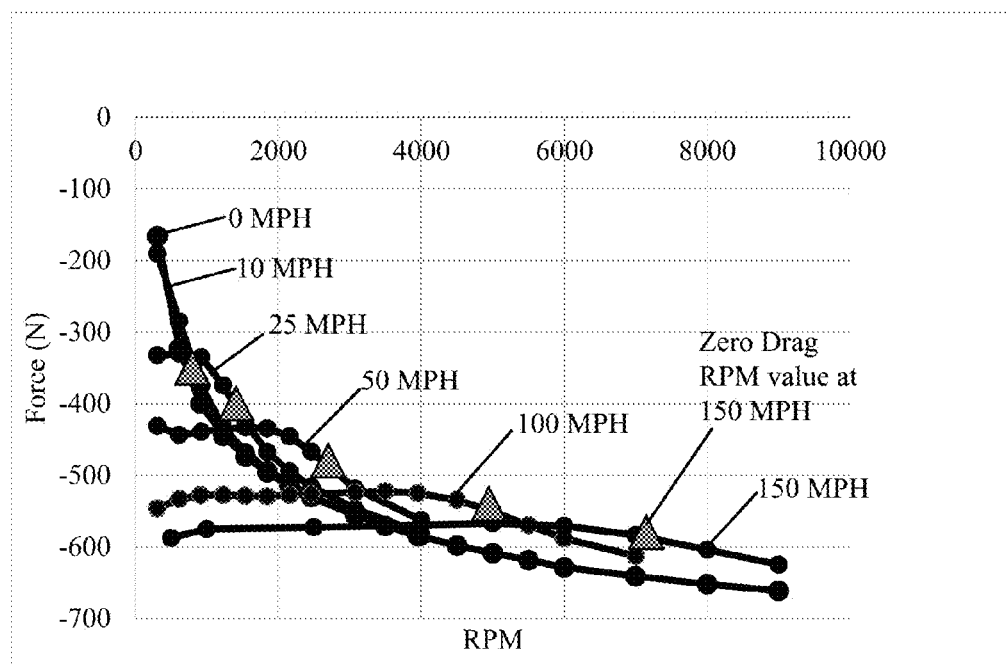
FIG. 36 is a plot of the push the track from magnets in a hover engine as a function of RPM for various translational velocities including the zero drag condition at each translation velocity in accordance with the described embodiments.

FIG. 36 is a plot on the push on track as shown in FIG. 31 which includes the push generated at the zero drag conditions. In FIG. 36, the amount of lift, which is output at the zero drag condition during translation is less than or equal to the amount of lift generated when the hover engine is not translating. Thus, although to hover at rest requires more power than to translate at particular velocity, the additional power provides more lift.

Next, with respect to FIGS. 37-40, the effect of varying RPM and the height of the magnetic array above the track are considered. The translational velocity, Vt, is fixed at 100 mph. The RPM rate is varied between 300 and 6000. The height of the magnetic array 1412 above a 1.27 cm Aluminum track is simulated at values of 0.635 cm, 1.905 cm and 2.54 cm and compared to the simulations above performed at 1.27 cm.

Figure 37:
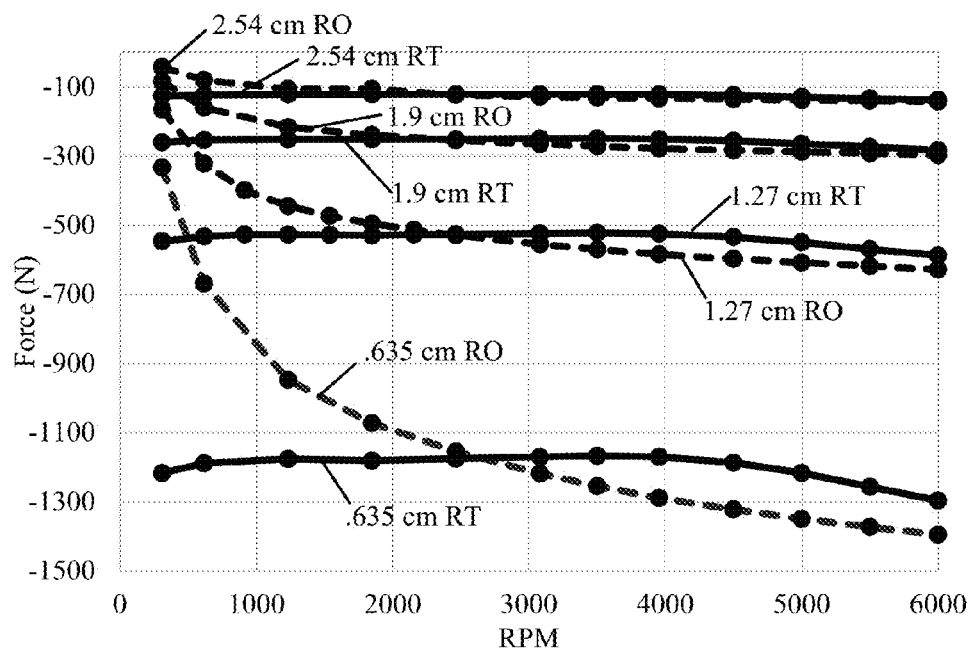
FIG. 37 is a plot of the push on the track from magnets in a hover engine as a function of RPM at various heights at a velocity of 100 mph in accordance with the described embodiments.

In FIG. 37, the push on the track is shown at 100 mph at the four different heights. RO refers to "rotational only" and RT refers to "rotation and translation." The push increases at a non-linear rate as the magnet array 1412 gets closer to the surface of the aluminum. For example, the push on the track doubles between 1.905 cm and 1.27 cm and then doubles again between 1.27 cm and 0.635 cm.

A pair of push curves, only rotating (RO) and rotating and translating (RT), is shown for each distance of the magnetic array above the surface of the aluminum. At each height, the lift generated during RT is higher than the lift during RO at low RPM. At intermediate RPM, the RT is lower than RO. At high RPM, the RO and RT curves approach each other.

Figure 38:
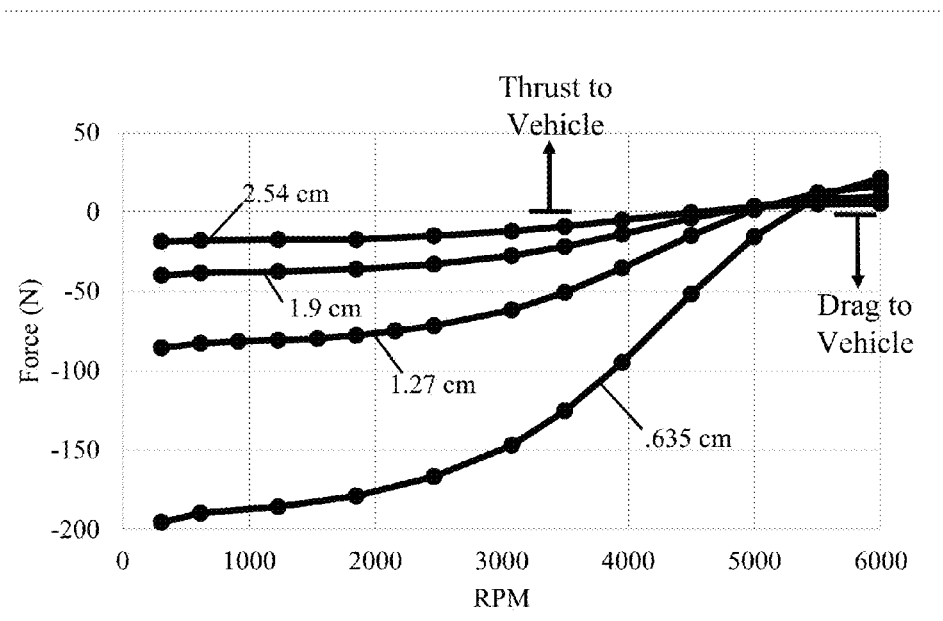
FIG. 38 is a plot of the drag or thrust on the track from magnets in a hover engine as a function of RPM at various heights at a velocity of 100 mph in accordance with the described embodiments.

FIG. 38 shows the drag or thrust which is generated on the track as a function of distance from the track. As the surface is approached, the drag increases. A zero drag condition occurs at each height but the RPM location varies according to the height. After the zero drag condition, thrust is generated. The thrust, which is generated, increases as the surface is approached.

Figure 39:
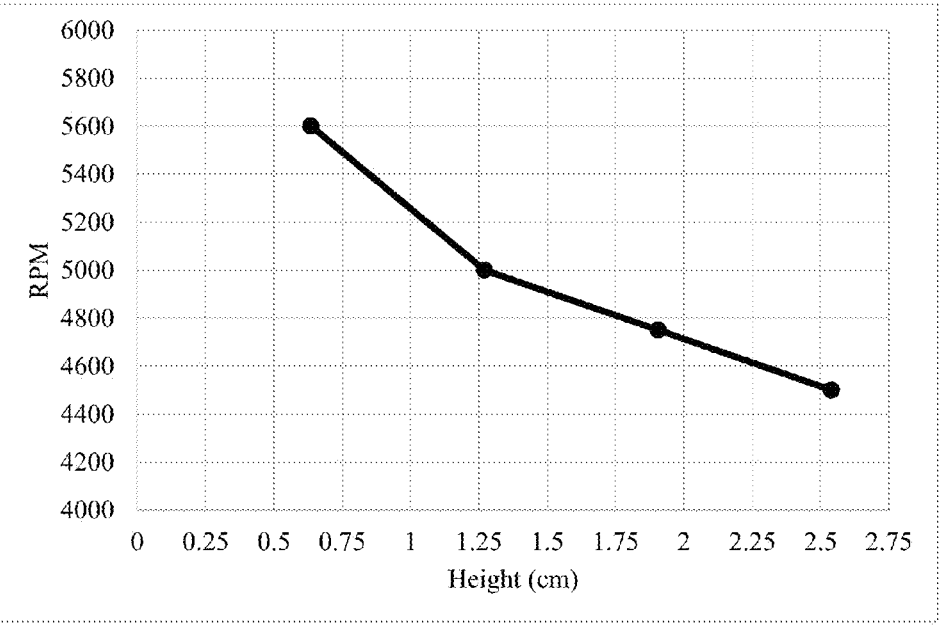
FIG. 39 is a plot of the Zero drag RPM values as a function of height at velocity of 100 mph in accordance with the described embodiments.

FIG. 39 shows the RPM value where the zero drag condition occurs for each height. The RPM value decreases with height. For example, at 0.635 cm, the zero drag RPM value is at 5600 RPM. Whereas, at 2.54 cm, the zero drag RPM value is at about 4500 RPM.

Figure 40:
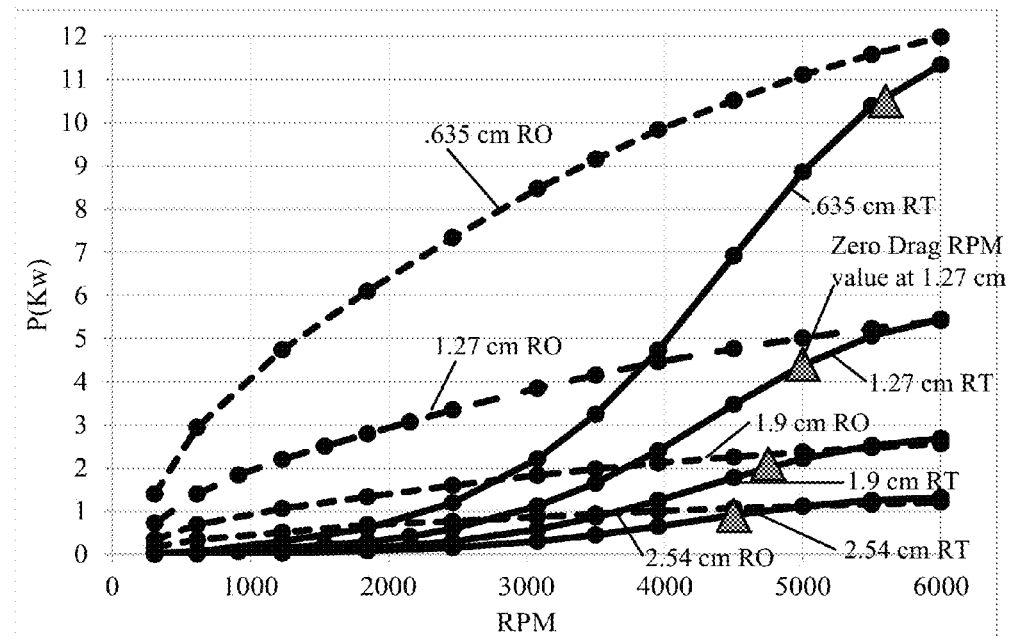
FIG. 40 is a plot of the power input to the track from magnets in a hover engine as a function of RPM at various heights including the zero drag condition at each height in accordance with the described embodiments.

FIG. 40 is a plot of the power input to the track as a function of height of the magnet array 1412 above the surface of the aluminum track. At each height, the power is plotted for rotation only (RO) and then rotation and translation (RT). The magnetic flux emanating from the magnets decreases exponentially with the distance from the surface of the magnets. Therefore, as expected, the power transmitted to the track increases as the magnets in the magnet array approach the track.

At each height, the power input into the track with translation and rotation is less than the power required with rotation only when the translational velocity is large relative to the average rotational velocity, e.g., low RPM values. Eventually, as the average relative velocity increases, the rotation only and rotation and translation power curves merge. The zero drag condition on each curve is shown. As described above, the zero drag condition can occur at a particular RPM value. At each height, the zero drag condition occurs near where the curve associated with rotation and translation is merging with the curve associated with rotation only.

Figure 41:
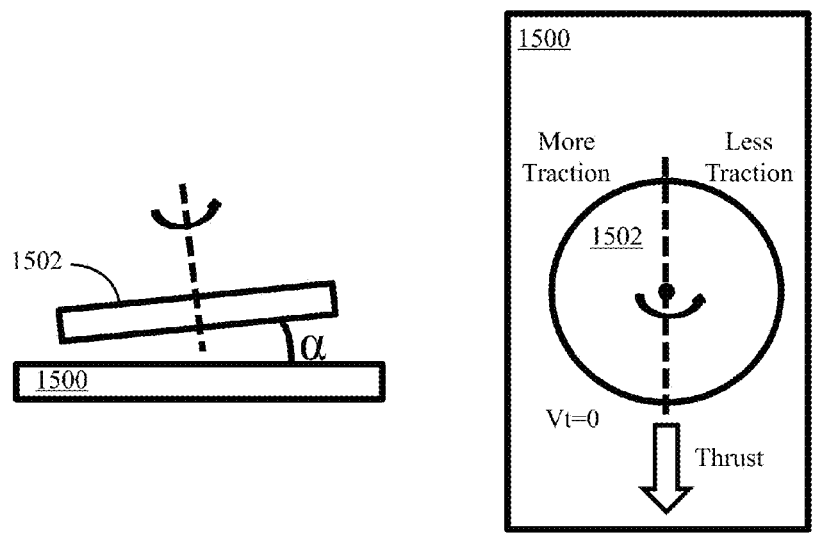
FIG. 41 shows a simulations set-up involving translation and rotation of an arrangement of magnets in hover engine in which the arrangement of magnets rotate in a tilted plane relative to a conductive surface in accordance with the described embodiments.
Figure 44:
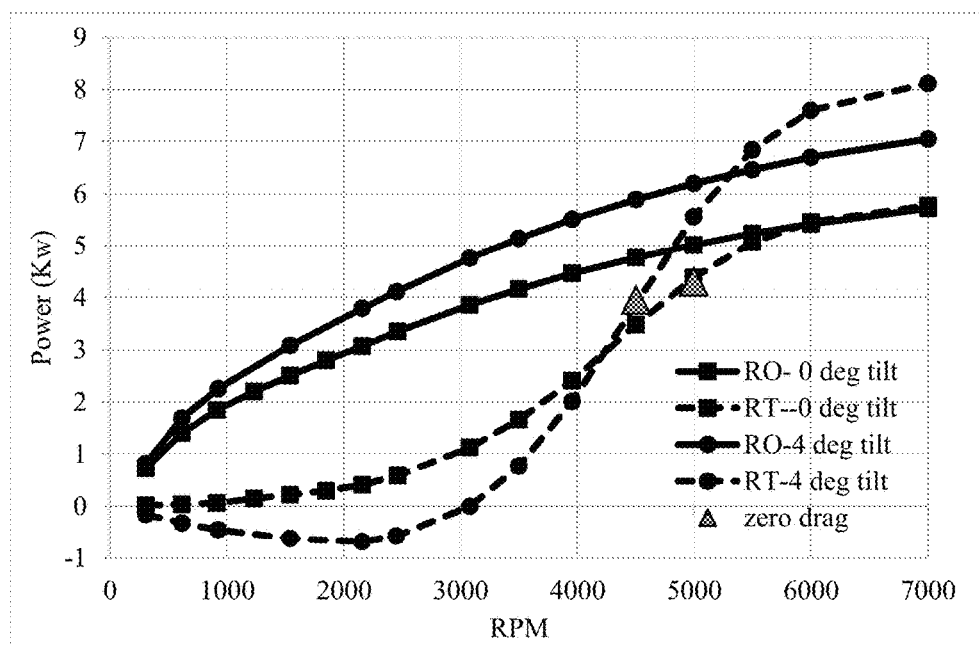
FIG. 44 is a plot of the power input to the track from magnets in a hover engine as a function of RPM at two different tilt angles including the zero drag condition at each height in accordance with the described embodiments.

Next, the effects of tilting the magnet array 1412 on the push and drag are described with respect to FIGS. 41 and 44. In these examples, the magnet array is titled 4 degrees in the counter clock-wise direction about the x axis which is in the translational direction. Simulations are generated for the magnet array at rest and translating. At the x-axis, the height of the magnet array is fixed at 1.27 cm. Thus, half of the magnets in the array are above 1.27 cm and half the magnets are below 1.27 cm. The track is 1.27 cm thick aluminum and the translational velocity is 100 mph.

In FIG. 41, a back and top view of a simulation set-up with a tilted magnet array 1502 is shown. The magnet array is tilted through an angle, α, about the x-axis, which bifurcates the magnet array (the surface 1500 can also be tilted relative to the magnet array to generate the same effect). When one side of the magnet array is closer to the surface than the other side of the magnet array, a force imbalance is created. As described above, the force imbalance generates a net force which acts along the direction of the tilt axis, which in this example is the x-axis. As for the other simulations previously described, the translational velocity is in the negative x-direction.

Via tilting of the magnet array, it is possible to generate thrust or a braking force. In the examples above, thrust or braking force is predicted without the need to tilt the magnet array relative to the surface. Depending on the direction of rotation of the magnet array, thrust is generated when the magnet array is tilted in one direction and then a braking force is generated when the magnet array is tilted in the opposite direction. In the simulation shown in FIG. 41, the magnet array is tilted such that the magnet array pushes the track opposite the direction of translation, which is equivalent to thrust from the hover engine including the magnet array.

Unlike the thrust which occurs during translation and rotation, a thrust from tilting can occur even when the translational velocity is zero. The force imbalance occurs because there is less traction on the track from the side of the magnet array farther away from the surface than the side of the magnet array closer to the surface. For a counter-clockwise rotation, the side with more traction pushes the track backwards more than the side with less traction pushes the track forwards. This force imbalance provides thrust to the magnet array as shown by the arrow in FIG. 41.

Figure 46:
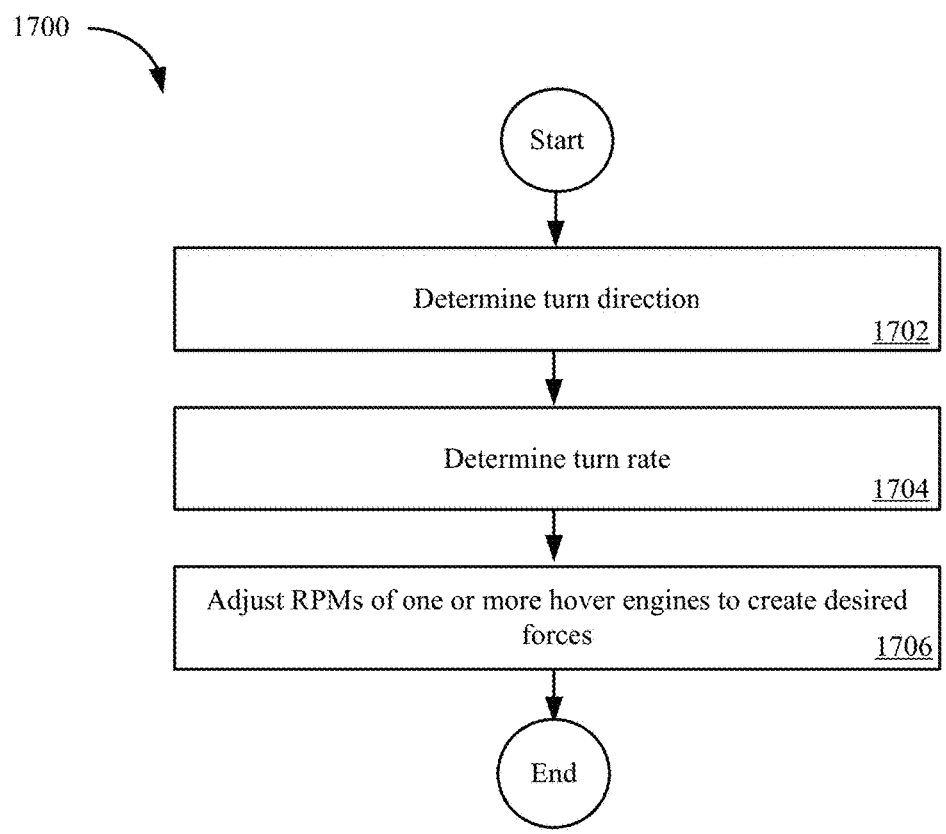
FIG. 46 is a second method of controlling one or more hover engines in accordance with the described embodiments.

Although not shown, the magnet array may also be tilted about the y axis. When the magnet array is tilted about the y-axis, a force is generated in the y direction. A force in the y-direction can be used to steer a vehicle. Another method of generating a steering force is to brake or generate thrust on only one side of the vehicle as previously described above. Yet another method, which is described below with respect to FIG. 46 is to create a force imbalance between the drag or braking force output between two hover engines, i.e., have one hover engine generate more thrust or braking force as compared to the other hover engine in the pair.

Further, by tilting a hover engine about the x-axis on only one side of a vehicle, a force imbalance is created. The force imbalance can be used to generate a steering force. The force imbalance generated from tilting can be used alone or in combination from a force imbalance generated via RPM control.

Figure 42:
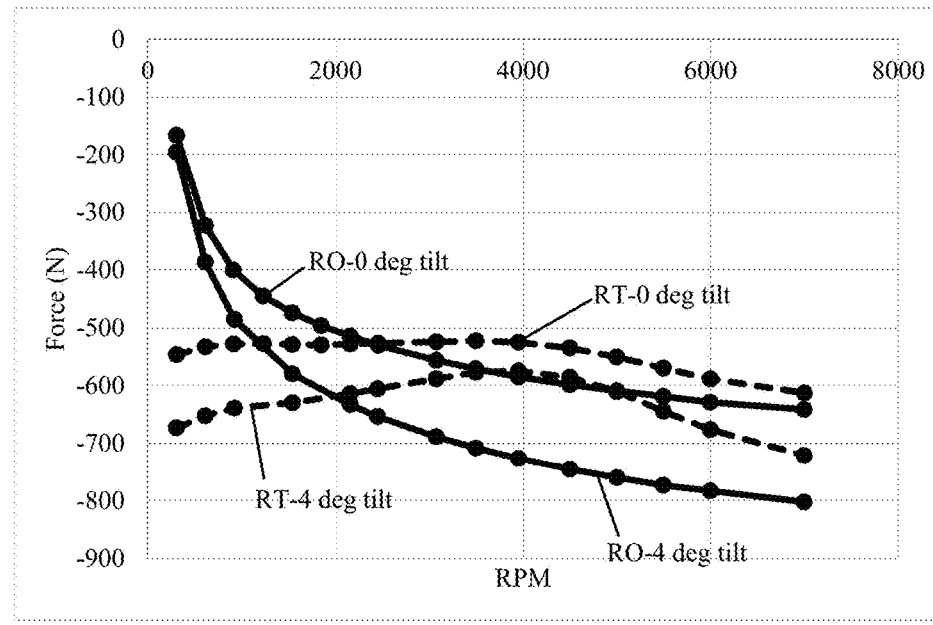
FIG. 42 is a plot of push on the track from magnets in a hover engine as a function of RPM for a zero degree angle and four degree tilt angle in accordance with the described embodiments.

In FIG. 42, plots of the push as a function of RPM values are shown for a non-tilted magnet array 1412 and a four degree tilted magnet array 1502. The push is shown with rotation only (RO) and rotation and translation (RT) for each of the two tilt angles. For a counter clockwise rotation, the side of the magnet array where the rotational velocity is opposite the translational velocity, i.e., the left side in FIG. 41 is tilted closer to the surface.

The effect of the tilt is to increase the downward push on the track which is generated. The push increases non-linearly as the magnets in the magnet array approach the surface. More push is generated from moving one half of the magnet array towards the surface than is lost moving the other half of the magnet array away from the surface. Thus, the net push is increased. This effect occurs for both rotation only and rotation and translation when the magnetic array is tilted.

Figure 43:
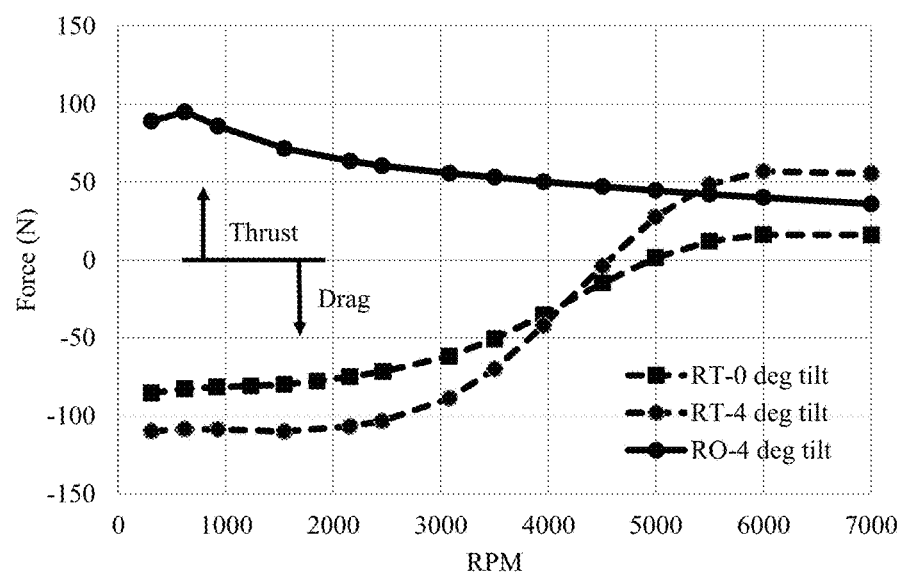
FIG. 43 is a plot of drag on the track from magnets in a hover engine as a function of RPM for a zero degree angle and four degree tilt angle in accordance with the described embodiments.

FIG. 43 is a plot of the drag or thrust on the track for RT with zero degree tilt, RO with four degrees tilt and RT with 4 degrees tilt. As noted above, no drag or thrust occurs at zero degrees tilt under RO conditions but thrust is predicted under RO conditions when the magnet array is tilted. Under the RO conditions at a four degree tilt angle, thrust is predicted at all RPM values.

Starting at rest from a tilt position, there is zero drag initially. Thus, as the result of the thrust, the hover engine will begin to translate in the direction opposite the thrust. As the translational velocity increases, drag will increase. Eventually, if the hover engine is allowed to continue to accelerate, in accordance with the predictions from the simulations, the hover engine would reach a translational velocity where the zero drag condition occurs for the RPM value and tilt angle of the hover engine.

At a 100 mph translational speed, at RPM below 4000 RPM, more drag is predicted at four degrees tilt angle than if the magnet array is held horizontal to the surface. Above 4000 RPM, less drag and then more thrust is predicted for the four degrees tilted magnet array. For the four degrees tilt angle, the zero drag condition is reached sooner and the amount of maximum amount of thrust which is generated is significantly increased. Although not shown, tilting the magnet array in the opposite direction lowers the amount of thrust which is generated past the zero drag condition. Thus, the simulations indicate that tilt control may be used to control the amount of thrust which is output and the location where zero drag occurs at a given RPM for a hover engine. Thus, it may be possible to use tilt control alone or in combination with RPM control to generate a zero drag condition for a given translational velocity.

FIG. 44 shows the power input into the track at 100 mph for a non-tilted and tilted magnet array traveling 1.27 cm above an aluminum track for various RPM values. The power requirements for rotation only (RO) and rotation and translation (RT) are shown. Further, the RPM value and associated power requirement of the zero drag condition that occurs during rotation and translation are plotted in the FIG. 44.

As described above, the effect of tilting the magnet array is to increase the push and to increase the drag. Consistent with other simulation conditions, such as flying closer to the surface, the additional push downwards on the track is not "free" and requires the input of additional power into the system. The predicted increase in power input into the track illustrates this effect.

At the zero drag condition for the tilted magnet array, the power requirements are lower than for the non-tilted version at the zero drag condition. Also, the RPM value where the zero drag condition occurs is less. Thus, if it is advantageous to operate the motors at a lower RPM value, it may be beneficial to tilt the magnetic array.

A possible disadvantage of tilting the magnet array is the clearance between the array and the track can be much less than flying at a zero tilt angle. A possible risk of flying closer to the track is a dynamic situation may occur where a downward motion causes the system to bottom out and contact the track. In a non-tilt configuration, more clearance between the track and the hover engine can be provided.

Returning to FIG. 44, a "negative" power is predicted for the tilted magnet array below 3000 RPM. The power input into the track is the torque times the angular velocity. A change in sign in the power is an indication that the torque has reversed direction. A positive torque on the track and hence a positive power occurs when the interaction between the track and rotating magnets causes forces which resist the turning of the magnets. A negative torque and hence a negative power occurs when the interaction between track and magnets result in forces which wants to help the magnets rotate.

As described above, under translation and rotation, a force imbalance between the two halves of the magnet array occurs such that thrust is generated and the power input into the track is reduced as compared to the condition when the magnet array is only spinning. The reduced torque is an indication that there is less resistance to the turning of the magnets. The tilt of the magnets enhances the force imbalance under rotation and translation to the extent that not only is there no resistance to the turning of the magnets but a torque is generated which causes the magnets spin in the counter clockwise direction. As noted above, the motor spins magnet array in a counter clockwise direction.

The power is not "free" but represents a potential to recover some of the potential energy that is stored in the system. In this example, the potential energy is kinetic energy associated with the translational velocity of the hover engine. A power input into the system is required to get the magnet array to reach a translational speed of 100 mph. After reaching a speed of 100 mph, the simulations predicts that below a 3000 RPM rotation rate of the magnet array, a torque is generated which helps the magnets rotate in the counter clockwise direction. However, below 3000 RPM as shown in FIG. 43, there is significant drag on the magnets in direction opposite of translation. Thus, the translational velocity of the system will quickly be reduced unless some other power is input into the system to overcome the magnetic drag in the translational direction.

As the translational velocity is reduced, at some velocity, a negative torque on the track will cease to be generated. Further, as the vehicle continues to slow, the interaction between the track and magnets will again cause a resistance to the turning of the magnets. When there is resistance to the turning of the magnets power is required to maintain a given RPM value. As the vehicle comes to rest, the power requirements to maintain a particular RPM value are those associated with RO for 4 degrees tilt shown in FIG. 44.

As an example, at 2500 RPM and a 100 mph translation speed, a negative power is predicted. If the vehicle were allowed to slow, the power would go from a positive to a negative. It would follow a path and increase until the value of power to maintain 2500 RPM is reached which is shown on the RO curve for a 4 deg tilt.

A possible use of the "negative" power is regenerative braking. During a braking scenario, if power were cut to the motors turning the magnet array, the motors will begin to output power as the energy stored in angular momentum of the motors and magnet array are harvested, akin to harvesting energy from a fly wheel. The rate at which the magnet array spins down depends on the resistance of the motor to turning and the resistance of the track to turning of the magnets. When the motor is turned, power is generated.

The resistance of the track to the turning of the magnets represents a power loss that is dissipated via the eddy currents in the track as heat. Depending on how fast the magnets in the array spin down and how fast the vehicle decelerates, conditions may be reached where the interaction between track and the magnet arrays during translation is generating some amount of power because the interaction is causing the magnet array and hence the motor to turn. Further, even if the interaction between the track and magnet array is not generating power, the power loss resulting from the resistance of the track to the turning of the magnet array is reduced such that a larger percentage of the rotational potential energy in the magnet array is converted to power.

In one configuration, as mentioned above, actuators are provided to control the tilt of the magnets. In one scenario, the magnet arrays may be intentionally tilted during braking. The deliberate tilt may allow more lift to be generated and more energy to be recovered during braking.

In another embodiment, rather than regenerative braking, the magnetic arrays may be allowed to spin freely. For example, the hover engine can include a clutch which allows the shaft which connects the magnetic carrier to the motor to disengage from the motor such that turning the magnetic carrier including the magnetic array doesn't turn the motor. Then, during braking, the magnetic array can be allowed to spin up.

The amount of push on track which is generated is independent of the spin direction. Hence, allowing the magnets to spin freely in the hover engine as a result of force imbalances during translational braking can provide lift. The lift can be generated even if the power is not being supplied to the motor.

Figure 45:
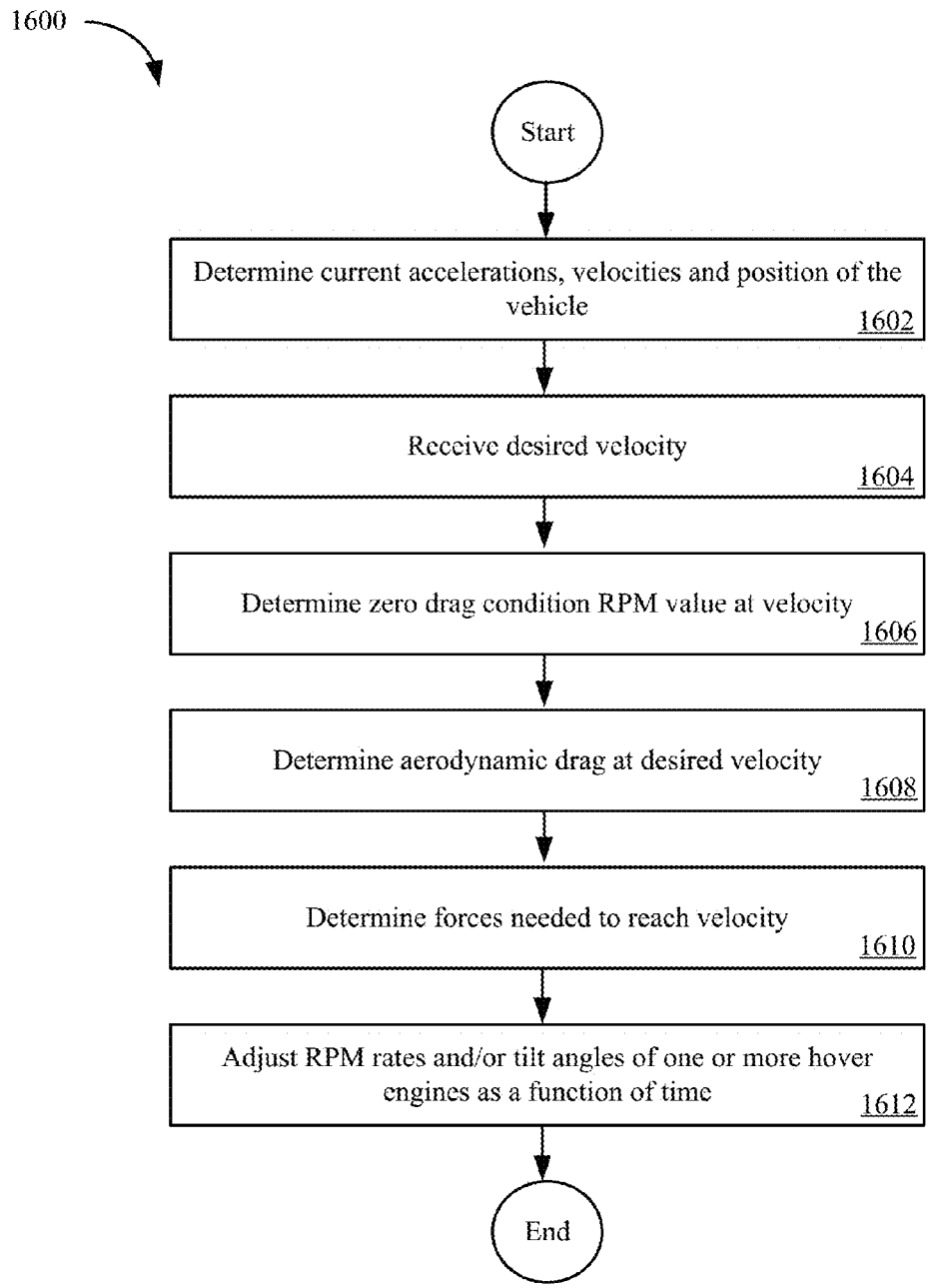
FIG. 45 is a first method of controlling one or more hover engines in accordance with the described embodiments.

Next, with respect to FIGS. 45 and 46, methods of controlling hover engines and vehicles including hover engines are discussed. The methods utilize the force imbalances which can occur when a magnetic array is rotating and translating. These force imbalances can be utilized alone or in combination with the mechanisms described above for generating propulsive forces used to propel or steer a hover engine.

These methods can be incorporated into a control system. The control system can be embodied on one or more logic devices. One example of a control system was described above with respect to FIGS. 14 to 19.

In FIG. 45, a method of controlling a vehicle is described. In step 1602, the current accelerations, velocities and position of the vehicle are determined. The accelerations can include linear and rotational velocities. The velocities can include linear and angular velocities.

In particular embodiments, the current translational velocity of the vehicle can be greater than 10 mph. In another embodiment, the current translation velocity is greater than 25 mph. In yet another embodiment, the current translational velocity is greater than 50 mph.

For example, the determination of position can include a track location of the vehicle. In addition, the position determination can include a height of one or more hover engines above a track. Further, an angle of a hover engine relative to a track surface can be determined, i.e., the current tilt angle. In addition, an orientation of the vehicle relative to the track can be determined, such as a yaw relative to the forward motion of the vehicle or a relative displacement of the vehicle relative to a center of the track. These quantities can be determined using various types of sensors, such as multi-axis accelerometers. In one embodiment, these values can be provided from an inertial measurement unit (IMU) as described above.

In step 1604, a desired velocity, different from the current velocity, such as a new cruise velocity of the vehicle can be received in the system. For example, a vehicle operator may input a desired velocity of the vehicle. The input value can be received in a control system coupled to one or more hover engines.

In step 1606, a zero drag RPM value at the current and desired velocities can be determined. Further, the current RPM values of one or more hover engines can be determined. As noted above, the current RPM value of a hover engine relative to a current zero drag RPM value at a given translational velocity and height above the track determine an amount of thrust or braking force output from the hover engine.

In various embodiments, the zero drag RPM value as a function of the translational velocity, the tilt position of the hover engine relative to the track, the height of the track and/or other variables can be stored as a table in a memory device. In addition, coefficients used in a formula used to calculate the zero drag condition RPM value for a particular hover engine as a function of one or more of these variables can be stored in a memory device. Further, the thrust and/or braking forces output from a hover engine as a function of the translational velocity, the tilt angle, height above the surface and RPM value can be stored as a table in a memory device. Similar, coefficients used in a formula used to calculate the thrust and/or braking forces as a function of one or more these variables can be stored in the memory device. The memory device or devices can be accessed by processor or processors in the control system used to control one or more hover engines.

In step 1608, if needed, forces occurring at the current and desired velocity can be determined, such as the aerodynamic drag at the desired and/or current velocity. The aerodynamic drag can be used to determine how much thrust is needed from the hover engine at the desired velocity. Based upon the needed thrust, the hover engine RPM rate and/or tilt angle can be determined to generate the needed thrust to overcome the aerodynamic drag and/or magnetic drag. When the forces are balanced, the vehicle can cruise at the desired velocity. As another example, the expected aerodynamic forces can be used to determine a rate of acceleration which will occur while speeding up or slowing down.

In particular embodiments, the control system can include a table of the three dimensional aerodynamic forces, such as drag, side and/or lift/downward forces, as a function of one or more of the velocity, the orientation of the vehicle relative to the track and its height above the surface of the track. The system can be configured to determine the aerodynamic forces currently acting or expected to act on a vehicle. Then, based upon these forces, the system can be configured to control the RPM rate and/or tilt angles of one or more hover engines to counteract and/or balance the aerodynamic forces.

In other embodiments, the control system doesn't have to determine the aerodynamic forces or any other additional forces acting on the vehicle. Instead, the control system can be configured to command additional thrust or braking forces from the hover engines until the desired velocity is reached. These operations can be carried out by the control system by comparing a current velocity to a target velocity. This approach can be useful if variable forces, such as variable aerodynamic forces are present.

For a given translational velocity and orientation/position of the hover engine relative to track, the thrust or braking force output from a hover engine can be determined. As described above, when the hover engine is translating, the zero drag condition is the inflection point between whether a braking force or thrust is being output from the hover engine. Hence, the RPM rates of one or more hover engines can be controlled to output a desired net braking force or net thrust.

The net braking force or net thrust which is commanded can be used to control how fast the vehicle reaches the desired velocity. By commanding a greater net thrust or braking force, faster accelerations or decelerations are achieved. The acceleration rate is one variable that can be incorporated into the control system.

In another embodiment, a tilt angle of a track can be changed to change forces output from a hover engine. For example, a track can be tilted from horizontal to cause and a hover engine in a horizontal position or some other fixed orientation, to output different forces, such as thrust or drag. The control system can be configured to determine, based on direct measurements or knowledge of the current location of the vehicle, a current track orientation and a future track orientation. This information can be used to determine current forces and expected forces which are to be output from the hover engine. Then, the hover engines can be controlled accordingly.

In step 1610, the forces needed to reach the desired velocity can be determined. The forces can be braking forces if the velocity is to be lowered or thrust forces if the velocity is to be increased. Further, side forces may alter a position of a vehicle causing the vehicle to yaw. Thus, forces needed to change a yaw position of the vehicle can be determined. The needed forces which are determined may change as steps 1602-1612 are repeated and the desired velocity is approached.

In step 1612, the control system can send commands to control the RPM rates and/or tilt angles of one or more hover engines as a function of time. As the RPM rates and/or tilt angles are controlled, net braking or net thrust can be generated. In response, the accelerations, velocity and position of the vehicle can change. Then, steps 1602-1612 can be repeated.

As noted above, the tilt angle can affect the zero drag condition RPM value. In addition, the tilt angle can affect an amount of lift and an amount of drag, which is output from the hover engine. Thus, if all or a portion of the hover engines are tilt capable, the tilt angle and RPM rates of these engines can be controlled to generate a desired output of forces. In various embodiments, all of the hover engines or only a portion of the hover engines may be tilt capable. Additionally, as described above, during braking, the tilt angle can affect an amount of energy which is recovered if a regenerative braking system is used.

With respect to FIG. 46, a second method 1700 of controlling translating hover engines is described. The second method can be used to steer a vehicle including the hover engines. The second method can be incorporated as part of control system. Further, the second method can be used alone or in combination with other methods previously described for generating a steering force, such as via tilting a hover engine.

In 1702, a turn direction can be determined. For example, the turn direction can be determined from a control input received from the system. In 1704, a desired turn rate can be determined. In 1706, the thrust or braking forces output from one or more hover engines can be adjusted in accordance with the current translational velocity and position/orientation of the hover engines to generate the desired turn. As described above, while a hover engine is translating the amount of braking force or thrust output from a hover engine can be varied by varying the RPM rate of the magnet array in the hover engine.

This approach is akin to steering a canoe. With canoe, a turn can affected by paddling faster on one side of the canoe, i.e., generating more thrust on one side of the canoe. Alternatively, the paddle can merely be placed in the water to create a braking force which steers the canoe.

With two hover engines, both approaches can be used to affect how fast a turn occurs. For example, a first hover engine on one side of a vehicle can be commanded to output thrust while a second hover engine on an opposite side of a vehicle can be commanded to generate a braking force. The difference between the thrust on one side of the vehicle and the braking force on the other vehicle can affect how fast the vehicle turns. As described above, for a translating hover engines, this approach can work without having to tilt the hover engines.

Embodiments of the present invention further relate to computer readable media that include executable program instructions for controlling a magnetic lift system. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A device comprising:
    a hover engine having,
        an electric motor including a winding, a first set of permanent magnets and a first structure which holds the first permanent magnets wherein an electric current is applied to the winding to cause one of the winding or the first set of permanent magnets to rotate;
        a second structure, configured to receive a rotational torque from the electric motor to rotate the second structure,
            the second structure holding a second set of permanent magnets wherein the second set of permanent magnets are rotated to induce eddy currents in a substrate such that the induced eddy currents and the second set of permanent magnets interact to generate forces which cause the device to hover above the substrate;
    a control system coupled to the hover engine configured to determine a translation velocity of the device and control a rotation rate of the hover engine to output approximately zero magnetic forces in a translational direction of the translational velocity.

2. The device of claim 1, wherein the second set of permanent magnets rotate in a plane which is approximately parallel to a top surface of the substrate adjacent to the second set of permanent magnets.

3. The device of claim 1, wherein the control system is configured to receive an input of the translational velocity.

4. The device of claim 1, wherein the control system is configured to determine the rotation rate.

5. The device of claim 4, wherein the rotation rate is a determined based upon the translational velocity.

6. The device of claim 4, wherein the rotation rate is determined based upon a height of the vehicle above the substrate.

7. The device of claim 1, further comprising a tilt mechanism to tilt the hover engine such that a rotation plane of the second set of permanent magnets is tilted at an angle relative to a top surface of the substrate.

8. The device of claim 7, wherein the control system is further configured to control the tilt mechanism.

9. The device of claim 7, wherein the control system is further configured to control the tilt mechanism and the rotation rate and tilt mechanism to output the approximately zero magnetic forces in the translational direction.

10. The device of claim 1, wherein at a first translational velocity the approximately zero magnetic forces are output at a first rotation rate and wherein the control system is further configured to operate the hover engine above the first rotation rate to generate thrust in the translational direction.

11. The device of claim 10, wherein the control system is further configured to control an amount of thrust output by the hover engine.

12. The device of claim 1, wherein at a first translational velocity the approximately zero magnetic forces are output at a first rotation rate and wherein the control system is further configured to operate the hover engine below the first rotation rate to generate a braking force in the translational direction.

13. The device of claim 1, wherein the control system is further configured to control an amount of braking force output from the hover engine.

14. The device of claim 1, wherein the translational velocity is greater than 25 miles per hour.

15. The device of claim 1, wherein the translation velocity is greater than 50 miles per hour.

16. A method of controlling a translating hover engine comprising:
    receiving a translational velocity including a translation direction;
    controlling a rotation rate of a set of permanent magnets in the hover engine to output approximately zero magnetic forces in the translational direction when the hover engine is translating at the translational velocity;
    wherein the set of permanent are rotated to induce eddy currents in a substrate such that the induced eddy currents and the set of permanent magnets interact to generate forces which cause the hover engine to hover above the substrate and
    wherein the set of permanent magnets rotate in a plane which is approximately parallel to a top surface of the substrate adjacent to the set of permanent magnets.

17. The method of claim 16, further comprising:
    determining a current rotation rate of the hover engine;
    based upon the received translational velocity, determining a first rotation rate at which the hover engines outputs the approximately zero magnetic forces in translational direction; and
    controlling the rotation rate of the hover engine to transition from the current rotation rate to the first rotation rate.

18. The method of claim 17, further comprising: determining a height of the hover engine above the substrate wherein the first rotation rate is determined based upon the translational velocity and the height.

19. The method of claim 16, furthering comprising determining a current translational velocity and a current rotation rate of the set of permanent magnets and determining whether the hover engine is outputting a thrust force or a braking force at the current translational velocity and the current rotation rate.

20. The method of claim 19, further comprising controlling the hover engine to change a magnitude of the thrust force output by the hover engine.

21. The method of claim 19, further comprising controlling the hover engine to change a magnitude of the braking force output by the hover engine.

22. The method of claim 16, further comprising controlling a tilt mechanism coupled to the hover engine to tilt the hover engine to rotate the set of permanent magnets in a second plane which is angled relative to the top surface of the substrate.

* * * * *